United States Patent
Umemoto et al.

(10) Patent No.: US 12,460,099 B2
(45) Date of Patent: Nov. 4, 2025

(54) REVERSIBLY THERMOCHROMIC COMPOSITION, REVERSIBLY THERMOCHROMIC MICROCAPSULE PIGMENT ENCAPSULATING REVERSIBLY THERMOCHROMIC COMPOSITION, AND WRITING INSTRUMENT USING REVERSIBLY THERMOCHROMIC MICROCAPSULE PIGMENT

(71) Applicants: THE PILOT INK CO., LTD., Aichi-ken (JP); KABUSHIKI KAISHA PILOT CORPORATION, Tokyo-to (JP)

(72) Inventors: Hiroshi Umemoto, Aichi-ken (JP); Yui Morigaki, Aichi-ken (JP); Naoto Masushige, Tokyo-to (JP)

(73) Assignees: THE PILOT INK CO., LTD., Aichi-Ken (JP); KABUSHIKI KAISHA PILOT CORPORATION, Tokyo-To (JP)

( * ) Notice: Subject to any disclaimer, the term of this patent is extended or adjusted under 35 U.S.C. 154(b) by 1019 days.

(21) Appl. No.: 17/598,478

(22) PCT Filed: Mar. 26, 2020

(86) PCT No.: PCT/JP2020/013524
§ 371 (c)(1),
(2) Date: Sep. 27, 2021

(87) PCT Pub. No.: WO2020/203603
PCT Pub. Date: Oct. 8, 2020

(65) Prior Publication Data
US 2022/0169919 A1    Jun. 2, 2022

(30) Foreign Application Priority Data
Mar. 29, 2019 (JP) .................. 2019-067303

(51) Int. Cl.
*C09D 11/50*    (2014.01)
*B41M 5/30*    (2006.01)
(Continued)

(52) U.S. Cl.
CPC ............. *C09D 11/50* (2013.01); *B41M 5/305* (2013.01); *B41M 5/3275* (2013.01);
(Continued)

(58) Field of Classification Search
CPC ....... B41M 5/305; B41M 5/3275; C08K 9/10; C09D 11/17; C09D 11/18; C09D 11/50
See application file for complete search history.

(56) References Cited

U.S. PATENT DOCUMENTS 4,421,560 A * 12/1983 Kito ....................... G01D 7/005
427/151
6,090,748 A * 7/2000 Furuya ................. B41M 5/3335
503/221

FOREIGN PATENT DOCUMENTS

GB    2 002 801    2/1979
JP    51-44706    11/1976
(Continued)

OTHER PUBLICATIONS

Machine translation of detailed description of JP 04-193583 acquired on Nov. 1, 2024.*
(Continued)

*Primary Examiner* — Gerard Higgins
(74) *Attorney, Agent, or Firm* — Wenderoth, Lind & Ponack, L.L.P.

(57) ABSTRACT

A highly marketable reversibly thermochromic composition that provides a black color during color development by using a fluoran derivative having a specific structure as an electron-donating color-developing organic compound, turns colorless during decoloration, and is excellent in (Continued)

contrast between a colored state and a decolored state and a microcapsule pigment encapsulating the same. A reversibly thermochromic composition including: (a) a fluoran derivative having a specific structure as an electron-donating color-developing organic compound; (b) an electron-accepting compound; and (c) a reaction medium which reversibly induces an electron transfer reaction between the component (a) and the component (b) in a specific temperature range, and a reversibly thermochromic microcapsule pigment encapsulating the same.

16 Claims, 2 Drawing Sheets

(51) Int. Cl.
*B41M 5/327* (2006.01)
*C09D 11/17* (2014.01)
*C09D 11/18* (2006.01)
*C08K 9/10* (2006.01)

(52) U.S. Cl.
CPC .............. *C09D 11/17* (2013.01); *C09D 11/18* (2013.01); *C08K 9/10* (2013.01)

(56) References Cited

FOREIGN PATENT DOCUMENTS

| | | |
|---|---|---|
| JP | 51-44707 | 11/1976 |
| JP | 1-29398 | 6/1989 |
| JP | 4-17154 | 3/1992 |
| JP | 4-193583 | 7/1992 |
| JP | 5-262034 | 10/1993 |
| JP | 7-33997 | 2/1995 |
| JP | 7-113055 | 5/1995 |
| JP | 7-179777 | 7/1995 |
| JP | 8-39936 | 2/1996 |
| JP | 2002-294096 | 10/2002 |
| JP | 2003-253149 | 9/2003 |
| JP | 2005-1369 | 1/2005 |
| JP | 2005-139242 | 6/2005 |
| JP | 2007-216514 | 8/2007 |
| JP | 2014-5422 | 1/2014 |
| JP | 2018-123203 | 8/2018 |
| JP | 2018-126866 | 8/2018 |
| WO | 2005/121072 | 12/2005 |

OTHER PUBLICATIONS

Machine translation of detailed description of JP 2005-139242 acquired on Nov. 1, 2024.*
Machine translation of detailed description of JP 2007-216514 acquired on Apr. 7, 2025. (Year: 2007).*
Extended European Search Report issued Nov. 10, 2022, in corresponding European Patent Application No. 20785411.8.
International Search Report (ISR) issued Jun. 16, 2020 in International (PCT) Application No. PCT/JP2020/013524.
Japanese Office Action issued Feb. 2, 2024 in Japanese Patent Application No. 2021-511894, with English translation.
International Preliminary Report on Patentability and Written Opinion of the International Searching Authority issued Sep. 28, 2021 in International (PCT) Application No. PCT/JP2020/013524.

* cited by examiner

[FIG. 1]
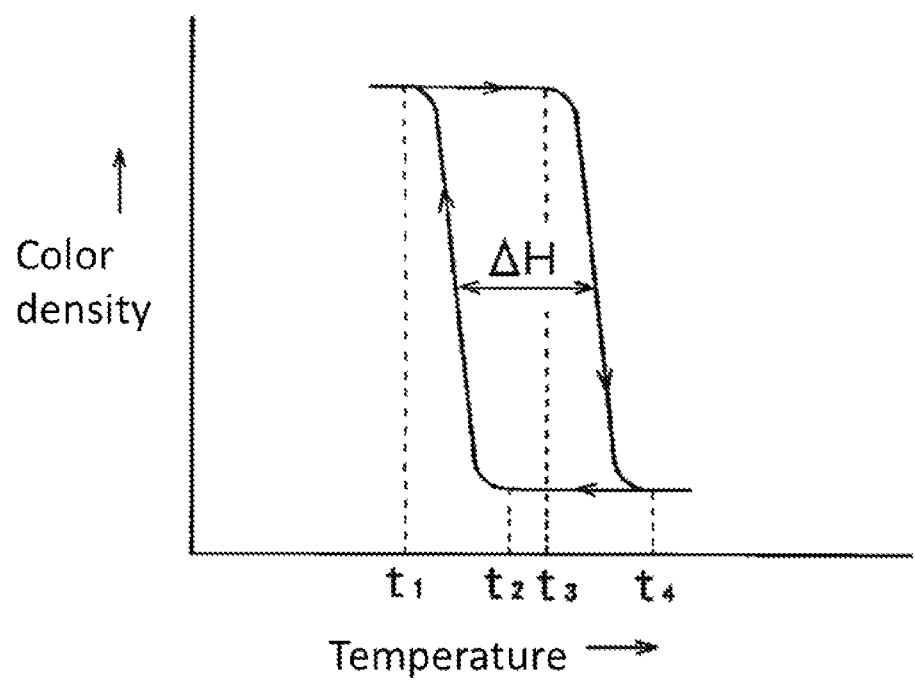
[FIG. 2]
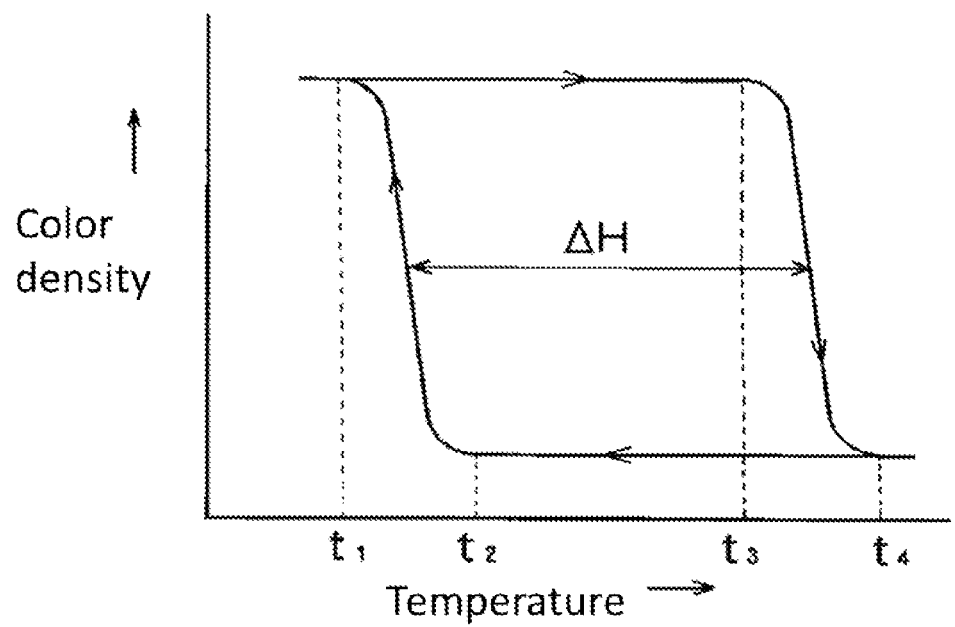

[FIG. 3]
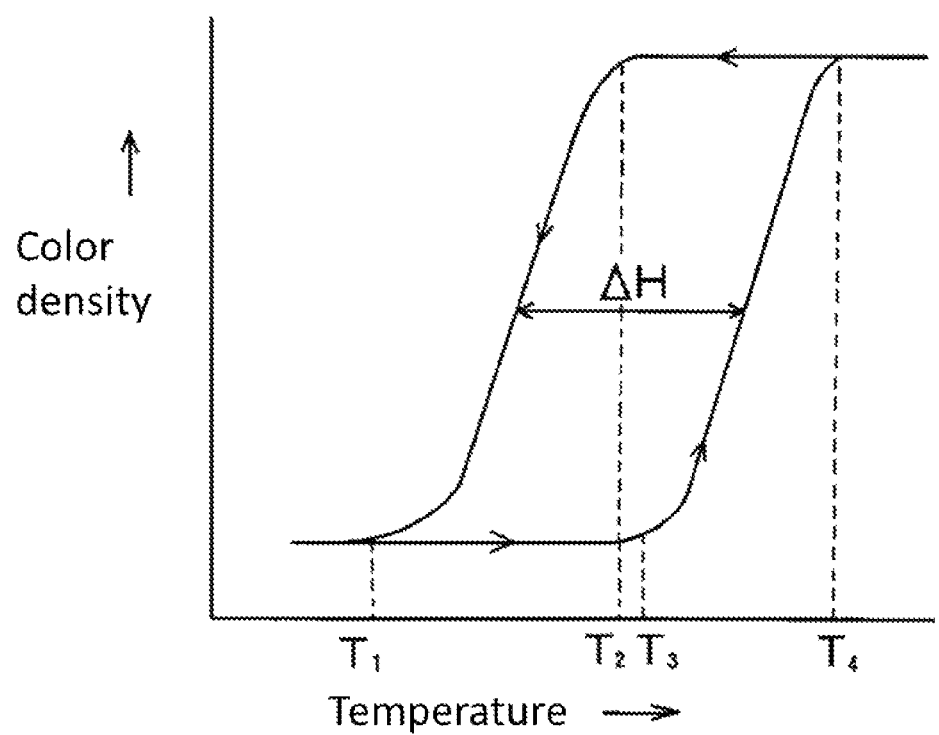

REVERSIBLY THERMOCHROMIC COMPOSITION, REVERSIBLY THERMOCHROMIC MICROCAPSULE PIGMENT ENCAPSULATING REVERSIBLY THERMOCHROMIC COMPOSITION, AND WRITING INSTRUMENT USING REVERSIBLY THERMOCHROMIC MICROCAPSULE PIGMENT

TECHNICAL FIELD

The present invention relates to a reversibly thermochromic composition and a reversibly thermochromic microcapsule pigment encapsulating the same. More particularly, the present invention relates to: a reversibly thermochromic composition which provides a black color during color development and turns colorless during decoloration, and a reversibly thermochromic microcapsule pigment encapsulating the same.

BACKGROUND ART

There has been disclosed a reversibly thermochromic composition containing, as essential components, an electron-donating color-developing organic compound, an electron-accepting compound, and a reaction medium which reversibly induces an electron transfer reaction between the electron-donating color-developing organic compound and the electron-accepting compound in a specific temperature range and showing a color change from black to green to colorless (see, for example, Patent Literatures 1 and 2).

There have been further disclosed a leuco pigment that exhibits black color in a colored state, becomes colorless in a decolored state, and is excellent in color development density and light resistance, a thermochromic microcapsule pigment using the leuco pigment, and an ink composition for a writing instrument containing the microcapsule pigment (see, for example, Patent Literature 3).

In Patent Literatures 1 to 3 described above, as the electron-donating color-developing organic compound or leuco pigment capable of providing black to green color, many fluoran derivatives are exemplified; however, a fluoran derivative having a specific structure in the present invention is not disclosed.

CITATION LIST

Patent Literature

Patent Literature 1: JP 2002-294096 A
Patent Literature 2: JP 2018-123203 A
Patent Literature 3: JP 2014-5422 A

SUMMARY OF INVENTION

Technical Problem

An object of the present invention is to provide a reversibly thermochromic composition to which a fluoran derivative having a specific structure is applied as an electron-donating color-developing organic compound and a reversibly thermochromic microcapsule pigment encapsulating the same, the reversibly thermochromic composition exhibits black color during color development and turns colorless during decoloration, and the reversibly thermochromic microcapsule pigment encapsulates the reversibly thermochromic composition.

Solution to Problem

A reversibly thermochromic composition according to the present invention includes
(a) a fluoran derivative represented by formula (I), as an electron-donating color-developing organic compound,
(b) an electron-accepting compound, and
(c) a reaction medium which reversibly induces an electron transfer reaction between the component (a) and the component (b) in a specific temperature range:

[Chem. 1]

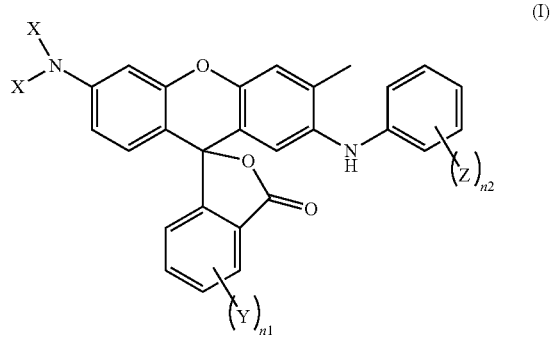

(I)

[wherein,
n1 is 0, 1, or 2,
n2 is 0 or 1,
each X is independently a hydrogen atom, a linear or branched alkyl group having 1 to 10 carbon atoms, or a group represented by formula (i) having 6 to 12 carbon atoms:

[Chem. 2]

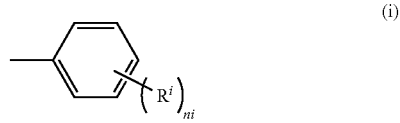

(i)

(wherein,
n1 is 0 or 1,
$R^i$ is a halogen atom, a nitro group, a cyano group, a hydroxy group, a carboxyl group, a linear or branched alkyl group having 1 to 6 carbon atoms, or a linear or branched alkoxy group having 1 to 5 carbon atoms),
provided that when n2 is 0, one of the two Xs is a group represented by formula (i), the other X is a hydrogen atom or a linear or branched alkyl group having 1 to 10 carbon atoms, a total number of carbon atoms of the two Xs is 10 to 22, and when X is a hydrogen atom, the number of carbon atoms represented by X is 0,
when n2 is 1, neither of the two Xs are hydrogen atoms,
each Y is independently a halogen atom, a linear or branched alkyl group having 1 to 4 carbon atoms, or a linear or branched alkoxy group having 1 to 3 carbon atoms, and
Z is a halogen atom, a linear or branched alkyl group having 1 to 4 carbon atoms, or a linear or branched alkoxy group having 1 to 3 carbon atoms].

A reversibly thermochromic microcapsule pigment according to the present invention encapsulates the reversibly thermochromic composition described above.

A reversibly thermochromic liquid composition according to the present invention includes the reversibly thermochromic microcapsule pigment described above and a vehicle.

A reversibly thermochromic solid molded article for coating according to the present invention includes the reversibly thermochromic microcapsule pigment described above and an excipient.

A resin composition for forming a reversibly thermochromic molded article according to the present invention includes the reversibly thermochromic microcapsule pigment described above and a molding resin.

The reversibly thermochromic molded article according to the present invention is obtained by molding the resin composition for forming a reversibly thermochromic molded article.

A reversibly thermochromic laminate according to the present invention includes a support and a reversibly thermochromic layer containing the reversibly thermochromic microcapsule pigment.

A writing instrument according to the present invention stores a writing instrument ink including a reversibly thermochromic microcapsule pigment and a vehicle.

Advantageous Effects of Invention

The present invention can provide a reversibly thermochromic composition to which a fluoran derivative having a specific structure is applied as an electron-donating color-developing organic compound and a reversibly thermochromic microcapsule pigment encapsulating the same. The reversibly thermochromic composition and reversibly thermochromic microcapsule pigment encapsulating the same exhibit black color during color development and turn colorless during decoloration, and a difference in density between a colored state and a decolored state is large (contrast between the colored state and the decolored state is excellent).

BRIEF DESCRIPTION OF DRAWINGS

FIG. 1 is a graph for explaining a hysteresis characteristic of a reversibly thermochromic composition of heat-decoloring type in a color density-temperature curve.

FIG. 2 is a graph for explaining the hysteresis characteristic of the reversibly thermochromic composition of heat-decoloring type having a color-memory property in the color density-temperature curve.

FIG. 3 is a graph for explaining the hysteresis characteristic of a reversibly thermochromic composition of heat color-developing type in the color density-temperature curve.

DESCRIPTION OF EMBODIMENTS

Examples of the reversibly thermochromic composition of the present invention include a reversibly thermochromic composition of heat-decoloring type (decolored when heated, and colored when cooled) including at least three essential components: (a) an electron-donating color-developing organic compound; (b) an electron-accepting compound; and (c) a reaction medium to determine an occurrence temperature of a coloring reaction of the component (a) and the component (b).

As the reversibly thermochromic composition described above, it is possible to use a reversibly thermochromic composition described in JP S51-44706B, JP S51-44707B, JP H1-29398B, etc. and being of heat-decoloring type (decolored when heated, and colored when cooled) which changes color above and below a predetermined temperature (color changing point), exhibits a decolored state in a temperature range not lower than an upper color changing point, exhibits a colored state in a temperature range not higher than a lower color changing point, and has characteristics in which only one specific state, of the both states, exists in a normal temperature range, and the other state is maintained only while heat or cold required for the other state to be expressed is being applied, but the state in the normal temperature range is restored once the application of heat or cold is terminated and in which a hysteresis width (ΔH) is relatively small (ΔH=1 to 7° C.). (See FIG. 1).

Also, it is possible to use a reversibly thermochromic composition of heat-decoloring type (decolored when heated, and colored when cooled) which is described in JP H4-17154B, JP H7-179777A, JP H7-33997A, JP H8-39936A, JP 2005-1369A, etc., exhibits a characteristic of large hysteresis width (ΔH=8 to 70° C.), changes the color along very different paths in the curve of plots showing color development density change with temperature change between when the temperature increases from a region lower than the discoloration range and when the temperature decreases from a region higher than the discoloration range, and has color memorability when the colored state in a temperature range not higher than a complete coloring temperature $t_1$ or the decolored state in a high-temperature range not lower than a complete decoloring temperature $t_4$ is in the specific temperature range [temperature range between a coloring starting temperature $t_2$ and a decoloring starting temperature $t_3$ (essentially two-phase retaining temperature range)]. (See FIG. 2).

The respective components (a), (b), and (c) will be specifically explained below.

The component (a), namely, an electron-donating color-developing organic compound, is a color-determining component and is a compound which develops a color by donating an electron(s) to the component (b), which is a color developer.

A fluoran derivative used in the present invention is represented by formula (I).

[Chem. 3]

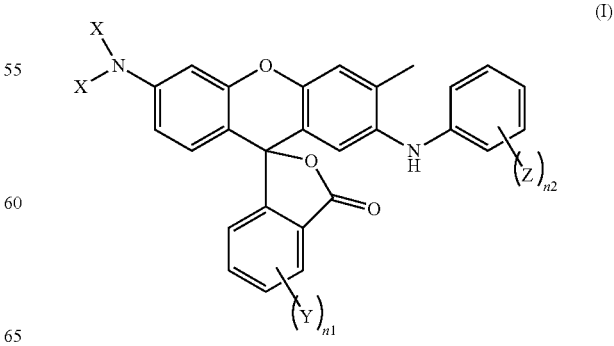

[wherein,
n1 is 0, 1, or 2;
n2 Is 0 or 1,
each X is independently a hydrogen atom, a linear or branched alkyl group having 1 to 10 carbon atoms, or a group represented by formula (i) having 6 to 12 carbon atoms:

[Chem. 4]

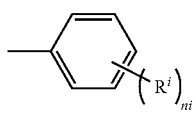

(i)

(wherein,
n1 is 0 or 1,
$R^i$ is a halogen atom, a nitro group, a cyano group, a hydroxy group, a carboxyl group, a linear or branched alkyl group having 1 to 6 carbon atoms, or a linear or branched alkoxy group having 1 to 5 carbon atoms),
provided that when n2 is 0, one of the two Xs is a group represented by formula (i) (preferably, n1 is 0 or 1, and $R^i$ is a linear or branched alkyl group having 1 to 6 carbon atoms or a linear or branched alkoxy group having 1 to 5 carbon atoms), the other X is a hydrogen atom or a linear or branched alkyl group having 1 to 10 carbon atoms, a total number of carbon atoms of the two Xs is 10 to 22, and when X is a hydrogen atom, the number of carbon atoms represented by X is 0,
when n2 is 1, neither of the two Xs are hydrogen atoms and, preferably, are both not hydrogen atom,
each Y is independently a halogen atom, a linear or branched alkyl group having 1 to 4 carbon atoms, or a linear or branched alkoxy group having 1 to 3 carbon atoms, and
Z is a halogen atom, a linear or branched alkyl group having 1 to 4 carbon atoms, or a linear or branched alkoxy group having 1 to 3 carbon atoms].

The fluoran derivative represented by formula (I) is preferably represented by formula (Ia) or formula (Ib) described below.

The fluoran derivative represented by formula (Ia) will be described.

[Chem. 5]

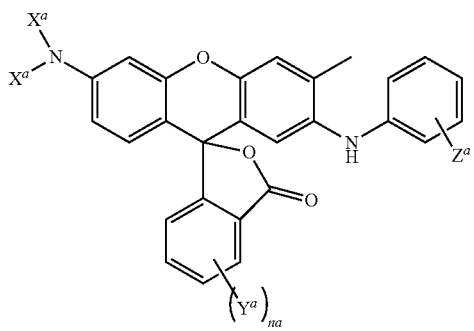

(Ia)

{wherein,
na is 0, 1, or 2,
each $X^a$ is independently a linear or branched alkyl group having 1 to 8 carbon atoms, or a group represented by formula (ia) having 6 to 12 carbon atoms:

[Chem. 6]

(ia)

[wherein,
nia is 0 or 1,
$R^{ia}$ is a halogen atom, a nitro group, a cyano group, a hydroxy group, a carboxyl group, a linear or branched alkyl group having 1 to 6 carbon atoms (preferably 1 to 4 carbon atoms), or a linear or branched alkoxy group having 1 to 5 carbon atoms (preferably 1 to 3 carbon atoms)],
each $Y^a$ is independently a halogen atom or a linear or branched alkyl group having 1 to 4 carbon atoms, and
$Z^a$ is a halogen atom, a linear or branched alkyl group having 1 to 4 carbon atoms, or a linear or branched alkoxy group having 1 to 3 carbon atoms}.

The reversibly thermochromic composition according to the present invention to which the fluoran derivative represented by formula (Ia) is applied has a large difference in density between the colored state and the decolored state, that is, has excellent contrast between the colored state and the decolored state. In addition, the reversibly thermochromic composition hardly impairs a reversibly thermochromic function of becoming the decolored state in a temperature range not lower than an upper color changing point (complete decoloring temperature) and becoming the colored state in a temperature range not higher than a lower color changing point (complete coloring temperature) even when the temperature is repeatedly changed, and the density in the colored state and the density in the decolored state hardly change even when the reversibly thermochromic composition is repeatedly used.

Regarding $X^a$, examples of linear or branched alkyl groups having 1 to 8 carbon atoms include a methyl group, an ethyl group, an n-propyl group, an isopropyl group, an n-butyl group, an isobutyl group, a sec-butyl group and a tert-butyl, an n-pentyl group, an isopentyl group, a neopentyl group, an n-hexyl group, an n-heptyl group, and an n-octyl group.

As $X^a$, a linear or branched alkyl group having 2 to 6 carbon atoms, such as an ethyl group, an n-propyl group, an isopropyl group, an n-butyl group, an isobutyl group, a sec-butyl group, a tert-butyl group, an n-pentyl group, an isopentyl group, a neopentyl group, or an n-hexyl group, is preferable because a high density is easily shown in the colored state.

Regarding $R^{ia}$ in the group represented by formula (ia), examples of the halogen atom include a fluorine atom, a chlorine atom, a bromine atom, and an iodine atom, examples of the linear or branched alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, and an n-hexyl group, and examples of the linear or branched alkoxy group having 1 to 5 carbon atoms include a methoxy group, an ethoxy group, an n-propoxy group, an isopropoxy group, an n-butoxy group, an isobutoxy group, a sec-butoxy group, a tert-butoxy group, an n-pentoxy group, an isopentoxy group, and a neopentoxy group.

$R^{ia}$ is preferably a linear or branched alkyl group having 1 to 4 carbon atoms from the viewpoint of excellent solubility.

Regarding $Y^a$, examples of the halogen atom include a fluorine atom, a chlorine atom, a bromine atom, and an iodine atom, and examples of the linear or branched alkyl group having 1 to 4 carbon atoms include a methyl group, an ethyl group, an n-propyl group, an isopropyl group, an n-butyl group, an isobutyl group, a sec-butyl group, and a tert-butyl group.

Regarding $Y^a$, from the viewpoint of excellent contrast between the colored state and the decolored state, it is preferable that na is 0 (that is, it is unsubstituted), or na is 1 and $Y^a$ is a halogen atom or a linear or branched alkyl group having 1 to 4 carbon atoms, and it is more preferable that na is 0, or na is 1 and $Y^a$ is a halogen atom.

Regarding $Z^a$, examples of the halogen atom include a fluorine atom, a chlorine atom, a bromine atom, and an iodine atom, and examples of the linear or branched alkyl group having 1 to 4 carbon atoms include a methyl group, an ethyl group, an n-propyl group, an isopropyl group, an n-butyl group, an isobutyl group, a sec-butyl group, and a tert-butyl, and examples of the linear or branched alkoxy group having 1 to 3 carbon atoms include a methoxy group, an ethoxy group, an n-propoxy group, and an isopropoxy group.

As $Z^a$, a halogen atom is preferable and a chlorine atom is more preferable because a high density is easily shown in the colored state.

A substitution position of $Z^a$ is not particularly limited, and a para position is preferable because a high density is easily shown in the colored state.

In the reversibly thermochromic composition of the present invention to which a fluoran derivative is applied in which in formula (Ia), each $X^a$ is independently a linear or branched alkyl group having 1 to 8 carbon atoms or a group represented by formula (ia) having 6 to 12 carbon atoms, na is 0, 1, or 2, each $Y^a$ is independently a halogen atom or a linear or branched alkyl group having 1 to 4 carbon atoms, and $Z^a$ is a halogen atom, a linear or branched alkyl group having 1 to 4 carbon atoms or a linear or branched alkoxy group having 1 to 3 carbon atoms, a high density is easily shown in the colored state, and a residual color in the decolored state tends to decrease. In addition, when $X^a$ is a functional group different from each other, the reversibly thermochromic composition is preferable because the residual color in the decolored state more easily decreases.

As the fluoran derivative represented by formula (Ia) in which $X^a$ is a functional group different from each other, it is preferable that one of $X^a$ in formula (Ia) is a linear or branched alkyl group having 1 to 8 carbon atoms and the other is a group represented by formula (ia), it is more preferable that one of $X^a$ is a linear or branched alkyl group having 1 to 8 carbon atoms and the other is a group represented by formula (ia) and is unsubstituted (nia is 0) or $R^{ia}$ is a linear or branched alkyl group having 1 to 4 carbon atoms, and it is still more preferable that one of $X^a$ is a linear or branched alkyl group having 2 to 6 carbon atoms and the other is a group represented by formula (ia) and $R^{ia}$ is a linear or branched alkyl group having 1 to 4 carbon atoms.

By applying the fluoran derivative having the above structure, it becomes easy to obtain a highly practical reversibly thermochromic composition that is more excellent in contrast between the colored state and the decolored state.

As the fluoran derivative represented by formula (Ia), preferred are fluoran derivatives in which each $X^a$ is independently a linear or branched alkyl group having 1 to 8 carbon atoms or a group represented by formula (ia), na is 0, 1, or 2, each $Y^a$ is independently a halogen atom or a linear or branched alkyl group having 1 to 4 carbon atoms, and $Z^a$ is a halogen atom, since it is easy to obtain a reversibly thermochromic composition having excellent contrast between the colored state and the decolored state.

In addition, since the contrast between the colored state and the decolored state is excellent and the residual color in the decolored state tends to decrease, more preferred are fluoran derivatives in which in formula (Ia), each $X^a$ is independently a linear or branched alkyl group having 1 to 8 carbon atoms or a group represented by formula (ia), $X^a$ is a functional group different from each other, na is 0, 1, or 2, each $Y^a$ is independently a halogen atom or a linear or branched alkyl group having 1 to 4 carbon atoms, and $Z^a$ is a halogen atom, still more preferred are fluoran derivatives in which one of $X^a$ of formula (Ia) is a linear or branched alkyl group having 1 to 8 carbon atoms, the other is a group represented by formula (ia), na is 0, 1, or 2, each $Y^a$ is independently a halogen atom or a linear or branched alkyl group having 1 to 4 carbon atoms, and $Z^a$ is a halogen atom, even more preferred are fluoran derivatives in which one of $X^a$ of formula (Ia) is a linear or branched alkyl group having 1 to 8 carbon atoms, the other is a group represented by formula (ia) and is unsubstituted (nia is 0) or $R^{ia}$ is a linear or branched alkyl group having 1 to 4 carbon atoms, na is 0, 1, or 2, each $Y^a$ is independently a halogen atom or a linear or branched alkyl group having 1 to 4 carbon atoms, and $Z^a$ is a halogen atom, and particularly preferred are fluoran derivatives in which one of $X^a$ is a linear or branched alkyl group having 2 to 6 carbon atoms, the other is a group represented by formula (ia), $R^{ia}$ is a linear or branched alkyl group having 1 to 4 carbon atoms, na is 0, 1, or 2, each $Y^a$ is independently a halogen atom or a linear or branched alkyl group having 1 to 4 carbon atoms, and $Z^a$ is a halogen atom.

Examples of the fluoran derivative represented by formula (Ia) applied to the present invention include 2-(4-fluoroanilino)-3-methyl-6-(N,N-diethylamino)fluoran, 2-(4-fluoroanilino)-3-methyl-6-(N,N-di-n-butylamino)fluoran, 2-(4-fluoroanilino)-3-methyl-6-(N,N-di-n-hexylamino)fluoran, 2-(4-fluoroanilino)-3-methyl-6-(N,N-di-n-octylamino)fluoran, 2-(4-fluoroanilino)-3-methyl-6-(N,N-diphenylamino)fluoran, 2-(4-fluoroanilino)-3-methyl-6-(N-n-butyl-N-ethylamino) fluoran, 2-(4-fluoroanilino)-3-methyl-6-(N-ethyl-N-n-hexylamino) fluoran, 2-(4-fluoroanilino)-3-methyl-6-(N-ethyl-N-n-octylamino) fluoran, 2-(4-fluoroanilino)-3-methyl-6-(N-ethyl-N-phenylamino) fluoran, 2-(3-fluoroanilino)-3-methyl-6-[N-(2-chlorophenyl)-N-ethylamino]fluoran, 2-(4-fluoroanilino)-3-methyl-6-[N-(4-bromophenyl)-N-ethylamino]fluoran, 2-(4-fluoroanilino)-3-methyl-6-[N-ethyl-N-(2-methoxyphenyl)amino]fluoran, 2-(2-fluoroanilino)-3-methyl-6-[N-ethyl-N-(4-ethoxyphenyl)amino]fluoran, 2-(3-fluoroanilino)-3-methyl-6-[N-ethyl-N-(4-isopropoxyphenylamino)]fluoran, 2-(4-fluoroanilino)-3-methyl-6-(N-ethyl-N-p-tolylamino) fluoran, 2-(3-fluoroanilino)-3-methyl-6-[N-ethyl-N-(4-ethylphenyl)amino]fluoran,
2-(4-fluoroanilino)-3-methyl-6-[N-(4-n-butylphenyl)-N-ethylamino]fluoran,
2-(4-fluoroanilino)-3-methyl-6-(N-n-butyl-N-n-heptylamino)fluoran,
2-(2-fluoroanilino)-3-methyl-6-(N-n-butyl-N-phenylamino)fluoran,
2-(4-fluoroanilino)-3-methyl-6-[N-(2-bromophenyl)-N-n-butylamino]fluoran,
2-(4-fluoroanilino)-3-methyl-6-(N-n-butyl-N-p-tolylamino)fluoran,
2-(3-fluoroanilino)-3-methyl-6-(N-ethyl-N-n-hexylphenylamino)fluoran,
2-(4-fluoroanilino)-3-methyl-6-(N-n-hexyl-N-n-octylphenylamino)fluoran,
2-(4-fluoroanilino)-3-methyl-6-(N-phenyl-N-n-hexylamino)fluoran,
2-(4-fluoroanilino)-3-methyl-6-(N-n-hexyl-N-p-tolylamino)fluoran,
2-(2-fluoroanilino)-3-methyl-6-(N-tert-butyl-N-n-hexylphenylamino)fluoran,
2-(4-fluoroanilino)-3-methyl-6-[N-(4-ethylphenyl)-N-n-octylamino)fluoran,
2-(4-fluoroanilino)-3-methyl-6-(N-n-octyl-N-n-propylamino)fluoran,
2-(4-fluoroanilino)-3-methyl-6-(N-n-heptyl-N-n-octylamino)fluoran,
2-(4-fluoroanilino)-3-methyl-6-(N-n-octyl-N-p-tolylamino)fluoran,
2-(3-fluoroanilino)-3-methyl-6-[N-(4-n-butylphenyl)-N-n-octylamino]fluoran,
2-(4-chloroanilino)-3-methyl-6-(N,N-dimethylamino)fluoran,
2-(4-chloroanilino)-3-methyl-6-(N,N-diethylamino)fluoran,
2-(4-chloroanilino)-3-methyl-6-(N,N-di-n-propylamino)fluoran,
2-(4-chloroanilino)-3-methyl-6-(N,N-diisopropylamino)fluoran,
2-(4-chloroanilino)-3-methyl-6-(N,N-di-n-butylamino)fluoran,
2-(4-chloroanilino)-3-methyl-6-(N,N-diisobutylamino)fluoran,
2-(4-chloroanilino)-3-methyl-6-(N,N-di-sec-butylamino)fluoran,
2-(4-chloroanilino)-3-methyl-6-(N,N-di-tert-butylamino)fluoran,
2-(4-chloroanilino)-3-methyl-6-(N,N-di-n-pentylamino)fluoran,
2-(4-chloroanilino)-3-methyl-6-(N,N-diisopentylamino)fluoran,
2-(4-chloroanilino)-3-methyl-6-(N,N-dineopentylamino)fluoran,
2-(4-chloroanilino)-3-methyl-6-(N,N-di-n-hexylamino)fluoran,
2-(4-chloroanilino)-3-methyl-6-(N,N-di-n-heptylamino)fluoran,
2-(4-chloroanilino)-3-methyl-6-(N,N-di-n-octylamino)fluoran,
2-(4-chloroanilino)-3-methyl-6-(N,N-diphenylamino)fluoran,
2-(4-chloroanilino)-3-methyl-6-[N,N-di-(2-chlorophenyl)amino]fluoran,
2-(4-chloroanilino)-3-methyl-6-[N,N-di-(4-bromophenyl)amino]fluoran,
2-(4-chloroanilino)-3-methyl-6-[N,N-di-(2-methoxyphenyl)amino]fluoran,
2-(4-chloroanilino)-3-methyl-6-[N,N-(3-ethoxyphenyl)amino]fluoran,
2-(4-chloroanilino)-3-methyl-6-[N,N-di-(4-n-propoxyphenyl)amino]fluoran,
2-(4-chloroanilino)-3-methyl-6-[N,N-di-(4-isopropoxyphenyl)amino]fluoran,
2-(4-chloroanilino)-3-methyl-6-(N,N-di-p-tolylamino)fluoran,
2-(4-chloroanilino)-3-methyl-6-[N,N-di-(4-n-butylphenyl)amino]fluoran,
2-(3-chloroanilino)-3-methyl-6-(N-n-hexyl-N-methylamino)fluoran,
2-(4-chloroanilino)-3-methyl-6-(N-n-butyl-N-ethylamino)fluoran,
2-(4-chloroanilino)-3-methyl-6-(N-tert-butyl-N-ethylamino) fluoran,
2-(4-chloroanilino)-3-methyl-6-(N-ethyl-N-n-hexylamino)fluoran,
2-(4-chloroanilino)-3-methyl-6-(N-ethyl-N-n-octylamino)fluoran,
2-(4-chloroanilino)-3-methyl-6-(N-ethyl-N-phenylamino)fluoran,
2-(4-chloroanilino)-3-methyl-6-[N-(4-chlorophenyl)-N-ethylamino]fluoran,
2-(4-chloroanilino)-3-methyl-6-[N-(4-bromophenyl)-N-ethylamino]fluoran,
2-(4-chloroanilino)-3-methyl-6-[N-ethyl-N-(4-nitrophenyl)amino]fluoran,
2-(4-chloroanilino)-3-methyl-6-[N-ethyl-N-(4-methoxyphenyl)amino]fluoran,
2-(2-chloroanilino)-3-methyl-6-[N-(4-ethoxyphenyl)-N-ethylamino]fluoran,
2-(3-chloroanilino)-3-methyl-6-[N-ethyl-N-(4-n-propoxyphenyl)amino]fluoran,
2-(4-chloroanilino)-3-methyl-6-[N-ethyl-N-(4-isopropoxyphenyl)amino]fluoran,
2-(2-chloroanilino)-3-methyl-6-(N-ethyl-N-p-tolylamino)fluoran,
2-(3-chloroanilino)-3-methyl-6-(N-ethyl-N-p-tolylamino)fluoran,
2-(4-chloroanilino)-3-methyl-6-(N-ethyl-N-p-tolylamino)fluoran,
2-(4-chloroanilino)-3-methyl-6-[N-ethyl-N-(4-ethylphenyl)amino]fluoran,
2-(4-chloroanilino)-3-methyl-6-[N-ethyl-N-(4-n-propylphenyl)amino]fluoran,
2-(4-chloroanilino-3-methyl-6-[N-ethyl-N-(4-isopropylphenyl)amino]fluoran,
2-(3-chloroanilino)-3-methyl-6-[N-(4-n-butylphenyl)-N-ethylamino]fluoran,
2-(4-chloroanilino)-3-methyl-6-[N-(4-n-butylphenyl)-N-ethylamino]fluoran,
2-(4-chloroanilino)-3-methyl-6-[N-ethyl-N-(4-isobutylphenyl)amino]fluoran,
2-(4-chloroanilino)-3-methyl-6-[N-(4-sec-butylphenyl)-N-ethylamino]fluoran,
2-(4-chloroanilino)-3-methyl-6-[N-4-tert-butylphenyl)-N-ethylamino]fluoran,
2-(4-chloroanilino)-3-methyl-6-(N-n-octyl-N-n-propylamino)fluoran,
2-(4-chloroanilino)-3-methyl-6-(N-n-butyl-N-n-heptylamino)fluoran,
2-(2-chloroanilino)-3-methyl-6-(N-n-butyl-N-phenylamino) fluoran,
2-(4-chloroanilino)-3-methyl-6-[N-(2-bromophenyl)-N-n-butylamino]fluoran, 2-(4-chloroanilino)-3-methyl-6-[N-n-butyl-N-(4-cyanophenyl)amino]fluoran,
2-(4-chloroanilino)-3-methyl-6-(N-n-butyl-N-p-tolylamino)fluoran,
2-(4-chloroanilino)-3-methyl-6-(N-tert-butyl-N-n-pentylamino)fluoran,
2-(4-chloroanilino)-3-methyl-6-(N-tert-butyl-N-n-hexylamino)fluoran,
2-(4-chloroanilino)-3-methyl-6-(N-tert-butyl-N-n-heptylamino)fluoran,
2-(4-chloroanilino)-3-methyl-6-(N-tert-butyl-N-n-octylamino)fluoran,
2-(4-chloroanilino)-3-methyl-6-[N-(4-chlorophenyl)-N-tert-butylamino]fluoran,
2-(4-chloroanilino)-3-methyl-6-[N-tert-butyl-N-(4-carboxyphenyl)amino]fluoran,
2-(2-chloroanilino)-3-methyl-6-[N-tert-butyl-N-(2-n-propoxyphenyl)amino]fluoran,
2-(4-chloroanilino)-3-methyl-6-(N-tert-butyl-N-p-tolylamino)fluoran,
2-(4-chloroanilino)-3-methyl-6-[N-tert-butyl-N-(4-tert-butylphenyl)amino]fluoran,
2-(4-chloroanilino)-3-methyl-6-[N-(4-n-butylphenyl)-N-n-hexylamino]fluoran,
2-(4-chloroanilino)-3-methyl-6-[N-n-hexyl-N-(4-n-octylphenyl)amino]fluoran,
2-(4-chloroanilino)-3-methyl-6-(N-phenyl-N-n-hexylamino)fluoran,
2-(4-chloroanilino)-3-methyl-6-(N-n-hexyl-N-p-tolylamino)fluoran,
2-(2-chloroanilino)-3-methyl-6-[N-(4-tert-butylphenyl)-N-n-hexylamino]fluoran,
2-(4-chloroanilino)-3-methyl-6-(N-n-heptyl-N-n-octylamino)fluoran,
2-(2-chloroanilino)-3-methyl-6-[N-(3-bromophenyl)-N-n-octylamino]fluoran,
2-(4-chloroanilino)-3-methyl-6-[N-(4-hydroxyphenyl)-N-n-octylamino]fluoran,
2-(4-chloroanilino)-3-methyl-6-(N-n-octyl-N-p-tolylamino)fluoran,
2-(4-chloroanilino)-3-methyl-6-[N-(4-ethylphenyl)-N-n-octylamino]fluoran,
2-(3-chloroanilino)-3-methyl-6-[N-(4-n-butoxyphenyl)-N-n-octylamino]fluoran,
2-(4-methylanilino)-3-methyl-6-(N,N-diethylamino)fluoran,
2-(4-methylanilino)-3-methyl-6-(N,N-di-n-butylamino)fluoran,
2-(4-methylanilino)-3-methyl-6-(N,N-di-n-hexylamino)fluoran,
2-(4-methylanilino)-3-methyl-6-(N,N-di-n-octylamino)fluoran,
2-(4-methylanilino)-3-methyl-6-(N,N-diphenylamino)fluoran,
2-(4-methylanilino)-3-methyl-6-(N-n-butyl-N-ethylamino)fluoran,
2-(4-methylanilino)-3-methyl-6-(N-ethyl-N-n-hexylamino)fluoran,
2-(4-ethylanilino)-3-methyl-6-(N-ethyl-N-n-octylamino)fluoran,
2-(4-methylanilino)-3-methyl-6-[N-ethyl-N-(4-ethylphenyl)amino]fluoran,
2-(4-methylanilino)-3-methyl-6-[N-(4-chlorophenyl)-N-ethylamino]fluoran,
2-(4-methylanilino)-3-methyl-6-[N-(4-bromophenyl)-N-ethylamino]fluoran,
2-(4-methylanilino)-3-methyl-6-[N-(4-n-butylphenyl)-N-ethylamino]fluoran,
2-(4-n-butylanilino)-3-methyl-6-(N,N-diethylamino)fluoran,
2-(4-n-butylanilino)-3-methyl-6-(N,N-di-n-butylamino)fluoran,
2-(4-n-butylanilino)-3-methyl-6-(N-n-butyl-N-ethylamino)fluoran,
2-(4-n-butylanilino)-3-methyl-6-(N-ethyl-N-n-hexylamino)fluoran,
2-(4-n-butylanilino)-3-methyl-6-(N-ethyl-N-n-octylamino)fluoran,
2-(4-n-butylanilino)-3-methyl-6-[N-ethyl-N-(4-ethylphenyl)amino]fluoran,
2-(4-n-butylanilino)-3-methyl-6-[N-(4-n-butylphenyl)-N-ethylamino]fluoran,
2-(4-methoxyanilino)-3-methyl-6-(N,N-diethylamino)fluoran,
2-(4-ethoxyanilino)-3-methyl-6-(N,N-di-n-butylamino)fluoran,
2-(4-ethoxyanilino)-3-methyl-6-(N-n-butyl-N-ethylamino)fluoran,
2-(4-ethoxyanilino)-3-methyl-6-(N-ethyl-N-n-hexylamino)fluoran,
2-(4-ethoxyanilino)-3-methyl-6-(N-ethyl-N-n-octylamino)fluoran,
2-(4-ethylanilino)-3-methyl-6-[N-ethyl-N-(4-ethylphenyl)amino]fluoran,
2-(4-ethylanilino)-3-methyl-6-[N-(4-n-butylphenyl)-N-ethylamino]fluoran,
6-methyl-2'-(4'-chloroanilino)-3'-methyl-6'-[N-(4'-n-butylphenyl)-N-n-octylamino]fluoran,
7-methyl-2'-(4'-chloroanilino)-3'-methyl-6'-[N-(4'-n-butylphenyl)-N-n-octylamino]fluoran,
6-chloro-2'-(4'-chloroanilino)-3'-methyl-6'-[N-(4'-n-butylphenyl)-N-ethylamino]fluoran,
7-chloro-2'-(4'-chloroanilino)-3'-methyl-6'-[N-(4'-n-butylphenyl)-N-ethylamino]fluoran,
6-ethoxy-2'-(4'-chloroanilino)-3'-methyl-6'-[N-(4'-n-butylphenyl)-N-n-octylamino]fluoran,
7-ethoxy-2'-(4'-chloroanilino)-3'-methyl-6'-[N-(4'-n-butylphenyl)-N-n-octylamino]fluoran,
6,7-dichloro-2'-(4'-chloroanilino)-3'-methyl-6'-[N-(4'-n-butylphenyl)-N-n-octylamino]fluoran, and
6,7-dimethyl-2'-(4'-chloroanilino)-3'-methyl-6'-[N-(4'-n-butylphenyl)-N-n-octylamino]fluoran.

The fluoran derivative represented by formula (Ib) will be described.

[Chem. 7]

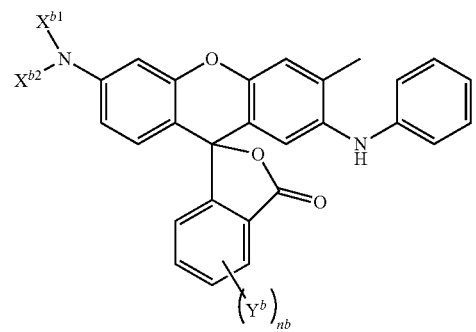

(Ib)

(wherein, nb is 0, 1, or 2, $X^{b1}$ is a hydrogen atom or a linear or branched alkyl group having 1 to 10 carbon atoms, $X^{b2}$ is a hydrogen atom, a linear or branched alkyl group having 1 to 6 carbon atoms, or a linear or branched alkoxy group having 1 to 5 carbon atoms, provided that the total number of carbon atoms of $X^{b1}$ and $X^{b2}$ is 4 to 16, where when $X^{b1}$ or $X^{b2}$ is a hydrogen atom, the number of carbon atoms represented by $X^{b1}$ or $X^{b2}$ is 0, and each $Y^b$ is independently a halogen atom or a linear or branched alkyl group having 1 to 4 carbon atoms).

The reversibly thermochromic composition according to the present invention to which the fluoran derivative represented by formula (Ib) is applied has a large difference in density between the colored state and the decolored state, that is, has excellent contrast between the colored state and the decolored state. In addition, the reversibly thermochromic composition hardly impairs a reversibly thermochromic function of becoming the decolored state in a temperature range not lower than an upper color changing point (complete decoloring temperature) and becoming the colored state in a temperature range not higher than a lower color changing point (complete coloring temperature) even when the temperature is repeatedly changed, and the density in the colored state and the density in the decolored state hardly change even when the reversibly thermochromic composition is repeatedly used.

Regarding $X^{b1}$, examples of a linear or branched alkyl group having 1 to 10 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an n-heptyl group, an n-octyl group, an n-nonyl group, and an n-decyl group.

As $X^{b1}$, a linear or branched alkyl group having 2 to 8 carbon atoms, such as an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an n-heptyl group, or an n-octyl group is preferable because a high density is easily shown in the colored state.

Regarding $X^{b2}$, examples of the linear or branched alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, and an n-hexyl group, and examples of the linear or branched alkoxy group having 1 to 5 carbon atoms include a methoxy group, an ethoxy group, an n-propoxy group, an isopropoxy group, an n-butoxy group, an isobutoxy group, a sec-butoxy group, a tert-butoxy group, an n-pentoxy group, an isopentoxy group, and a neopentoxy group.

As $X^{b2}$, a hydrogen atom or a linear or branched alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a neopentyl group, or an n-hexyl group is preferable because a high density is easily shown in the colored state.

Regarding $Y^b$, examples of the halogen atom include a fluorine atom, a chlorine atom, a bromine atom, and an iodine atom, and examples of the linear or branched alkyl group having 1 to 4 carbon atoms include a methyl group, an ethyl group, an n-propyl group, an isopropyl group, an n-butyl group, an isobutyl group, a sec-butyl group, and a tert-butyl group.

Regarding $Y^b$, from the viewpoint of excellent contrast between the colored state and the decolored state, it is preferable that nb is 0 (that is, it is unsubstituted), or nb is 1 and $Y^b$ is a halogen atom or a linear or branched alkyl group having 1 to 4 carbon atoms, and it is more preferable that nb is 0, or nb is 1 and $Y^b$ is a halogen atom.

Since it is easy to obtain a reversibly thermochromic composition having excellent contrast between the colored state and the decolored state, as the fluoran derivative represented by formula (Ib), preferred are fluoran derivatives in which $X^{b1}$ is a hydrogen atom or a linear or branched alkyl group having 1 to carbon atoms, $X^{b2}$ is a linear or branched alkyl group having 1 to 6 carbon atoms, the total number of carbon atoms of $X^{b1}$ and $X^{b2}$ is 4 to 16, nb is preferably 0, 1, or 2, and each $Y^b$ is independently a halogen atom or a linear or branched alkyl group having 1 to 4 carbon atoms, and in the fluoran derivative having the above structure, the total number of carbon atoms of $X^{b1}$ and $X^{b2}$ is preferably 4 to 12 and more preferably 5 to 11 since the residual color in the decolored state tends to decrease.

In addition, more preferred are fluoran derivatives in which $X^{b1}$ is a linear or branched alkyl group having 1 to 10 carbon atoms, $X^{b2}$ is a linear or branched alkyl group having 1 to 6 carbon atoms, the total number of carbon atoms of $X^{b1}$ and $X^{b2}$ is 4 to 16, nb is 0, 1, or 2, and each $Y^b$ is independently a halogen atom or a linear or branched alkyl group having 1 to 4 carbon atoms, and in the fluoran derivative having the above structure, the total number of carbon atoms of $X^{b1}$ and $X^{b2}$ is preferably 4 to 12 and more preferably 5 to 11.

In addition, still more preferred are fluoran derivatives in which $X^{b1}$ is a linear or branched alkyl group having 2 to 8 carbon atoms, $X^{b2}$ is a linear or branched alkyl group having 1 to 4 carbon atoms, the total number of carbon atoms of $X^{b1}$ and $X^{b2}$ is 4 to 12, nb is 0, 1, or 2, and each $Y^b$ is independently a halogen atom or a linear or branched alkyl group having 1 to 4 carbon atoms, and in the fluoran derivative having the above structure, the total number of carbon atoms of $X^{b1}$ and $X^{b2}$ is preferably 5 to 11 and more preferably 6 to 9.

As the fluoran derivative applied to the present invention, most preferably used is a fluoran derivative in which in formula (Ib), $X^{b1}$ is a linear or branched alkyl group having 2 to 8 carbon atoms, $X^{b2}$ is a linear or branched alkyl group having 1 to 4 carbon atoms, the total number of carbon atoms of $X^{b1}$ and $X^{b2}$ is 6 to 9, nb is 0, 1, or 2, and each $Y^b$ is independently a halogen atom or a linear or branched alkyl group having 1 to 4 carbon atoms.

Examples of the fluoran derivative represented by formula (Ib) applied to the present invention include 2-anilino-3-methyl-6-(N-n-butyl-N-phenylamino)fluoran,
2-anilino-3-methyl-6-(N-phenyl-N-n-hexylamino)fluoran,
2-anilino-3-methyl-6-(N-phenyl-N-n-octylamino)fluoran,
2-anilino-3-methyl-6-(N-n-decyl-N-phenylamino)fluoran,
2-anilino-3-methyl-6-(N-n-butyl-N-p-tolylamino)fluoran,
2-anilino-3-methyl-6-(N-n-hexyl-N-p-tolylamino)fluoran,
2-anilino-3-methyl-6-(N-n-octyl-N-p-tolylamino)fluoran,
2-anilino-3-methyl-6-(N-n-decyl-N-p-tolylamino)fluoran,
2-anilino-3-methyl-6-[N-ethyl-N-(4-ethylphenyl)amino]fluoran,
2-anilino-3-methyl-6-[N-(4-ethylphenyl)-N-n-butylamino]fluoran,
2-anilino-3-methyl-6-[N-(4-ethylphenyl)-N-n-hexylamino]fluoran, 2-anilino-3-methyl-6-[N-(4-ethylphenyl)-N-n-octylamino]fluoran,
2-anilino-3-methyl-6-[N-n-decyl-N-(4-ethylphenyl)amino]fluoran,
2-anilino-3-methyl-6-(4-n-butylphenylamino)fluoran,
2-anilino-3-methyl-6-(4-tert-butylphenylamino)fluoran,
2-anilino-3-methyl-6-[N-(4-n-butylphenyl)-N-ethylamino]fluoran,
2-anilino-3-methyl-6-[N-(4-tert-butylphenyl)-N-ethylamino]fluoran,
2-anilino-3-methyl-6-[N-n-butyl-N-(4-n-butylphenyl)amino]fluoran,
2-anilino-3-methyl-6-[N-n-butyl-N-(4-tert-butylphenyl)amino]fluoran,
2-anilino-3-methyl-6-[N-(4-n-butylphenyl)-N-n-hexylamino]fluoran,
2-anilino-3-methyl-6-[N-(4-tert-butylphenyl)-N-n-hexylamino]fluoran,
2-anilino-3-methyl-6-[N-(4-n-butylphenyl)-N-n-octylamino]fluoran,
2-anilino-3-methyl-6-[N-(4-tert-butylphenyl)-N-n-octylamino]fluoran,
2-anilino-3-methyl-6-[N-(4-n-butylphenyl)-N-n-decylamino]fluoran,
2-anilino-3-methyl-6-[N-(4-tert-butylphenyl)-N-n-decylamino]fluoran,
2-anilino-3-methyl-6-(4-n-hexylphenylamino)fluoran,
2-anilino-3-methyl-6-[N-ethyl-N-(4-n-hexylphenyl)amino]fluoran,
2-anilino-3-methyl-6-[N-n-butyl-N-(4-n-hexylphenyl)amino]fluoran,
2-anilino-3-methyl-6-[N-n-hexyl-N-(4-n-hexylphenyl)amino]fluoran,
2-anilino-3-methyl-6-[N-(4-n-hexylphenyl)-N-n-octylamino]fluoran,
2-anilino-3-methyl-6-[N-n-decyl-N-(4-n-hexylphenyl)amino]fluoran,
2-anilino-3-methyl-6-[N-n-butyl-N-(4-methoxyphenyl)amino]fluoran,
2-anilino-3-methyl-6-[N-n-hexyl-N-(4-methoxyphenyl)amino]fluoran,
2-anilino-3-methyl-6-[N-(4-methoxyphenyl)-N-n-octylamino]fluoran,
2-anilino-3-methyl-6-[N-n-decyl-N-(4-methoxyphenyl)amino]fluoran,
2-anilino-3-methyl-6-[N-ethyl-N-(4-ethoxyphenyl)amino]fluoran,
2-anilino-3-methyl-6-[N-n-butyl-N-(4-ethoxyphenyl)amino]fluoran,
2-anilino-3-methyl-6-[N-(4-ethoxyphenyl)-N-n-hexylamino]fluoran,
2-anilino-3-methyl-6-[N-(4-ethoxyphenyl)-N-n-octylamino]fluoran,
2-anilino-3-methyl-6-[N-n-decyl-N-(4-ethoxyphenyl)amino]fluoran,
2-anilino-3-methyl-6-[N-ethyl-N-(4-isopropoxyphenyl)amino]fluoran,
2-anilino-3-methyl-6-(4-n-butoxyphenylamino)fluoran,
2-anilino-3-methyl-6-[N-(4-n-butoxyphenyl)-N-ethylamino]fluoran,
2-anilino-3-methyl-6-[N-(4-n-butoxyphenyl)-N-n-butylamino]fluoran,
2-anilino-3-methyl-6-[N-(4-n-butoxyphenyl)-N-n-hexylamino]fluoran,
2-anilino-3-methyl-6-[N-(4-n-butoxyphenyl)-N-n-octylamino)fluoran,
2-anilino-3-methyl-6-[N-(4-n-butoxyphenyl)-N-n-decylamino]fluoran,
6-methyl-2'-anilino-3'-methyl-6'-[N-(4'-n-butylphenyl)-N-ethylamino]fluoran,
7-methyl-2'-anilino-3'-methyl-6'-[N-(4'-n-butylphenyl)-N-ethylamino]fluoran,
6-n-butyl-2'-anilino-3'-methyl-6'-[N-(4'-n-butylphenyl)-N-ethylamino]fluoran,
7-n-butyl-2'-anilino-3'-methyl-6'-[N-(4'-n-butylphenyl)-N-ethylamino]fluoran,
6-chloro-2'-anilino-3'-methyl-6'-[N-(4'-n-butylphenyl)-N-ethylamino]fluoran,
7-chloro-2'-anilino-3'-methyl-6'-[N-(4'-n-butylphenyl)-N-ethylamino]fluoran,
6-methyl-2'-anilino-3'-methyl-6'-[N-n-butyl-N-(4'-n-hexylphenyl)amino]fluoran,
7-methyl-2'-anilino-3'-methyl-6'-[N-n-butyl-N-(4'-n-hexylphenyl)amino]fluoran,
6,7-dichloro-2'-anilino-3'-methyl-6'-[N-(4'-ethylphenyl)-N-n-octylamino]fluoran, and
6,7-dimethyl-2'-anilino-3'-methyl-6'-[N-(4'-ethylphenyl)-N-n-octylamino]fluoran.

The component (b), namely an electron-accepting compound, is a compound which receives an electron(s) from the component (a) and functions as a color developer of the component (a).

Examples of the electron-accepting compounds include compounds selected from compounds having active protons, pseudo-acidic compounds (compounds which are not acids but each act as an acid in a reversibly thermochromic composition to cause the component (a) to develop a color), and compounds having electron holes. Among the components (b), a compound selected from the compounds having active protons is preferable.

Examples of the compounds having active protons include phenolic hydroxy group-containing compounds and derivatives thereof, carboxylic acids and derivatives thereof, acidic phosphoric esters and derivatives thereof, azole-based compounds and derivatives thereof, 1,2,3-triazole and derivatives thereof, cyclic carbosulfoimides, halohydrins having 2 to 5 carbon atoms, sulfonic acids and derivatives thereof, and inorganic acids. As the carboxylic acid and the derivative thereof, an aromatic carboxylic acid and a derivative thereof, or an aliphatic carboxylic acid having 2 to 5 carbon atoms and a derivative thereof are preferable.

Examples of the pseudo-acidic compounds include metal salts of phenolic hydroxy group-containing compounds, metal salts of carboxylic acids, metal salts of acidic phosphoric esters, metal salts of sulfonic acids, aromatic carboxylic anhydrides, aliphatic carboxylic anhydrides, mixed anhydrides of aromatic carboxylic acids and sulfonic acids, cycloolefin dicarboxylic anhydrides, urea and derivatives thereof, thiourea and derivatives thereof, guanidine and derivatives thereof, and halogenated alcohols.

Examples of the compounds having electron holes include borates, borate esters, and inorganic salts.

Among the components (b), the phenolic hydroxy group-containing compound is preferable because thermochromic properties can be more effectively developed.

The phenolic hydroxy group-containing compounds include a wide range of compounds, ranging from monophenol compounds to polyphenol compounds, and bisphenol compounds, trisphenol compounds, phenol-aldehyde condensation resins and the like are also included therein. Among the phenolic hydroxy group-containing compounds, those which contain at least two benzene rings are preferred. The phenolic hydroxy group-containing compound may also have a substituent, such as an alkyl group, an aryl group, an acyl group, an alkoxycarbonyl group, a carboxyl group, and an ester thereof, as well as an amide group and a halogen atom.

Examples of the metal contained in the metal salts of the phenolic hydroxy group-containing compound and the like include sodium, potassium, calcium, zinc, zirconium, aluminum, magnesium, nickel, cobalt, tin, copper, iron, vanadium, titanium, lead, and molybdenum.

Examples of the compound of the component (b) are shown below.

Examples of the compound having one phenolic hydroxy group include
phenol,
o-cresol,
m-cresol,
p-cresol,
4-ethylphenol,
4-n-propylphenol,
4-n-butylphenol,
2-tert-butylphenol,
3-tert-butylphenol,
4-tert-butylphenol,
4-n-pentylphenol,
4-tert-pentylphenol,
4-n-octylphenol,
4-tert-octylphenol,
4-n-nonylphenol,
4-n-dodecylphenol,
3-n-pentadecylphenol,
4-n-stearylphenol,
1-(4-hydroxyphenyl)decane-1-one,
4-chlorophenol,
4-bromophenol,
4-trifluoromethylphenol,
4-methylthiophenol,
4-nitrophenol,
2-phenylphenol,
4-phenylphenol,
2-benzylphenol,
2-benzyl-4-chlorophenol,
4-cumylphenol,
4-hydroxybenzophenone,
4-chloro-4'-hydroxybenzophenone,
4-fluoro-4'-hydroxybenzophenone,
4-cyclohexylphenol,
2-hydroxybenzyl alcohol,
3-hydroxybenzyl alcohol,
4-hydroxybenzyl alcohol,
4-(2-hydroxyethyl)phenol,
3-methoxyphenol,
4-ethoxyphenol,
4-n-propoxyphenol,
4-n-butoxyphenol,
4-n-heptyloxyphenol,
4-(2-methoxyethyl)phenol,
α-naphthol,
β-naphthol,
2,3-dimethylphenol,
2,4-dimethylphenol,
2,6-dimethylphenol,
2,6-di-tert-butylphenol,
2,4-dichlorophenol,
2,4-difluorophenol,
thymol,
3-methyl-4-methylthiophenol,
2-tert-butyl-5-methylphenol,
2,6-bis(hydroxymethyl)-4-methylphenol,
2,3,5-trimethylphenol,
2,6-bis(hydroxymethyl)-4-tert-octylphenol,
6-hydroxy-1,3-benzooxathiol-2-one,
2,4-bis(phenylsulfonyl)phenol,
2,4-bis(phenylsulfonyl)-5-methylphenol,
2,4-bis(4-methylphenylsulfonyl)phenol,
2-phenylphenol,
4-phenylphenol,
2,6-diphenylphenol,
3-benzylbiphenyl-2-ol,
3,5-dibenzylbiphenyl-4-ol,
4-cyano-4'-hydroxybiphenyl,
1-hydroxybenzotriazole,
1-hydroxy-5-methylbenzotriazole,
1-hydroxy-5-chlorobenzotriazole,
1-hydroxy-5-methoxybenzotriazole,
1-hydroxy-4-benzoylaminobenzotriazole,
1-hydroxy-4,5,6,7-tetrachlorobenzotriazole,
1,4-hydroxybenzotriazole,
1-hydroxy-5-nitrobenzotriazole,
1-hydroxy-5-phenylbenzotriazole,
1-hydroxy-5-benzylbenzotriazole,
1-hydroxy-5-ethylbenzotriazole,
1-hydroxy-5-n-octylbenzotriazole,
1-hydroxy-5-n-butylbenzotriazole,
n-butyl 4-hydroxybenzoate,
n-octyl 4-hydroxybenzoate,
4-hydroxybenzoate 2-heptadecafluorooctylethane,
benzyl 4-hydroxybenzoate,
4-hydroxybenzoate-o-methylbenzyl,
4-hydroxybenzoate-m-methylbenzyl,
4-hydroxybenzoate-p-methylbenzyl,
4-hydroxybenzoate-p-ethylbenzyl,
4-hydroxybenzoate-p-propylbenzyl,
4-hydroxybenzoate-p-tert-butylbenzyl,
phenylethyl 4-hydroxybenzoate,
4-hydroxybenzoate-o-methylphenylethyl,
4-hydroxybenzoate-m-methylphenylethyl,
4-hydroxybenzoate-p-methylphenylethyl,
4-hydroxybenzoate-p-ethylphenylethyl,
4-hydroxybenzoate-p-propylphenylethyl, and
4-hydroxybenzoate-p-tert-butylphenylethyl.

Examples of the compound having two phenolic hydroxy groups include
resorcin,
2-methylresorcin,
4-n-hexylresorcin,
4-n-octylresorcin,
4-tert-octylresorcin,
4-benzoylresorcin,
4-nitroresorcin,
methyl β-resorcinol,
benzyl β-resorcinol,
2-chloro-4-pentanoylresorcin,
6-chloro-4-pentanoylresorcin,
2-chloro-4-hexanoylresorcin,
6-chloro-4-hexanoylresorcin,
2-chloro-4-propanoylresorcin,
6-chloro-4-propanoylresorcin,
2,6-dichloro-4-propanoylresorcin,
6-fluoro-4-propanoylresorcin,
2-chloro-4-phenylacetylresorcin,
6-chloro-4-phenylacetylresorcin,
2-chloro-4-β-phenylpropanoylresorcin,
6-chloro-4-β-phenylpropanoylresorcin,
2-chloro-4-phenoxyacetylresorcin, 6-chloro-4-phenoxyacetylresorcin,
4-benzoyl-2-chlororesorcin,
6-chloro-4-m-methylbenzoylresorcin,
4-[1',3',4',9'a-tetrahydro-6'-hydroxyspiro(cyclohexane-1,9'-[9H]-xanthene)-4'a-[2H]-yl]-1,3-benzenediol,
hydroquinone,
methyl hydroquinone,
trimethyl hydroquinone,
catechol,
4-tert-butylcatechol,
1,6-dihydroxynaphthalene,
2,7-dihydroxynaphthalene,
1,5-dihydroxynaphthalene,
2,6-dihydroxynaphthalene,
2,4-dihydroxybenzophenone,
4,4'-dihydroxybenzophenone,
2,4-dihydroxy-2'-methylbenzophenone,
2,4-dihydroxy-3'-methylbenzophenone,
2,4-dihydroxy-4'-methylbenzophenone,
2,4-dihydroxy-4'-ethylbenzophenone,
2,4-dihydroxy-4'-n-propylbenzophenone,
2,4-dihydroxy-4'-isopropylbenzophenone,
2,4-dihydroxy-4'-n-butylbenzophenone,
2,4-dihydroxy-4'-isobutylbenzophenone,
2,4-dihydroxy-4'-tert-butylbenzophenone,
2,4-dihydroxy-4'-n-pentylbenzophenone,
2,4-dihydroxy-4'-n-hexylbenzophenone,
2,4-dihydroxy-4'-n-heptylbenzophenone,
2,4-dihydroxy-4'-n-octylbenzophenone,
2,4-dihydroxy-4'-n-decylbenzophenone,
2,4-dihydroxy-2',3'-dimethylbenzophenone,
2,4-dihydroxy-2',4'-dimethylbenzophenone,
2,4-dihydroxy-2',5'-dimethylbenzophenone,
2,4-dihydroxy-2',6'-dimethylbenzophenone,
2,4-dihydroxy-3',4'-dimethylbenzophenone,
2,4-dihydroxy-3',5'-dimethylbenzophenone,
2,4-dihydroxy-2',4',6'-trimethylbenzophenone,
2,4-dihydroxy-2'-methoxybenzophenone,
2,4-dihydroxy-3'-methoxybenzophenone,
2,4-dihydroxy-4'-methoxybenzophenone,
2,4-dihydroxy-2'-ethoxybenzophenone,
2,4-dihydroxy-4'-ethoxybenzophenone,
2,4-dihydroxy-4'-n-propoxybenzophenone,
2,4-dihydroxy-4'-isopropoxybenzophenone,
2,4-dihydroxy-4'-n-butoxybenzophenone,
2,4-dihydroxy-4'-isobutoxybenzophenone,
2,4-dihydroxy-4'-n-pentyloxybenzophenone,
2,4-dihydroxy-4'-n-hexyloxybenzophenone,
2,4-dihydroxy-4'-n-heptyloxybenzophenone,
2,4-dihydroxy-4'-n-octyloxybenzophenone,
2,4-dihydroxy-4'-n-nonyloxybenzophenone,
2,4-dihydroxy-2',3'-dimethoxybenzophenone,
2,4-dihydroxy-2',4'-dimethoxybenzophenone,
2,4-dihydroxy-2',5'-dimethoxybenzophenone,
2,4-dihydroxy-2',6'-dimethoxybenzophenone,
2,4-dihydroxy-3',4'-dimethoxybenzophenone,
2,4-dihydroxy-3',5'-dimethoxybenzophenone,
2,4-dihydroxy-3',4'-diethoxybenzophenone,
2,4-dihydroxy-2',3',4'-trimethoxybenzophenone,
2,4-dihydroxy-2',3',6'-trimethoxybenzophenone,
2,4-dihydroxy-3',4',5'-trimethoxybenzophenone, and
2,4-dihydroxy-3',4',5'-triethoxybenzophenone.

In addition, examples of the bisphenol compound include
1,1-bis(4-hydroxyphenyl)ethane,
1,1-bis(4-hydroxyphenyl)propane,
1,1-bis(4-hydroxyphenyl)n-butane,
1,1-bis(4-hydroxyphenyl)n-pentane,
1,1-bis(4-hydroxyphenyl)n-hexane,
1,1-bis(4-hydroxyphenyl)n-heptane,
1,1-bis(4-hydroxyphenyl)n-octane,
1,1-bis(4-hydroxyphenyl)n-nonane,
1,1-bis(4-hydroxyphenyl)n-decane,
1,1-bis(4-hydroxy-3-methylphenyl)decane,
1,1-bis(4-hydroxyphenyl)n-dodecane,
1,1-bis(4-hydroxyphenyl)-2-methylpropane,
1,1-bis(4-hydroxyphenyl)-3-methylbutane,
1,1-bis(4-hydroxyphenyl)-3-methylpentane,
1,1-bis(4-hydroxyphenyl)-2,3-dimethylpentane,
1,1-bis(4-hydroxyphenyl)-2-ethylbutane,
1,1-bis(4-hydroxyphenyl)-2-ethylhexane,
1,1-bis(4-hydroxyphenyl)-3,7-dimethyloctane,
1,1-bis(4-hydroxyphenyl)cyclohexane,
1,1-bis(4-hydroxyphenyl)-3,3,5-trimethylcyclohexane,
1,1-bis(4-hydroxy-3-methyl)cyclohexane,
diphenolic acid,
1-phenyl-1,1-bis(4-hydroxyphenyl)methane,
2,2-bis(4-hydroxyphenyl)propane,
2,2-bis(4-hydroxyphenyl)n-butane,
2,2-bis(4-hydroxyphenyl)n-pentane,
2,2-bis(4-hydroxyphenyl)n-hexane,
2,2-bis(4-hydroxyphenyl)n-heptane,
2,2-bis(4-hydroxyphenyl)n-octane,
2,2-bis(4-hydroxyphenyl)n-nonane,
2,2-bis(4-hydroxyphenyl)n-decane,
2,2-bis(4-hydroxyphenyl)n-dodecane,
2,2-bis(4-hydroxyphenyl)-6,10,14-trimethylpentadecane,
1-phenyl-1,1-bis(4-hydroxyphenyl)ethane,
2,2-bis(4-hydroxyphenyl)methylpropionate,
2,2-bis(4-hydroxyphenyl)butylpropionate,
2,2-bis(4-hydroxy-3-methylphenyl)methylpropionate,
2,2-bis(4-hydroxyphenyl)ethylpropionate,
2,2-bis(4-hydroxyphenyl)-4-methylpentane,
2,2-bis(4-hydroxyphenyl)-4-methylhexane,
2,2-bis(4-hydroxyphenyl)hexafluoropropane,
2,2-bis(3,5-dihydroxymethyl-4-hydroxyphenyl)hexafluoropropane,
2,2-bis(4-hydroxy-3-methylphenyl)propane,
2,2-bis(4-hydroxy-3-methylphenyl)butane,
2,2-bis(4-hydroxy-3-isopropylphenyl)propane,
2,2-bis(3-sec-butylphenyl-4-hydroxy)propane,
2,2-bis(4-hydroxy-3-phenylphenyl)propane,
2,2-bis(3-tert-butyl-4-hydroxyphenyl)propane,
2,2-bis(3-fluoro-4-hydroxyphenyl)propane,
2,2-bis(3,5-dihydroxymethyl-4-hydroxyphenyl)propane,
9,9-bis(4-hydroxy-3-methylphenyl)fluorene,
1,3-bis[2-(4-hydroxyphenyl)-2-propyl]benzene,
1,4-bis[2-(4-hydroxyphenyl)-2-propyl]benzene,
3,3-bis(4-hydroxyphenyl)oxindole,
3,3-bis(4-hydroxy-3-methylphenyl)oxindole,
bis(2-hydroxyphenyl)methane,
bis(2-hydroxy-5-methylphenyl)methane,
bis(2-hydroxy-3-hydroxymethyl-5-methyl)methane,
4,4'-[1,4-phenylenebis(1-methylethylidene)]bis(2-methylphenol),
1,1-bis(4-hydroxy-3-phenylphenyl)cyclohexane,
3,3-ethyleneoxydiphenol,
1,4-bis(4-hydroxybenzoart)-3-methylbenzene,
4,4"-dihydroxy-3"-methyl-p-terphenyl,
4,4"-dihydroxy-3"-isopropyl-p-terphenyl,
2,2-dimethyl-1,3-bis(4-hydroxybenzoyloxy)propane,
2,2'-biphenol,
4,4'''-dihydroxy-p-quaterphenyl,
4,4-dihydroxydiphenylether,
bis(4-hydroxyphenylthioethyl)ether, bis(4-hydroxyphenyl)sulfone,
4-benzyloxy-4'-hydroxydiphenylsulfone,
4-(4-methylbenzyloxy)-4'-hydroxydiphenylsulfone,
4-(4-ethylbenzyloxy)-4'-hydroxydiphenylsulfone,
4-(4-n-propylbenzyloxy)-4'-hydroxydiphenylsulfone,
4-(4-isopropylbenzyloxy)-4'-hydroxydiphenylsulfone,
4-(4-n-butylbenzyloxy)-4'-hydroxydiphenylsulfone,
4-(4-isobutylbenzyloxy)-4'-hydroxydiphenylsulfone,
4-(4-sec-butylbenzyloxy)-4'-hydroxydiphenylsulfone,
4-(4-tert-butylbenzyloxy)-4'-hydroxydiphenylsulfone,
4-(3-methylbenzyloxy)-4'-hydroxydiphenylsulfone,
4-(3-ethylbenzyloxy)-4'-hydroxydiphenylsulfone,
4-(3-n-propylbenzyloxy)-4'-hydroxydiphenylsulfone,
4-(3-isopropylbenzyloxy)-4'-dihydroxyphenyl sulfone,
4-(3-n-butylbenzyloxy)-4'-hydroxydiphenylsulfone,
4-(3-isobutylbenzyloxy)-4'-hydroxydiphenylsulfone,
4-(3-sec-butylbenzyloxy)-4'-hydroxydiphenylsulfone,
4-(3-tert-butylbenzyloxy)-4'-hydroxydiphenylsulfone,
4-(2-methylbenzyloxy)-4'-hydroxydiphenylsulfone,
4-(2-ethylbenzyloxy)-4'-hydroxydiphenylsulfone,
4-(2-n-propylbenzyloxy)-4'-hydroxydiphenylsulfone,
4-(2-isopropylbenzyloxy)-4'-hydroxydiphenylsulfone,
4-(2-n-butylbenzyloxy)-4'-hydroxydiphenylsulfone,
4-(2-isobutylbenzyloxy)-4'-hydroxydiphenylsulfone,
4-(2-sec-butylbenzyloxy)-4'-hydroxydiphenylsulfone,
4-(2-tert-butylbenzyloxy)-4'-hydroxydiphenylsulfone,
2,4'-dihydroxydiphenylsulfone,
3,4'-dihydroxydiphenylsulfone,
4-hydroxydiphenylsulfone,
4-methyl-4'-hydroxydiphenylsulfone,
4-ethyl-4'-hydroxydiphenylsulfone,
4-n-propyl-4'-hydroxydiphenylsulfone,
4-isopropyl-4'-hydroxydiphenylsulfone,
4-chloro-4'-hydroxydiphenylsulfone,
4-fluoro-4'-hydroxydiphenylsulfone,
4-chloro-2-methyl-4'-hydroxydiphenylsulfone,
4-methoxy-4'-hydroxydiphenylsulfone,
4-ethoxy-4'-hydroxydiphenylsulfone,
4-n-propoxy-4'-hydroxydiphenylsulfone,
4-isopropoxy-4'-hydroxydiphenylsulfone,
4-n-butyloxy-4'-hydroxydiphenylsulfone,
4-isobutoxy-4'-hydroxydiphenylsulfone,
4-sec-butoxy-4'-hydroxydiphenylsulfone,
4-tert-butyl-4'-hydroxydiphenylsulfone,
4-n-pentyloxy-4'-hydroxydiphenylsulfone,
4-isopentyloxy-4'-hydroxydiphenylsulfone,
4-(1-propenyloxy)-4'-hydroxydiphenylsulfone,
4-(2-propenyloxy)-4'-hydroxydiphenylsulfone,
4-benzyloxy-4'-hydroxydiphenylsulfone,
4-(β-phenoxyethoxy)-4'-hydroxydiphenylsulfone,
4-(D-phenoxypropoxyl)-4'-hydroxydiphenylsulfone,
bis(2-allyl-4-hydroxydiphenyl)sulfone,
bis[4-hydroxy-3-(2-propenyl)phenyl]sulfone,
bis(3,5-dibromo-4-hydroxyphenyl)sulfone,
bis(3,5-dichloro-4-hydroxyphenyl)sulfone,
bis(3-phenyl-4-hydroxyphenyl)sulfone,
bis(4-hydroxy-3-n-propylphenyl)sulfone,
bis(4-hydroxy-3-methylphenyl)sulfone,
3,4-dihydroxydiphenylsulfone,
3',4'-dihydroxy-4-methyldiphenylsulfone,
3,4,4'-trihydroxydiphenylsulfone,
bis(3,4-dihydroxyphenyl)sulfone,
2,3,4-trihydroxydiphenylsulfone,
4-isopropoxy-4'-hydroxydiphenylsulfone,
4-n-propoxy-4'-hydroxydiphenylsulfone,
4-allyloxy-4'-hydroxydiphenylsulfone,
4-benzyloxy-4'-hydroxydiphenylsulfone,
4-(2-propenyloxy)-4'-hydroxydiphenylsulfone,
3-benzyl-4-benzyloxy-4'-hydroxydiphenylsulfone,
3-phenethyl-4-phenethyloxy-4'-hydroxydiphenylsulfone,
3-methylbenzyl-4-methylbenzyloxy-4'-hydroxydiphenylsulfone,
4-benzyloxy-3'-benzyl-4'-hydroxydiphenylsulfone,
4-phenethyloxy-3'-phenethyl-4'-hydroxydiphenylsulfone,
4-methylbenzyloxy-3'-methylbenzyl-4'-hydroxydiphenylsulfone,
α,α'-bis{4-(p-hydroxyphenyl sulfone)phenoxy}-p-xylene,
4,4'-{oxybis(ethyleneoxide-p-phenylenesulfonyl)}diphenol,
bis(4-hydroxyphenyl)sulfide,
bis(4-hydroxy-3-methylphenyl)sulfide,
bis(3,5-dimethyl-4-hydroxyphenyl)sulfide,
bis(3-ethyl-4-hydroxyphenyl)sulfide,
bis(3,5-diethyl-4-hydroxyphenyl)sulfide,
bis(4-hydroxy-3-n-propylphenyl)sulfide,
bis(3,5-di-n-propyl-4-hydroxyphenyl)sulfide,
bis(3-tert-butyl-4-hydroxyphenyl)sulfide,
bis(3,5-di-tert-butyl-4-hydroxyphenyl)sulfide,
bis(4-hydroxy-3-n-pentylphenyl)sulfide,
bis(3-n-hexyl-4-hydroxyphenyl)sulfide,
bis(3-n-heptyl-4-hydroxyphenyl)sulfide,
bis(5-tert-octyl-2-hydroxyphenyl)sulfide,
bis(2-hydroxy-3-tert-octylphenyl)sulfide,
bis(2-hydroxy-5-n-octyl-phenyl)sulfide,
bis(5-chloro-2-hydroxyphenyl)sulfide,
bis(3-cyclohexyl-4-hydroxyphenyl)sulfide,
bis(4-hydroxyphenylthioethoxy)methane,
1,5-(4-hydroxyphenylthio)-3-oxypentane, and
1,8-bis(4-hydroxyphenylthio)-3,6-dioxaoctane.

Examples of the compound having three phenolic hydroxy groups include pyrogallol, phloroglucinol, phloroglucinolcarboxylic acid, gallic acid, octyl gallate, and dodecyl gallate.

In addition, examples of the trisphenol compound include
4,4',4''-methylidinetrisphenol,
4,4',4''-methylidinetris(2-methylphenol),
4,4'-[(2-hydroxyphenyl)methylene]bis(2,3,5-trimethylphenol),
4,4'-[(4-hydroxyphenyl)methylene]bis(2-methylphenol),
4,4'-[(4-hydroxyphenyl)methylene]bis(2,6-dimethylphenol),
4,4'-[(4-hydroxy-3-methoxyphenyl)methylene]bisphenol,
4,4'-[(4-hydroxyphenyl)methylene]bis(2-cyclohexyl-5-methylphenol),
4,4',4''-ethylidinetrisphenol,
4,4',4''-ethylidinetris(2-methylphenol),
4,4'-[(2-hydroxyphenyl)methylene]bis(2-cyclohexyl-5-methylphenol),
2,6-bis[(2-hydroxy-5-methylphenyl)methyl]-4-methylphenol,
2,4-bis[(2-hydroxy-5-methylphenyl)methyl]-6-cyclohexylphenol,
4,4'-[1-{4-[1-(4-hydroxyphenyl)-1-methylethyl]phenyl}methylidene]bisphenol,
4,4'-[1-{4-[1-(4-hydroxyphenyl)-1-methylethyl]phenyl}ethylidene]bisphenol,
4,4'-[1-{4-[1-(4-hydroxyphenyl)-1-methylethyl]phenyl}propylidene]bisphenol,
4,4'-[1-{4-[1-(4-hydroxyphenyl)-1-methylethyl]phenyl}butylidene]bisphenol,
4,4'-[1-{4-[1-(4-hydroxyphenyl)-1-methylethyl]phenyl}pentylidene]bisphenol,
4,4'-[1-{4-[1-(4-hydroxyphenyl)-1-methylethyl]phenyl}hexylidene]bisphenol, 4,4'-[1-{4-[1-(4-hydroxyphenyl)-1-methylethyl]phenyl}heptylidene]bisphenol,
4,4'-[1-{4-[1-(4-hydroxyphenyl)-1-methylethyl]phenyl}isobutylidene]bisphenol,
4,4'-[1-{4-[1-(4-hydroxyphenyl)-1-methylethyl]phenyl}neopentylidene]bisphenol,
2,2'-[1-{4-[1-(2-hydroxyphenyl)-1-methylethyl]phenyl}ethylidene]bisphenol,
3,3'-[1-{4-[1-(3-hydroxyphenyl)-1-methylethyl]phenyl}ethylidene]bisphenol,
4,4'-[1-{4-[1-(3-fluoro-4-hydroxyphenyl)-1-methylethyl]phenyl}ethylidene]bis(2-fluorophenol),
4,4'-[1-{4-[1-(3-chloro-4-hydroxyphenyl)-1-methylethyl]phenyl}ethylidene]bis(2-chlorophenol),
4,4'-[1-{4-[1-(3-bromo-4-hydroxyphenyl)-1-methylethyl]phenyl}ethylidene]bis(2-bromophenol),
4,4'-[1-{4-[1-(4-hydroxy-3-methylphenyl)-1-methylethyl]phenyl}ethylidene]bis(2-methylphenol),
4,4'-[1-{4-[1-(3-ethyl-4-hydroxyphenyl)-1-methylethyl]phenyl}ethylidene]bis(2-ethylphenol),
4,4'-[1-{4-[1-(3-tert-butyl-4-hydroxyphenyl)-1-methylethyl]phenyl}ethylidene]bis(2-tert-butylphenol),
4,4'-[1-{4-[1-(4-hydroxy-3-trifluoromethylphenyl)-1-methylethyl]phenyl}ethylidene]bis(2-trifluoromethylphenol),
1,1-bis(4-hydroxyphenyl)-4-(4-hydroxy-α-ethyl)benzylcyclohexane,
4,4'-[(3-ethoxy-4-hydroxyphenyl)methylene]bisphenol,
4,4'-[(3-hydroxyphenyl)methylene]bis(2,6-dimethylphenol),
2,2'-[(4-hydroxyphenyl)methylene]bis(3,5-dimethylphenol),
4,4'-[(4-hydroxy-3-methoxyphenyl)methylene]bis(2,6-dimethylphenol),
2,2'-[(2-hydroxyphenyl)methylene]bis(3,5,6-trimethylphenol),
4,4'-[(3-hydroxyphenyl)methylene]bis(2,3,6-trimethylphenol),
4,4'-[(4-hydroxyphenyl)methylene]bis(2,3,6-trimethylphenol),
4,4'-[(3-hydroxyphenyl)methylene]bis(2-cyclohexyl-5-methylphenol),
4,4'-[(4-hydroxyphenyl-3-methoxy)methylene]bis(2-cyclohexyl-5-methylphenol),
1,1-bis(4-hydroxyphenyl)-4-hydroxyphenylcyclohexane,
4,4'-[3-(5-cyclohexyl-4-hydroxy-2-methylphenyl)-3-phenyl)propylidene]bis(2-cyclohexyl-5-methylphenol),
4,4'-[(2-hydroxyphenyl)methylene]bis(2-methylphenol),
2,4',4"-methylidinetrisphenol,
4,4'-[(2-hydroxyphenyl)methylene]bis(3-methylphenol),
4,4'-[4-(4-hydroxyphenyl)-sec-butylidene]bis(4-hydroxyphenol),
2,2'-[(3-hydroxyphenyl)methylene]bis(3,5-dimethylphenol),
4,4'-[(2-hydroxy-3-methoxyphenyl)methylene]bis(2,5-dimethylphenol),
4,4'-[(2-hydroxy-3-methoxyphenyl)methylene]bis(2,6-dimethylphenol),
2,2'-[(2-hydroxy-3-methoxyphenyl)methylene]bis(3,5-dimethylphenol),
2,2'-[(3-hydroxy-4-methoxyphenyl)methylene]bis(3,5-dimethylphenol),
2,2'-[(4-hydroxy-3-methoxyphenyl)methylene]bis(3,5-dimethylphenol),
4,4'-[(2-hydroxyphenyl)methylene]bis(2-isopropylphenol),
4,4'-[(3-hydroxyphenyl)methylene]bis(2-isopropylphenol),
4,4'-[(4-hydroxyphenyl)methylene]bis(2-isopropylphenol),
2,2'-[(3-hydroxyphenyl)methylene]bis(3,5,6-trimethylphenol),
2,2'-[(4-hydroxyphenyl)methylene]bis(3,5,6-trimethylphenol),
2,2'-[(4-3-ethoxy-4-hydroxyphenyl)methylene]bis(3,5-dimethylphenol),
1,1-bis(4-hydroxy-3-methylphenyl)-4-(4-hydroxyphenyl)cyclohexane,
4,4'-[(2-hydroxy-3-methoxyphenyl)methylene]bis(2-isopropylphenol),
4,4'-[(3-hydroxy-4-methoxyphenyl)methylene]bis(2-isopropylphenol),
4,4'-[(4-hydroxy-3-methoxyphenyl)methylene]bis(2-isopropylphenol),
2,2'-[(2-hydroxy-3-methoxyphenyl)methylene]bis(3,5,6-trimethylphenol,
2,2'-[(3-hydroxy-4-methoxyphenyl)methylene]bis(3,5,6-trimethylphenol),
2,2'-[(4-hydroxy-3-methoxyphenyl)methylene]bis(3,5,6-trimethylphenol),
4,4'-[(3-ethoxy-4-hydroxyphenyl)methylene]bis(2-isopropylphenol),
2,2'-[(3-ethoxy-4-hydroxyphenyl)methylene]bis(3,5,6-trimethylphenol),
4,4'-[(3-ethoxy-4-hydroxyphenyl)methylene]bis(2,3,6-trimethylphenol),
1,1-bis(3,5-dimethyl-4-hydroxyphenyl)-4-(4-hydroxyphenyl)cyclohexane,
4,4'-[(4-hydroxy-3-methoxyphenyl)methylene]bis(2-tert-butyl-5-methylphenol),
4,4'-[(2-hydroxyphenyl)methylene]bis(2-cyclohexylphenol),
4,4'-[(3-hydroxyphenyl)methylene]bis(2-cyclohexylphenol),
4,4'-[(3-ethoxy-4-hydroxyphenyl)methylene]bis(2-tert-butyl-6-methylphenol),
4,4'-[(3-methoxy-2-hydroxyphenyl)methylene]bis(2-cyclohexylphenol),
4,4'-[(3-hydroxy-4-methoxyphenyl)methylene]bis(2-cyclohexylphenol),
4,4'-[1-{4-[1-(3-fluoro-4-hydroxyphenyl)-1-methylethyl]phenyl}ethylidene]bis(2-tert-butylphenol),
4,4'-[1-{4-[1-(3,5-dimethyl-4-hydroxyphenyl)-1-methylethyl]phenyl}ethylidene]bis(2,6-dimethylphenol),
4,4'-[(3-ethoxy-4-hydroxyphenyl)methylene]bis(2-cyclohexyl-5-methylphenol),
4,4'-[(3-cyclohexyl-4-hydroxyphenyl)ethylidene]bis(2-cyclohexylphenol),
4,4'-[(5-cyclohexyl-4-hydroxy-2-methoxyphenyl)ethylidene]bis(2-cyclohexyl-5-methylphenol),
4,4'-[1-{4-[1-(3-cyclohexyl-4-hydroxyphenyl)-1-methylethyl]phenyl}ethylidene]bis(2-cyclohexylphenol),
4,4'-[1-{4-[1-(3-fluoro-4-hydroxyphenyl)-1-methylethyl]phenyl}ethylidene]bisphenol,
4,4'-[1-{4-[1-(3-fluoro-4-hydroxyphenyl)-1-methylethyl]phenyl}ethylidene]bis(2-methylphenol),
4,4'-[1-{4-[1-(3-fluoro-4-hydroxyphenyl)-1-methylethyl]phenyl}ethylidene]bis(2,6-dimethylphenol),
2,6-bis[(5-fluoro-2-hydroxyphenyl)methyl]-4-methylphenol,
2,6-bis[(3,5-dimethyl-4-hydroxyphenyl)methyl]-4-methylphenol,
2,6-bis[(4-hydroxyphenyl)methyl]-4-methylphenol,
2,6-bis[(4-hydroxyphenyl)methyl]-4-ethylphenol,
2,4-bis[(4-hydroxy-3-methylphenyl)methyl]-6-methylphenol, 2,6-bis[(4-hydroxy-3-methylphenyl)methyl]-4-methylphenol,
2,6-bis[(4-hydroxy-3-methylphenyl)methyl]-4-ethylphenol,
2,6-bis[(2-hydroxy-5-methylphenyl)methyl]-4-ethylphenol,
2,6-bis[(3,5-dimethyl-2-hydroxyphenyl)methyl]-4-methylphenol,
2,6-bis[(2,4-dimethyl-6-hydroxyphenyl)methyl]-4-methylphenol,
2,4-bis[(4-hydroxyphenyl)methyl]-6-cyclohexylphenol,
2,6-bis[(2,5-dimethyl-4-hydroxyphenyl)methyl]-3,4-dimethylphenol,
2,6-bis[(2,5-dimethyl-4-hydroxyphenyl)methyl]-4-ethylphenol,
2,6-bis[(4-hydroxy-2,3,6-trimethylphenyl)methyl]-4-methylphenol,
2,4-bis[(4-hydroxy-3-methylphenyl)methyl]-6-cyclohexylphenol,
2,6-bis[(4-hydroxy-3-methylphenyl)methyl]-4-cyclohexylphenol,
2,6-bis[(2-hydroxy-5-methylphenyl)methyl]-4-cyclohexylphenol,
2,6-bis[(4-hydroxy-2,3,5-trimethylphenyl)methyl]-4-ethylphenol,
2,4-bis[(2,5-dimethyl-4-hydroxyphenyl)methyl]-6-cyclohexylphenol,
4,4',4''-methylidinetris(2,6-dimethylphenol),
α-(4-hydroxy-3-methylphenyl)-α,α'-bis(4-hydroxyphenyl)-1-ethyl-4-isopropylbenzene,
α'-(4-hydroxy-3-methylphenyl)-α,α-bis(4-hydroxyphenyl)-1-ethyl-4-isopropylbenzene,
α,α-bis(4-hydroxy-3-methylphenyl)-α'-(4-hydroxyphenyl)-1-ethyl-4-isopropylbenzene,
α,α'-bis(4-hydroxy-3-methylphenyl)-α-(4-hydroxyphenyl)-1-ethyl-4-isopropylbenzene,
1,1-bis(4-hydroxyphenyl)-4-[1-(4-hydroxyphenyl)-1-methylpropyl]cyclohexane,
2,6-bis[(3,5-dimethyl-4-hydroxyphenyl)methyl]-4-ethylphenol,
1,1'-bis(4-hydroxyphenyl)-4-[1-(4-hydroxyphenyl)propyl]cyclohexane,
1,1'-bis(4-hydroxy-3-methylphenyl)-4-[1-(4-hydroxyphenyl)propyl]cyclohexane,
1,1'-bis(3,5-dimethyl-4-hydroxyphenyl)-4-[1-(4-hydroxyphenyl)propyl]cyclohexane,
1-(4-hydroxyphenyl)-1-[4,4-bis(4-hydroxyphenyl)cyclohexyl]-4-isopropylcyclohexane,
4,4'-[3-(2,5-dimethyl-4-hydroxyphenyl)butylene]bis(2,5-dimethylphenol),
1,3,5-tri(4-hydroxy-3-phenylphenyl)adamantane,
1,3,5-tri(3-cyclohexyl-4-hydroxyphenyl)adamantane,
2,4-bis[(3,5-dimethyl-4-hydroxyphenyl)methyl]-6-cyclohexylphenol,
2,6-bis[(2,5-dimethyl-4-hydroxyphenyl)methyl]-4-cyclohexylphenol,
2,4-bis[(3-cyclohexyl-4-hydroxyphenyl)methyl]-6-methylphenol,
2,4-bis[(4-hydroxy-2,3,5-trimethylphenyl)methyl]-6-cyclohexylphenol,
2,6-bis[(5-fluoro-2-hydroxyphenyl)methyl]-4-fluorophenol,
2,6-bis[(3-fluoro-4-hydroxyphenyl)methyl]-4-fluorophenol,
2,4-bis[(3-fluoro-4-hydroxyphenyl)methyl]-6-methylphenol,
4,4'-[3-(5-cyclohexyl-4-hydroxy-2-methylphenyl)-3-biphenylpropylidene]bis(5-cyclohexyl-2-methylphenol),
4,4'-[3-(2,5-dimethyl-4-hydroxyphenyl)-3-phenylpropylidene]bis(2,5-dimethylphenol),
2,4-bis[(2,5-dimethyl-4-hydroxyphenyl)methyl]-6-methylphenol, 1,1,2-tris(4-hydroxyphenyl)ethane,
1,1,3-tris(4-hydroxyphenyl)propane,
1,1,4-tris(4-hydroxyphenyl)butane,
1,2,2-tris(4-hydroxyphenyl)propane,
1,2,2-tris(4-hydroxyphenyl)butane,
1,2,2-tris(4-hydroxyphenyl)pentane,
1,2,2-tris(4-hydroxyphenyl)hexane,
1,2,2-tris(4-hydroxyphenyl)heptane,
1,2,2-tris(4-hydroxyphenyl)octane,
1,2,2-tris(4-hydroxyphenyl)-3-methylbutane
1,2,2-tris(4-hydroxyphenyl)-3,3-dimethylbutane,
1,2,2-tris(4-hydroxyphenyl)-4,4-dimethylpentane,
1,3,3-tris(4-hydroxyphenyl)butane,
1,3,3-tris(4-hydroxyphenyl)pentane,
1,3,3-tris(4-hydroxyphenyl)hexane,
1,3,3-tris(4-hydroxyphenyl)heptane,
1,3,3-tris(4-hydroxyphenyl)octane,
1,3,3-tris(4-hydroxyphenyl)nonane,
1,4,4-tris(4-hydroxyphenyl)pentane,
1,4,4-tris(4-hydroxyphenyl)hexane,
1,4,4-tris(4-hydroxyphenyl)heptane,
1,4,4-tris(4-hydroxyphenyl)octane,
1,4,4-tris(4-hydroxyphenyl)nonane,
1,4,4-tris(4-hydroxyphenyl)decane,
1,2,2-tris(2-hydroxyphenyl)propane,
1,1,2-tris(3-hydroxyphenyl)propane,
1-(4-hydroxyphenyl)-2,2-bis(2-hydroxyphenyl)propane,
1,2,2-tris(3-fluoro-4-hydroxyphenyl)propane,
1,2,2-tris(3-chloro-4-hydroxyphenyl)propane,
1,2,2-tris(3-bromo-4-hydroxyphenyl)propane,
2,2-bis(3-ethyl-4-hydroxyphenyl)-1-(4-hydroxyphenyl)propane,
2,2-bis(3-tert-butyl-4-hydroxyphenyl)-1-(4-hydroxyphenyl)propane,
2,2-bis(2-hydroxy-3-biphenylyl)-1-(4-hydroxyphenyl)propane,
2,2-bis(3-trifluoromethyl-4-hydroxyphenyl)-1-(4-hydroxyphenyl)propane,
2-(3-methyl-4-hydroxyphenyl)-1,2-bis(4-hydroxyphenyl)propane,
1-(3-methyl-4-hydroxyphenyl)-2,2-bis(4-hydroxyphenyl)propane,
3-(3-methyl-4-hydroxyphenyl)-1,3-bis(4-hydroxyphenyl)butane,
1-(3-methyl-4-hydroxyphenyl)-3,3-bis(4-hydroxyphenyl)butane,
4-(3-methyl-4-hydroxyphenyl)-1,4-bis(4-hydroxyphenyl)pentane,
1-(3-methyl-4-hydroxyphenyl)-4,4-bis(4-hydroxyphenyl)pentane,
1,2-bis(3-methyl-4-hydroxyphenyl)-2-(4-hydroxyphenyl)propane,
3,3-bis(3-methyl-4-hydroxyphenyl)-1-(4-hydroxyphenyl)butane,
1,3-bis(3-methyl-4-hydroxyphenyl)-3-(4-hydroxyphenyl)butane,
4,4-bis(3-methyl-4-hydroxyphenyl)-1-(4-hydroxyphenyl)pentane,
1,4-bis(3-methyl-4-hydroxyphenyl)-4-(4-hydroxyphenyl)pentane,
1,1,2-tris(3-methyl-4-hydroxyphenyl)ethane,
1,2,2-tris(3-methyl-4-hydroxyphenyl)propane,
1,1,3-tris(3-methyl-4-hydroxyphenyl)propane,
1,3,3-tris(3-methyl-4-hydroxyphenyl)butane,
1,1,4-tris(3-methyl-4-hydroxyphenyl)butane,
1,4,4-tris(3-methyl-4-hydroxyphenyl)pentane, and 4,4'-[4-(4-hydroxyphenyl)-sec-butylidene]bis(2-methylphenol).

Examples of the compound having four or more phenolic hydroxy groups include
bis[2-hydroxy-3-(2-hydroxy-5-methylbenzyl)-5-methylphenyl]methane,
4,6-bis[(4-hydroxyphenyl)methyl]-1,3-benzenediol,
4,4'-[(3,4-dihydroxyphenyl)methylene]bis(2,6-dimethylphenol),
4,4'-[(3,4-dihydroxyphenyl)methylene]bis(2-cyclohexyl-5-methylphenol),
4,4'-[(3,4-dihydroxyphenyl)methylene]bis(2-methylphenol),
4,4'-[(3,4-dihydroxyphenyl)methylene]bis(2,3,6-trimethylphenol),
1,1,2,2-tetrakis(4-hydroxyphenyl)ethane,
1,1,2,2-tetrakis(4-hydroxy-3-methylphenyl)ethane,
1,1,2,2-tetrakis(3,5-dimethyl-4-hydroxyphenyl)ethane,
α,α',4α",α'''-tetrakis(3,5-dimethyl-4-hydroxyphenyl)-1,4-dimethylbenzene,
2,2'-bis[4,4-bis(4-hydroxy-3-methylphenyl)cyclohexyl]propane,
2,2'-[(3,4-dihydroxyphenyl)methylene]bis(3,5-dimethylphenol),
3,6-bis[(3,5-dimethyl-4-hydroxyphenyl)methyl]catechol,
4,6-bis[(3,5-dimethyl-4-hydroxyphenyl)methyl]-1,3-benzenediol,
2,2'-[(3,4-dihydroxyphenyl)methylene]bis(3,5,6-trimethylphenol),
4,4'-[(3,4-dihydroxyphenyl)methylene]bis(2-cyclohexylphenol),
bis[3-(2-hydroxybenzyl)-4-hydroxy-5-methylphenyl]methane,
bis[3-(3-hydroxybenzyl)-4-hydroxy-5-methylphenyl]methane,
bis[3-(4-hydroxybenzyl)-4-hydroxy-5-methylphenyl]methane,
bis[3-(2-hydroxybenzyl)-2-hydroxy-5-methylphenyl]methane,
bis[3-(2-hydroxybenzyl)-3-hydroxy-5-methylphenyl]methane,
bis[3-(2-hydroxybenzyl)-4-hydroxy-5-methylphenyl]methane,
bis[3-(3-hydroxy-2-methylbenzyl)-2-hydroxy-5-methylphenyl]methane,
bis[3-(4-hydroxy-3-methylbenzyl)-2-hydroxy-5-methylphenyl]methane,
bis[3-(3-hydroxy-4-methylbenzyl)-2-hydroxy-5-methylphenyl]methane,
bis[3-(2-hydroxy-3-methylbenzyl)-2-hydroxy-5-methylphenyl]methane,
α,α',α",α'''-tetrakis(4-hydroxyphenyl)-1,4-dimethylbenzene,
bis[3-(3,6-dimethyl-2-hydroxybenzyl)-2-hydroxy-5-methylphenyl]methane,
[3-(3,6-dimethyl-2-hydroxybenzyl)-2-hydroxy-5-methylphenyl],
[3-(2,5-dimethyl-4-hydroxybenzyl)-2-hydroxy-5-methylphenyl]methane,
bis[3-(2,5-dimethyl-4-hydroxybenzyl)-2-hydroxy-5-methylphenyl]methane,
bis[3-(3,5-dimethyl-4-hydroxybenzyl)-2-hydroxy-5-methylphenyl]methane,
bis[3-(2-hydroxy-3,4,6-trimethylbenzyl)-2-hydroxy-5-methylphenyl]methane,
bis[2-hydroxy-3-(4-hydroxy-2,3,5-trimethylbenzyl)-5-methylphenyl]methane,
4,4',4",4'''-tetrakis(4-hydroxyphenyl)-1,1'-bicyclohexyl,
2,2'-bis[4,4-bis(4-hydroxyphenyl)cyclohexyl]propane,
4,4',4",4'''-tetrakis(4-hydroxy-3-methylphenyl)-1,1'-bicyclohexyl,
bis[3-(5-cyclohexyl-4-hydroxy-2-methylbenzyl)-4-hydroxy-5-methylphenyl]methane,
4,4',4",4'''-tetrakis(3,5-dimethyl-4-hydroxyphenyl)-1,1'-bicyclohexyl,
1,1-bis[3-(2-hydroxy-5-methylbenzyl)-5-cyclohexyl-4-hydroxyphenyl]cyclohexane,
1,1-bis[3-(3,5-dimethyl-4-hydroxybenzyl)-5-cyclohexyl-4-hydroxyphenyl]cyclohexane,
1,1-bis[3-(5-cyclohexyl-4-hydroxy-2-methylbenzyl)-5-cyclohexyl-4-hydroxyphenyl]cyclohexane,
4,6-bis[α-methyl-(4-hydroxyphenyl)benzyl-1,3-benzenediol,
2,2-bis[3-(4-hydroxy-3-methylbenzyl)-4-hydroxy-5-methylphenyl]propane,
2,6-bis[(3,5-dimethyl-4-hydroxyphenyl)benzyl]-4-[α-methyl-(3,5-dimethyl-4-hydroxyphenyl)benzyl]phenol,
4,4',4",4'''-tetrakis(4-hydroxy-3-isopropylphenyl)-1,1'-bicyclohexyl,
4,4'-bis[(3,4-dihydroxyphenyl)methylene]bis(2-isopropylphenol),
2,4,6-tris(4-hydroxybenzyl)-1,3-benzenediol,
4,6-bis(3,5-dimethyl-4-hydroxybenzyl)pyrogallol,
3,3'-[(2-hydroxyphenyl)methylene]bis(5-methylcatechol),
2,6-bis(2,4-dihydroxybenzyl)-4-ethylphenol,
2,4-bis(2,4-dihydroxybenzyl)-6-cyclohexylphenol,
2,6-bis(5-tert-butyl-2,3-dihydroxybenzyl)-4-methylphenol,
2,4,6-tris(3,5-dimethyl-4-hydroxybenzyl)resorcin,
2,4,6-tris(3,5-dimethyl-2-hydroxybenzyl)resorcin,
2,6-bis(2,4-dihydroxybenzyl)-3,4-dimethylphenol,
2,6-bis[3-(2-hydroxy-5-methylbenzyl)-2,5-dimethyl-4-hydroxybenzyl]-3,4-dimethylphenol,
4,6-bis(α-methyl-4-hydroxybenzyl)pyrogallol,
4,4'-[1-{4-[1-(3,5-bis(4-hydroxybenzyl)-4-hydroxyphenyl)-1-methylethyl]phenyl}ethylidene]bis[2,6-bis(4-hydroxybenzyl)phenol],
4,4'-[1-{4-[1-(3,5-bis(4-hydroxy-3-methylbenzyl)-4-hydroxyphenyl)-1-methylethyl]phenyl}ethylidene]bis[2,6-bis(4-hydroxy-3-methylbenzyl)phenol],
4,4'-[1-{4-[1-(3,5-bis(3,5-dimethyl-4-hydroxybenzyl)-4-hydroxyphenyl)-1-methylethyl]phenyl}ethylidene]bis[2,6-bis(3,5-dimethyl-4-hydroxybenzyl)phenol],
4,4'-[1-{4-[1-(3,5-bis(4-hydroxy-2,3,6-trimethylbenzyl)-4-hydroxyphenyl)-1-methylethyl]phenyl}ethylidene]bis[2,6-bis(4-hydroxy-2,3,6-trimethylbenzyl)phenol],
bis[5-(2,4-dihydroxybenzyl)-4-hydroxy-3-methylphenyl]methane,
bis[3-(2,4-dihydroxybenzyl)-2,5-dimethyl-4-hydroxyphenyl]methane,
bis[3-(2,4-dihydroxy-3-methylbenzyl)-2,5-dimethyl-4-hydroxyphenyl]methane,
bis[5-(4-hydroxybenzyl)-2,3,4-trihydroxyphenyl]methane,
1,1-bis[5-(4-hydroxybenzoyl)-2,3,4-trihydroxyphenyl]ethane,
3,3',5,5'-tetrakis(4-hydroxybenzyl)-4,4'-dihydroxybiphenyl,
3,3',5,5'-tetrakis(4-hydroxy-3-methylbenzyl)-4,4'-dihydroxybiphenyl,
3,3',5,5'-tetrakis(2-hydroxy-5-methylbenzyl)-4,4'-dihydroxybiphenyl,
3,3',5,5'-tetrakis(3,5-dimethyl-4-hydroxybenzyl)-4,4'-dihydroxybiphenyl,
bis[3-(α,α-bis(4-hydroxy-3-methylphenyl)methyl-4-hydroxyphenyl]methane, bis[3,5-bis(2-hydroxy-5-methylbenzyl)-4-hydroxyphenyl] methane,
4,4',4"-ethylidinetris{[2-(2-hydroxy-5-methyl)benzyl]-6-methylphenol},
2,2-bis[3,5-bis(2-hydroxy-5-methylphenylmethyl)phenyl] propane,
bis[3-(α,α-bis(2,5-dimethyl-4-hydroxyphenyl)methyl-4-hydroxyphenyl]methane,
bis[5-(3,5-dimethyl-4-hydroxybenzyl)-2,3,4-trihydroxyphenyl]methane,
bis[3-(2,3,4-trihydroxybenzyl)-2,5-dimethyl-4-hydroxyphenyl]methane,
1,1-bis[3-(2,3,4-trihydroxybenzyl)-5-cyclohexyl-4-hydroxyphenyl]cyclohexane,
1,8,15,22-tetranonyl-3,5,10,12,17,19,24,26-octahydroxy[1,1,1,1]-metacyclophane,
4,4'-[1-{4-[1-(3,5-bis(4-hydroxy-2-methylbenzyl)-4-hydroxyphenyl)-1-methylethyl]phenyl}ethylidene]bis[2,6-bis(4-hydroxy-2-methylbenzyl) phenol],
4,4'-[1-{4-[1-(3,5-bis(2-hydroxy-5-methylbenzyl)-4-hydroxyphenyl)-1-methylethyl]phenyl}ethylidene]bis[2,6-bis(2-hydroxy-5-methylbenzyl)phenol],
4,4'-[1-{4-[1-(3,5-bis(3-ethyl-4-hydroxybenzyl)-4-hydroxyphenyl)-1-methylethyl]phenyl}ethylidene]bis[2,6-bis(3-ethyl-4-hydroxybenzyl)phenol],
4,4'-[1-{4-[1-(3,5-bis(3,5-dimethyl-2-hydroxyphenyl)-4-hydroxyphenyl)-1-methylethyl]phenyl}ethylidene]bis[2,6-bis(3,5-dimethyl-2-hydroxyphenyl)phenol],
4,4'-[1-{4-[1-(3,5-bis(4-hydroxy-3-isopropylphenyl)-4-hydroxyphenyl)-1-methylethyl]phenyl}ethylidene]bis[2,6-bis(4-hydroxy-3-isopropylphenyl)phenol],
bis[3-(α,α-bis(3,5-dimethyl-4-hydroxyphenyl)methyl-4-hydroxyphenyl]methane,
bis[3-(α,α-bis(5-cyclohexyl-4-hydroxy-2-methylphenyl)methyl-4-hydroxyphenyl]methane,
4,4'-[4-hydroxy-3,5-bis(2-hydroxybenzyl)methylene]bis[2,6-bis(2-hydroxybenzyl)]phenol,
4,4'-[4-hydroxy-3,5-bis(4-hydroxybenzyl)methylene]bis[2,6-bis(4-hydroxybenzyl)]phenol,
4,4',4"-ethylidinetris[2,6-bis(2-hydroxybenzyl)phenol],
4,4',4"-ethylidinetris[2,6-bis(4-hydroxybenzyl)phenol],
2,2-bis[3,5-bis(4-hydroxy-3-methylbenzyl)-4-hydroxyphenyl]propane,
1,8,15,22-tetraethyl-3,5,10,12,17,19,24,26-octahydroxy[1,1,1,1]-metacyclophane,
α,α',α",α'"-tetrakis(3,5-dimethyl-4-hydroxyphenyl)-1,4-dimethylbenzene,
4,4'-[1-{4-[1-(3,5-bis(2-hydroxy-5-isopropylphenyl)-4-hydroxyphenyl)-1-methylethyl]phenyl}ethylidene]bis[2,6-bis(2-hydroxy-5-isopropylphenyl)phenol],
4,4'-[1-{4-[1-(3,5-bis(4-hydroxy-2,3,5-trimethylphenyl)-4-hydroxyphenyl)-1-methylethyl]phenyl}ethylidene]bis[2,6-bis(4-hydroxy-2,3,5-trimethylphenyl)phenol],
4,4'-[1-{4-[1-(3,5-bis(3-sec-butyl-4-hydroxyphenyl)-4-hydroxyphenyl)-1-methylethyl]phenyl}ethylidene]bis[2,6-bis(3-sec-butyl-4-hydroxyphenyl)phenol],
4,4'-[1-{4-[1-(3,5-bis(3-tert-butyl-4-hydroxyphenyl)-4-hydroxyphenyl)-1-methylethyl]phenyl}ethylidene]bis[2,6-bis(3-tert-butyl-4-hydroxyphenyl)phenol],
2,6-bis{[3-(2,4-dihydroxybenzyl)-2,5-dimethyl-4-hydroxy]benzyl}-4-methylphenol,
1,1-bis[5-(2,4-dihydroxybenzyl)-3-cyclohexyl-4-hydroxyphenyl]cyclohexane,
1,1-bis[5-(2,3,4-trihydroxybenzyl)-3-cyclohexyl-4-hydroxyphenyl]cyclohexane, and
2,2-bis[4,4',4",4'"-tetrakis(3,5-dihydroxymethyl-4-hydroxyphenyl)cyclohexyl]propane.

Examples of the carboxylic acid and the derivative thereof include
3,5-di(α-methylbenzyl)salicylic acid,
4-(2-p-methoxyphenyloxyethoxy)salicylic acid,
4-hydroxyphenylbenzoic acid,
4-chlorobenzoic acid,
4-[2-(p-methoxyphenoxy)ethyloxy]salicylic acid,
4-[3-(p-tolylsulfonyl)propyloxy]salicylic acid,
5-[p-(2-p-methoxyphenoxyethoxy)cumyl]salicylic acid,
4-octyloxycarbonylaminosalicylic acid,
3,5-distyrene salicylic acid,
N-(p-toluenesulfonyl)-glycine,
N-(p-toluenesulfonyl)-alanine,
N-(p-toluenesulfonyl)-β-alanine,
N-phenylaminocarbonyl-glycine,
N-phenylaminocarbonyl-valine,
N-(m-tolylaminocarbonyl)-phenylalanine,
N-(m-tolylaminocarbonyl)-cysteine-S-benzyl,
N-(m-tolylaminocarbonyl)-methionine,
N-(m-tolylaminocarbonyl)-tyrosine,
N-(p-tolylaminocarbonyl)-phenylalanine,
N-(p-tolylaminocarbonyl)-cysteine-S-benzyl,
N-(p-tolylaminocarbonyl)-methionine,
N-(p-tolylaminocarbonyl)-methionine,
N-(phenylaminocarbonyl)-methionine,
N-(p-tolylaminocarbonyl)-tyrosine,
2-O-(phenylaminocarbonyl)-mandelic acid,
2-O-(p-tolylaminocarbonyl)-mandelic acid,
2-O-(m-tolylaminocarbonyl)-mandelic acid,
2-O-(o-tolylaminocarbonyl)-mandelic acid,
2-O-(1-naphthylaminocarbonyl)-mandelic acid,
2-O-(3-isopropenyl-α,α-dimethylbenzylaminocarbonyl)-mandelic acid,
2-O-(benzylaminocarbonyl)-mandelic acid,
2-O-(phenethylaminocarbonyl)-mandelic acid,
2-O-(phenylaminocarbonyl)-lactic acid,
2-O-(p-tolylaminocarbonyl)-lactic acid,
2-O-(m-tolylaminocarbonyl)-lactic acid,
2-O-(o-tolylaminocarbonyl)-lactic acid,
2-O-(1-naphthylaminocarbonyl)-lactic acid,
2-O-(3-isopropenyl-α,α-dimethylbenzylaminocarbonyl)-lactic acid,
2-O-(benzylaminocarbonyl)-lactic acid, and
2-O-(phenethyl aminocarbonyl)-lactic acid.

Examples of the acidic phosphate ester compound include methyl acid phosphate, ethyl acid phosphate, butyl acid phosphate, butoxyethyl acid phosphate, 2-ethylhexyl acid phosphate, isodecyl acid phosphate, isotridecyl acid phosphate, oleyl acid phosphate, tetracosyl acid phosphate, monobutyl phosphate, dibutyl phosphate, monoisodecyl phosphate, and bis(2-ethylhexyl)phosphate.

As the component (b), the phenolic hydroxy group-containing compound is preferable because the thermochromic properties can be more effectively developed; however, it is also possible to use compounds selected from aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

The electron-accepting compound can be applied not only to the reversibly thermochromic composition to which a fluoran derivative having a specific structure is applied as the electron-donating color-developing organic compound of the present invention, but also to the reversibly thermochromic composition to which an electron-donating color-developing organic compound such as a conventionally known phthalide compound, fluoran compound, stylinoquinoline compound, diazarhodamine lactone compound, pyridine compound, quinazoline compound, or bisquinazoline compound is applied.

Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds.

Among the phthalide compounds described above, a phenylindolyl azaphthalide compound and a derivative thereof are preferred.

Examples of the fluoran compounds include aminofluoran compounds, alkoxyfluoran compounds, and derivatives of these compounds.

Examples of conventionally known electron-donating color-developing organic compounds include
3,3-bis(4-dimethylaminophenyl)-6-dimethylaminophthalide,
3-(4-diethylaminophenyl)-3-(1-ethyl-2-methylindol-3-yl) phthalide,
3,3-bis(1-n-butyl-2-methylindol-3-yl)phthalide,
3,3-bis(2-ethoxy-4-diethylaminophenyl)-4-azaphthalide,
3-(2-ethoxy-4-diethylaminophenyl)-3-(1-ethyl-2-methylindol-3-yl)-4-azaphthalide,
3-(2-n-hexyloxy-4-diethylaminophenyl)-3-(1-ethyl-2-methylindol-3-yl)-4-azaphthalide,
3-[2-ethoxy-4-(N-ethylanilino)phenyl]-3-(1-ethyl-2-methylindol-3-yl)-4-azaphthalide,
3-(2-acetamido-4-diethylaminophenyl)-3-(1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(3-trifluoromethylanilino)-6-dipentylaminofluoran,
2-dibenzylamino-6-diethylaminofluoran,
2-N-methylanilino-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xylidino-3-methyl-6-diethylaminofluoran,
2-anilino-3-methyl-6-(N-ethyl-N-p-tolylamino)fluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
2-diethylamino-8-diethylamino-4-methylspiro[5H-[1]benzopyrano[2,3-d]pyrimidine-5,1'(3'H)isobenzofuran]-3'-one,
2-di-n-butylamino-8-di-n-butylamino-4-methylspiro[5H-[1]benzopyrano[2,3-d]pyrimidine-5,1'(3'H)isobenzofuran]-3'-one,
2-di-n-butylamino-8-diethylamino-4-methylspiro[5H-[1]benzopyrano[2,3-d]pyrimidine-5,1'(3'H)isobenzofuran]-3'-one,
2-di-n-butylamino-8-(N-ethyl-N-i-amylamino)-4-methylspiro[5H-[1]benzopyrano[2,3-d]pyrimidine-5,1'(3'H)isobenzofuran]-3'-one,
2-di-n-butylamino-8-di-n-pentylamino-4-methylspiro[5H-[1]benzopyrano[2,3-d]pyrimidine-5,1'(3'H)isobenzofuran]-3'-one,
4,5,6,7-tetrachloro-3-(4-dimethylamino-2-methoxyphenyl)-3-(1-butyl-2-methyl-1H-indol-3-yl)-1(3H)-isobenzofuranone,
4,5,6,7-tetrachloro-3-(4-diethylamino-2-ethoxyphenyl)-3-(1-ethyl-2-methyl-1H-indol-3-yl)-1(3H)-isobenzofuranone,
4,5,6,7-tetrachloro-3-(4-diethylamino-2-ethoxyphenyl)-3-(1-n-pentyl-2-methyl-1H-indol-3-yl)-1(3H)-isobenzofuranone,
4,5,6,7-tetrachloro-3-(4-diethylamino-2-methylphenyl)-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthene]-3-one,
3',6'-bis[phenyl(3-ethylphenyl)amino]-spiro[isobenzofuran-1(3H),9'-[9H]xanthene]-3-one,
2,6-bis(2'-ethyloxyphenyl)-4-(4'-dimethylaminophenyl) pyridine,
2,6-bis(2',4'-diethyloxyphenyl)-4-(4'-dimethylaminophenyl) pyridine,
2-(4'-dimethylaminophenyl)-4-methoxyquinazoline, and
4,4'-ethylenedioxy-bis[2-(4-diethylaminophenyl)quinazoline].

The fluorans may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chlorine atom).

The component (c) of the reaction medium which reversibly induces an electron transfer reaction between the component (a) and the component (b) in a specific temperature range will be described.

Examples of the component (c) include alcohols, esters, ketones, ethers, and acid amides.

When the reversibly thermochromic composition of the present invention is applied to microencapsulation and secondary processing, since low molecular weight ones evaporate out of a capsule when subjected to high heat treatment, in order to stably hold the composition inside the capsule, a compound having 10 or more carbon atoms is preferably used.

As the alcohols, an aliphatic monohydric saturated alcohol having 10 or more carbon atoms is effectively employed. Examples thereof include decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

As the esters, esters having 10 or more carbon atoms are effectively employed, and examples thereof include esters obtained by any optional combination of a monobasic carboxylic acid having an aliphatic group, and an alicyclic or aromatic ring, and a monohydric alcohol having an aliphatic group, and an alicyclic or aromatic ring; esters obtained by any optional combination of a polybasic carboxylic acid having an aliphatic group, and an alicyclic or aromatic ring, and a monohydric alcohol having an aliphatic group, and an alicyclic or aromatic ring; and esters obtained by any optional combination of a monobasic carboxylic acid having an aliphatic group, and an alicyclic or aromatic ring, and a polyhydric alcohol having an aliphatic group, and an alicyclic or aromatic ring. Examples thereof include ethyl caprylate, octyl caprylate, stearyl caprylate, myristyl caprate, dococyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl 4-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-(n-nonyl) sebacate, dineopentyl 1,18-octadecylmethylene dicarboxylate, ethylene glycol dimyristate, propylene glycol dilaurate, propylene glycol distearate, hexylene glycol dipalmitate, 1,5-pentanediol distearate, 1,2,6-hexanetriol trimyristate, 1,4-cyclohexanediol didecyl, 1,4-cyclohexanedimethanol dimyristate, xylene glycol dicaprinate, and xylene glycol distearate.

In addition, an ester compound selected out of an ester between a saturated fatty acid and a branched aliphatic alcohol, an ester between an unsaturated fatty acid, or a saturated fatty acid having a branch or a substituent, and an aliphatic alcohol that is branched or has 16 or more carbon atoms; and cetyl butyrate, stearyl butyrate, and behenyl butyrate, is also preferable.

Examples of the ester compound include 2-ethylhexyl butyrate, 2-ethylhexyl behenate, 2-ethylhexyl myristate, 2-ethylhexyl caprate, 3,5,5-trimethylhexyl laurate, 3,5,5-trimethylhexy palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methyl pentyl laurate, 2-methylbutyl stearate, 2-methylbutyl stearate, 3-methylbutyl stearate, 1-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl 2-fluoromyristate, cetyl butyrate, stearyl butyrate, a behenyl butyrate.

In addition, in order to exhibit a characteristic of large hysteresis with respect to a color density-temperature curve to change color and provide color memorability depending on a temperature change, a carboxylic ester compound exhibiting a ΔT value (melting point-cloudy point) of 5° C. or higher and less than 50° C. described in JP H4-17154 B is mentioned. Examples thereof include a carboxylic acid ester having a substituted aromatic ring in the molecule, an ester of a carboxylic acid having an unsubstituted aromatic ring and an aliphatic alcohol having 10 or more carbon atoms, a carboxylic acid ester having a cyclohexyl group in the molecule, an ester of a fatty acid having 6 or more carbon atoms and an unsubstituted aromatic alcohol or a phenol, an ester of a fatty acid having 8 or more carbon atoms and a branched aliphatic alcohol, an ester of dicarboxylic acid and an aromatic alcohol or a branched aliphatic alcohol, dibenzyl cinnamate, heptyl stearate, didecyl adipate, dilauryl adipate, dimyristyl adipate, dicetyl adipate, distearyl adipated, Trilaurin, Trimyristin, Tristearin, Dimyristin, and Distearin.

A fatty acid ester compound obtained from an aliphatic monohydric alcohol having an odd number not less than 9 of carbon atoms, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, are also effective.

Examples of the fatty acid ester compound include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones with a total carbon number of 10 or more are effectively employed. Examples thereof include 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Furthermore, examples thereof include aryl alkyl ketones with a total carbon number of 12 to 24 such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers with a total carbon number of 10 or more are effectively employed. Examples thereof include dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

Examples of the acid amides include acetamide, propionic acid amide, butyric acid amide, caproic acid amide, caprylic acid amide, capric acid amide, lauric acid amide, myristic acid amide, palmitic acid amide, stearic acid amide, behenic acid amide, oleic acid amide, erucic acid amide, benzamide, caproic acid anilide, caprylic acid anilide, capric acid anilide, lauric acid anilide, myristic acid anilide, palmitic acid anilide, stearic acid anilide, behenic acid anilide, oleic acid anilide, erucic acid anilide, N-methylcaproic acid amide, N-methylcaprylic acid amide, N-methylcapric acid amide, N-methyllauric acid amide, N-methylmyristic acid amide, N-methylpalmitic acid amide, N-methylstearic acid amide, N-methylbehenic acid amide, N-methyloleic acid amide, N-methylerucic acid amide, N-ethyllauric acid amide, N-ethylmyristic acid amide, N-ethylpalmitic acid amide, N-ethylstearic acid amide, N-ethyloleic acid amide, N-butyllauric acid amide, N-butylmyristic acid amide, N-butylpalmitic acid amide, N-butylstearic acid amide, N-butyloleic acid amide, N-octyllauric acid amide, N-octylmyristic acid amide, N-octylpalmitic acid amide, N-octylstearic acid amide, N-octyloleic acid amide, N-dodecyllauric acid amide, N-dodecylmyristic acid amide, N-dodecylpalmitic acid amide, N-dodecylstearic acid amide, N-dodecyloleic acid amide, dilauric acid amide, dimyristic acid amide, dipalmitic acid amide, distearic acid amide, dioleic acid amide, trilauric acid amide, trimyristic acid amide, tripalmitic acid amide, tristearic acid amide, trioleic acid amide, succinic acid amide, adipic acid amide, glutaric acid amide, malonic acid amide, azelaic acid amide, maleic acid amide, N-methylsuccinic acid amide, N-methyladipic acid amide, N-methylglutaric acid amide, N-methylmalonic acid amide, N-methylazelaic acid amide, N-ethylsuccinic acid amide, N-ethyladipic acid amide, N-ethylglutaric acid amide, N-ethylmalonic acid amide, N-ethylazelaic acid amide, N-butylsuccinic acid amide, N-butyladipic acid amide, N-butylglutaric acid amide, N-butylmalonic acid amide, N-octyladipic acid amide and N-dodecyladipic acid amide.

As the component (c), a compound expressed by the following formula (1) may be used:

[Chem. 8]

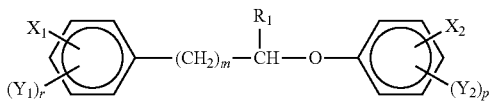

(1)

[wherein $R_1$ represents a hydrogen atom, or a methyl group, m represents an integer of 0 to 2, one of $X_1$ and $X_2$ represents —$(CH_2)_n OCOR_2$ or —$(CH_2)_n COOR_2$, the other represents a hydrogen atom; n represents an integer of 0 to 2; $R_2$ represents an alkyl or alkenyl group having 4 or more carbon atoms, $Y_1$ and $Y_2$ each independently represent any of a hydrogen atom, an alkyl group having 1 to 4 carbon atoms, a methoxy group, and a halogen atom, and r and p each independently represent an integer of 1 to 3.]

Among compounds represented by formula (1), those in which $R_1$ is a hydrogen atom are preferable, because a reversibly thermochromic composition with a wider hysteresis width is obtainable, and those in which $R_1$ is a hydrogen atom and m is 0 are more preferable.

Among the compounds represented by formula (1), more preferred are compounds expressed by the following formula (2).

[Chem. 9]

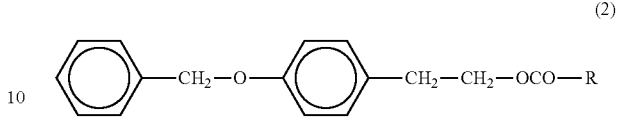

(2)

(wherein R is an alkyl or alkenyl group having 8 or more carbon atoms, preferably an alkyl group having 10 to 24 carbon atoms, and more preferably an alkyl group having 12 to 22 carbon atoms.

Examples of the compound represented by formula (2) include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

In addition, as the component (c), a compound expressed by the following formula (3) may be used:

[Chem. 10]

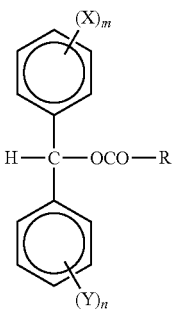

(3)

(wherein R represents an alkyl or alkenyl group having 8 or more carbon atoms, m and n each independently represent an integer of 1 to 3, and X and Y each independently represent any of a hydrogen atom, an alkyl group having 1 to 4 carbon atoms, an alkoxy group having 1 to 4 carbon atoms, and a halogen atom.)

Examples of the compound represented by formula (3) include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, and 1,1-diphenylmethyl octadecanoate.

In addition, as the component (c), a compound expressed by the following formula (4) may be used:

[Chem. 11]

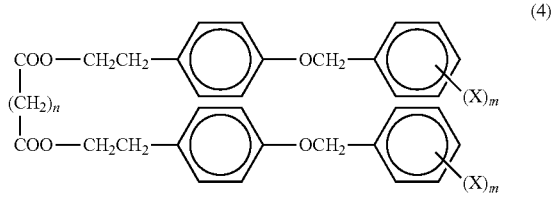

(wherein X represents a hydrogen atom, an alkyl group having 1 to 4 carbon atoms, a methoxy group, or a halogen atom, m represents an integer of 1 to 3, and n represents an integer of 1 to 20.)

Examples of the compound represented by formula (4) include diester of malonic acid with 2-[4-(4-chlorobenzyloxy)phenyl]ethanol, diester of succinic acid with 2-(4-benzyloxyphenyl)ethanol, diester of succinic acid with 2-[4-(3-methylbenzyloxy)phenyl]ethanol, diester of glutaric acid with 2-(4-benzyloxyphenyl)ethanol, diester of glutaric acid with 2-[4-(4-chlorobenzyloxy)phenyl]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl]ethanol, diester of suberic acid with 2-[4-(4-chlorobenzyloxy)phenyl]ethanol, diester of suberic acid with 2-[4-(2,4-dichlorobenzyloxy)phenyl]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, and diester of 1,18-octadecanedicarboxylic acid with 2-[4-(2-methyl benzyloxy)phenyl]ethanol.

In addition, as the component (c), a compound expressed by the following formula (5) may be used:

[Chem. 12]

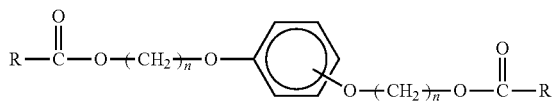

(wherein R represents an alkyl or alkenyl group having 1 to 21 carbon atoms, and n represents an integer of 1 to 3.)

Examples of the compound represented by formula (5) include diester of capric acid with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of butyric acid with 1,4-bis(hydroxymethoxy)benzene, diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene, diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene, and diester of myristic acid with 1,4-bis(2-hydroxyethoxy)benzene.

In addition, as the component (c), a compound expressed by the following formula (6) may be used:

[Chem. 13]

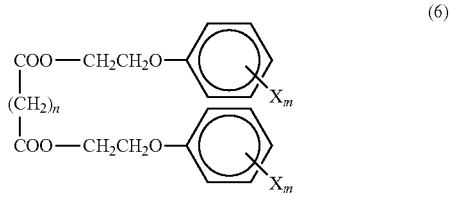

(wherein X represents a hydrogen atom, an alkyl group having 1 to 4 carbon atoms, an alkoxy group having 1 to 4 carbon atoms, or a halogen atom, m represents an integer of 1 to 3, and n represents an integer of 1 to 20.)

Examples of the compound represented by formula (6) include diester of succinic acid with 2-phenoxyethanol, diester of suberic acid with 2-phenoxyethanol, diester of sebacic acid with 2-phenoxyethanol, diester of 1,10-decanedicarboxylic acid with 2-phenoxyethanol, and diester of 1,18-octadecanedicarboxylic acid with 2-phenoxyethanol.

In addition, as the component (c), a compound expressed by the following formula (7) may be used:

[Chem. 14]

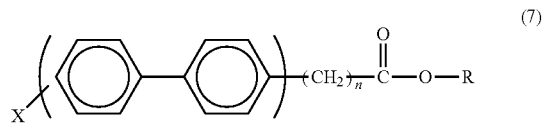

(wherein R represents an alkyl group having 4 to 22 carbon atoms, a cycloalkyl alkyl group, a cycloalkyl group, or an alkenyl group having 4 to 22 carbon atoms, X represents a hydrogen atom, an alkyl group having 1 to 4 carbon atoms, an alkoxy group having 1 to 4 carbon atoms, or a halogen atom, and n represents 0 or 1.)

Examples of the compound represented by formula (7) include decyl 4-phenylbenzoate, lauryl 4-phenylbenzoate, myristyl 4-phenylbenzoate, cyclohexylethyl 4-phenylbenzoate, octyl 4-biphenylacetate, nonyl 4-biphenylacetate, decyl 4-biphenylacetate, lauryl 4-biphenylacetate, myristyl 4-biphenylacetate, tridecyl 4-biphenylacetate, pentadecyl 4-biphenylacetate, cetyl 4-biphenylacetate, cyclopentyl 4-biphenylacetate, cyclohexylmethyl 4-biphenylacetate, hexyl 4-biphenylacetate, and cyclohexylmethyl 4-biphenylacetate.

In addition, as the component (c), a compound expressed by the following formula (8) may be used:

[Chem. 15]

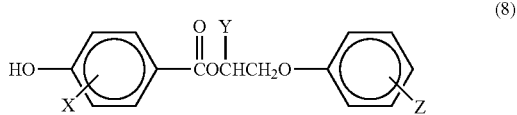

(wherein R represents an alkyl group having 3 to 18 carbon atoms or an aliphatic acyl group having 3 to 18 carbon atoms, X represents a hydrogen atom, an alkyl group having 1 to 3 carbon atoms, an alkoxy group having 1 or 2 carbon atoms, or a halogen atom, Y represents a hydrogen atom or a methyl group, and Z represents a hydrogen atom, an alkyl group having 1 to 4 carbon atoms, an alkoxy group having 1 or 2 carbon atoms, or a halogen atom.)

Examples of the compound represented by formula (8) include phenoxyethyl 4-butoxybenzoate, phenoxyethyl 4-pentyloxybenzoate, phenoxyethyl 4-tetradecyloxybenzoate, an ester of phenoxyethyl 4-hydroxybenzoate and dodecanoic acid, and a dodecyl ether of phenoxyethyl vanillate.

In addition, as the component (c), a compound expressed by the following formula (9) may be used:

[Chem. 16]

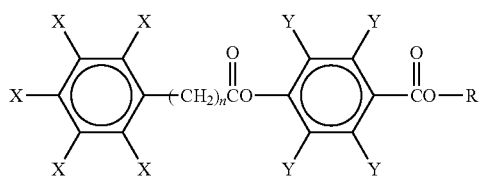

(9)

(wherein R represents an alkyl group having 4 to 22 carbon atoms, an alkenyl group having 4 to 22 carbon atoms, a cycloalkyl alkyl group, or a cycloalkyl group, X represents a hydrogen atom, an alkyl group, an alkoxy group, or a halogen atom, Y represents a hydrogen atom, an alkyl group, an alkoxy group or a halogen atom, and n represents 0 or 1.)

Examples of the compound represented by formula (9) include a benzoic acid ester of octyl 4-hydroxybenzoate, a benzoic acid ester of decyl 4-hydroxybenzoate, a 4-methoxybenzoic acid ester of heptyl 4-hydroxybenzoate, a 2-methoxybenzoic acid ester of dodecyl 4-hydroxybenzoate, and a benzoic ester of cyclohexylmethyl 4-hydroxybenzoate.

In addition, as the component (c), a compound expressed by the following formula (10) may be used:

[Chem. 17]

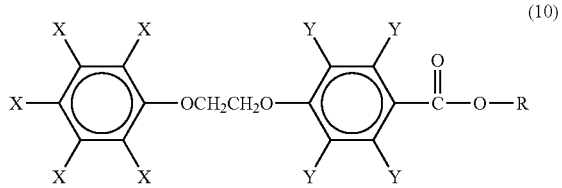

(10)

(wherein R represents an alkyl group having 3 to 18 carbon atoms, a cycloalkyl alkyl group having 6 to 11 carbon atoms, a cycloalkyl group having 5 to 7 carbon atoms, or an alkenyl group having 3 to 18 carbon atoms, X represents a hydrogen atom, an alkyl group having 1 to 4 carbon atoms, an alkoxy group having 1 to 3 carbon atoms, or a halogen atom, and Y represents a hydrogen atom, an alkyl group having 1 to 4 carbon atoms, a methoxy group, an ethoxy group or a halogen atom.)

Examples of the compound represented by formula (10) include phenoxyethyl ether of nonyl 4-hydroxybenzoate, phenoxyethyl ether of decyl 4-hydroxybenzoate, phenoxyethyl ether of undecyl 4-hydroxybenzoate, and phenoxyethyl ether of vanylate dodecyl.

In addition, as the component (c), a compound expressed by the following formula (11) may be used:

[Chem. 18]

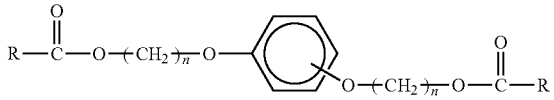

(11)

(wherein R represents a cycloalkyl group having 3 to 8 carbon atoms, or a cycloalkyl alkyl group having 4 to 9 carbon atoms, and n represents an integer of 1 to 3.)

Examples of the compound represented by formula (11) include diester of 1,3-bis(2-hydroxyethoxy)benzene and cyclohexanecarboxylic acid, diester of 1,4-bis(2-hydroxyethoxy)benzene and cyclohexanepropionic acid, and diester of 1,3-bis(2-hydroxyethoxy)benzene and cyclohexanepropionic acid.

In addition, as the component (c), a compound expressed by the following formula (12) may be used:

[Chem. 19]

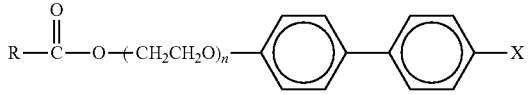

(12)

(wherein R represents an alkyl group having 3 to 17 carbon atoms, a cycloalkyl group having 3 to 8 carbon atoms, or a cycloalkyl alkyl group having 5 to 8 carbon atoms, X represents a hydrogen atom, an alkyl group having 1 to 5 carbon atoms, a methoxy group, an ethoxy group, or a halogen atom, and n represents an integer of 1 to 3.)

Examples of the compound represented by the formula (12) include diester of 4-phenylphenol ethylene glycol ether and cyclohexanecarboxylic acid, diester of 4-phenylphenol diethylene glycol ether and lauric acid, diester of 4-phenylphenol triethylene glycol ether and cyclohexanecarboxylic acid, diester of 4-phenylphenol ethylene glycol ether and octanoic acid, diester of 4-phenylphenol ethylene glycol ether and nonanoic acid, diester of 4-phenylphenol ethylene glycol ether and decanoic acid, and diester of 4-phenylphenol ethylene glycol ether and myristic acid.

As an electron-accepting compound, a reversibly thermochromic composition of heat color-developing type (a color is developed by heating and lost by cooling) using a gallic ester (JP S51-44706 A, JP 2003-253149 A) or the like, and a reversibly thermochromic microcapsule pigment encapsulating the reversibly thermochromic composition can be applied (see FIG. 3).

The reversibly thermochromic composition of the present invention is a compatible material containing, as essential components, the components (a), (b), and (c), and although the ratio of the components depends on the density, discoloration temperature, discoloration mode and kind of each component, in general, the component ratio at which desired characteristics are obtained is the component (b) within the range of from 0.1 to 100, preferably 0.1 to 50, more preferably 0.5 to 20, and the component (c) within the range of preferably from 5 to 200, preferably 5 to 100, more preferably 10 to 100, based on the component (a) 1 (each of the ratios described above is part(s) by mass).

In addition, various light stabilizers may be blended in the reversibly thermochromic composition as necessary.

The light stabilizer is contained to prevent photodegradation of the reversibly thermochromic composition including the components (a), (b) and (c), and is blended in an amount of 0.3 to 24% by mass and preferably 0.3 to 16% by mass based on 1% by mass of the component (a). Among the light stabilizers, an ultraviolet light absorber effectively cuts ultraviolet light contained in sunlight and the like to prevent a photo-deterioration that may be caused by excitation by the photo-reaction of the component (a). Antioxidants, singlet oxygen quenchers, superoxide anion quenchers, ozone quenchers, and the like restrain oxidation reaction due to light.

The light stabilizers may be used alone or in combination of two or more.

Among the light stabilizers, examples of an ultraviolet absorber include benzophenone type ultraviolet absorbers such as 2,4-hydroxybenzophenone,
2-hydroxy-4-methoxybenzophenone,
2,2'-dihydroxy-4,4'-dimethoxybenzophenone,
2,2',4,4'-tetrahydroxybenzophenone,
2-hydroxy-4-methoxybenzophenone-5-sulfonic acid,
2-hydroxy-4-octyloxybenzophenone,
bis-(5-benzoyl-4-hydroxy-2-methoxyphenyl)-methane,
2-(3',5'-di-tert-amyl-2'-hydroxyphenyl)benzophenone,
4-dodecyloxy-2-hydroxybenzophenone,
2-hydroxy-4-octadecyloxybenzophenone,
2,2'-dihydroxy-4-methoxybenzophenone,
4-benzyloxy-2-hydroxybenzophenone, and
2-(3',5'-di-tert-amyl-2'-hydroxyphenyl)benzophenone;
salicylic acid-based ultraviolet absorbers such as phenyl salicylate,
4-tert-butylphenyl salicylate,
4-octylphenyl salicylate,
2,4-di-tert-butylphenyl-4-hydroxybenzoate,
1-hydroxybenzoate,
3-tert-butyl-1-hydroxybenzoate,
1-hydroxy-3-tert-octylbenzoate, and
resorcinol monobenzoate;
cyanoacrylate-based ultraviolet absorbers such as 2-ethyl-2-cyano-3,3'-diphenylacrylate,
2-ethylhexyl-2-cyano-3,3'-diphenylacrylate, and
2-ethylhexyl-2-cyano-3-phenylthinate; benzotriazole-based ultraviolet absorbers such as 2-(5-tert-butyl-2-hydroxyphenyl)benzotriazole,
2-(2-hydroxy-5-methylphenyl)benzotriazole,
2-[3,5-bis(a, a-dimethylbenzyl)-2-hydroxyphenyl]-2H-benzotriazole,
2-(3,5-di-tert-butyl-2-hydroxyphenyl)benzotriazole,
2-(3-tert-butyl-2-hydroxy-5-methylphenyl)-5-chlorobenzotriazole,
2-(3,5-di-tert-butyl-2-hydroxyphenyl)-5-chlorobenzotriazole,
2-(3,5-di-tert-amyl-2-hydroxyphenyl)benzotriazole,
0-[3-(2H-benzotriazole-2-yl)-5-tert-butyl-4-hydroxyphenyl] propionic acid-polyethylene glycol 300 ester,
2-(3-dodecyl-2-hydroxy-5-methylphenyl)benzotriazole,
bis{β-[3-(2H-benzotriazole-2-yl)-5-tert-butyl-4-hydroxyphenyl]}propionic acid-polyethylene glycol 300 ester,
2-(3-tert-butyl-2-hydroxyphenyl-5-propyloctylate)-5-chlorobenzotriazole,
2-[2-hydroxyphenyl-3,5-di-(1,1'-dimethylbenzyl)phenyl]-2H-benzotriazole,
2-(2-hydroxy-5-tert-octylphenyl)-2H-benzotriazole,
2-(3-tert-butyl-5-octyloxycarbonylethyl-2-hydroxyphenyl) benzotriazole,
2-(2-hydroxy-5-tetraoctylphenyl)benzotriazole,
2-(2-hydroxy-4-octoxyphenyl)benzotriazole,
2-[2'-hydroxy-3'-(3",4",5",6"-tetrahydrophthalimide methyl)-5'-methylphenyl]benzotriazole, and
2-(5-tert-butyl-2-hydroxyphenyl)benzotriazole;
oxalanilide-based ultraviolet absorbers such as ethanediamide-N-(2-ethoxyphenyl)-N'-(4-isododecylphenyl), and 2,2,4,4-tetramethyl-20-(β-lauryl-oxycarbonyl)-ethyl-7-oxa-3,20-diazodispiro(5,1,11,2)heneiconic acid-21-one; and triazine-based ultraviolet absorbers such as 2,4-diphenyl-6-(2-hydroxy-4-methoxyphenyl)-1,3,5-triazine,
2,4-diphenyl-6-(2-hydroxy-4-ethoxyphenyl)-1,3,5-triazine,
2,4-diphenyl-6-(2-hydroxy-4-propoxyphenyl)-1,3,5-triazine,
2,4-diphenyl-6-(2-hydroxy-4-butoxyphenyl)-1,3,5-triazine,
2,4-diphenyl-6-(2-hydroxy-4-hexyloxyphenyl)-1,3,5-triazine,
2,4-diphenyl-6-(2-hydroxy-4-pentoxyphenyl)-1,3,5-triazine,
2,4-diphenyl-6-(2-hydroxy-4-octyloxyphenyl)-1,3,5-triazine,
2,4-diphenyl-6-(2-hydroxy-4-dodecyloxyphenyl)-1,3,5-triazine,
2,4-diphenyl-6-(2-hydroxy-4-benzyloxyphenyl)-1,3,5-triazine,
2,4-diphenyl-6-[2-hydroxy-4-(2-butoxyethoxy)phenyl]-1,3,5-triazine,
2,4-di-p-tolyl-6-(2-hydroxy-4-methoxyphenyl)-1,3,5-triazine,
2,4-di-p-tolyl-6-(2-hydroxy-4-propoxyphenyl)-1,3,5-triazine,
2,4-di-p-tolyl-6-(2-hydroxy-4-butoxyphenyl)-1,3,5-triazine,
2,4-di-p-tolyl-6-(2-hydroxy-4-hexyloxyphenyl)-1,3,5-triazine,
2,4-di-p-tolyl-6-(2-hydroxy-4-pentoxyphenyl)-1,3,5-triazine,
2,4-di-p-tolyl-6-(2-hydroxy-4-octyloxyphenyl)-1,3,5-triazine,
2,4-di-p-tolyl-6-(2-hydroxy-4-benzyloxyphenyl)-1,3,5-triazine,
2,4-di-p-tolyl-6-[2-hydroxy-4-(2-hexyloxyethoxy)phenyl]-1,3,5-triazine,
2-{4-[(2-hydroxy-3-dodecyloxypropyl)oxy]-2-hydroxyphenyl}-4,6-bis(2,4-dimethylphenyl)-1,3,5-triazine,
2-{4-[(2-hydroxy-3-tridecyloxypropyl)oxy]-2-hydroxyphenyl}-4,6-bis(2,4-dimethylphenyl)-1,3,5-triazine,
2-[4-{[2-hydroxy-3-(2'-ethyl)hexyl]oxy}-2-hydroxyphenyl]-4,6-bis(2,4-dimethylphenyl)-1,3,5-triazine,
2,4-bis(2-hydroxy-4-butyloxyphenyl)-6-[2,4-bis(butyloxyphenyl)]-1,3,5-triazine, and
2-{2-hydroxy-4-[(1-octyloxycarbonylethoxy)phenyl]}-4,6-bis(4-phenylphenyl)-1,3,5-triazine.

Examples of the antioxidant (anti-aging agent) include hindered amine-based antioxidants such as a polycondensate of dimethylsuccinate-1-(2-hydroxyethyl)-4-hydroxy-2,2,6,6-tetramethylpiperidine,
poly{[6-(1,1,3,3-tetramethylbutyl)amino-1,3,5-triazine-2-4-diyl] [(2,2,6,6-tetramethyl-4-piperidyl))imino]hexamethylene [(2,2,6,6-tetramethyl-4-piperidyl)imino]}hexamethylene,
2-(3,5-di-tert-butyl-4-hydroxybenzyl)-2-n-butylmalonate bis(1,2,2,6,6-pentapetyl-4-piperidyl), N,N'-bis(3-aminopropyl)ethylenediamine-2,4-bis[N-butyl-N-(1,2,2,6,6-pentapetyl-4-piperidyl)amino]-6-chloro-1,3,5-triazine condensate,
bis(1,2,2,6,6-pentamethyl-4-piperidyl sebacic acid),
4-benzoyloxy-2,2,6,6-tetramethylpiperidin,
bis(2,2,6,6-tetramethyl-4-piperidyl)sebacate, and
8-acetyl-3-dodecyl-7,7,9,9-tetramethyl-1,3,8-triazaspiro[4,5]decane-2,4-dione;
phenolic antioxidants such as 2,6-di-tert-butyl-4-methylphenol,
2-tert-butyl-4-methoxyphenol,
2,6-di-tert-butyl-4-ethylphenol,
octadecyl-3-(3,5-di-tert-butyl-4-hydroxyphenyl)propionate,
2,2-methylenebis(4-methyl-6-tert-butylphenol),
4,4-thiobis(2-methyl-6-tert-butylphenol),
2,2-thiobis(4-methyl-6-tert-butylphenol),
4,4-butylidenebis(3-methyl-6-tert-butylphenol),
3,9-bis{1,1-dimethyl-2-[0-(3-tert-butyl-4-hydroxy-5-methylphenyl)propionyloxy]ethyl},
2,4,8,10-tetraoxaspiro[5,5]undecane,
1,1,3-tris(2-methyl-4-hydroxy-5-tert-butylphenyl)butane,
1,3,5-trimethyl-2,4,6-tris(3,5-di-tert-butyl-4-hydroxybenzyl)benzene,
tetrakis[methylene-3-(3,5-di-tert-butyl-4-hydroxyphenyl) propionate]methane,
2,2-ethylene bis(4,6-di-tert-butylphenol),
bis[3,3-bis-(4'-hydroxy-3'-tert-butylphenyl)butyric acid]-glycol ester,
1,3,5-tris(3',5'-di-tert-butyl-4'-hydroxybenzyl)-S-triazine-2,4,6-[1H, 3H, 5H]-trione,
tocophenol,
1,3,5-tris(4-tert-butyl-3-hydroxy-2,6-dimethylbenzyl)isocyanurate,
pentaerythritol tetrakis(3-laurylthiopropionate),
triethylene glycol-bis[3-(3-tert-butyl-5-methyl-4-hydroxyphenyl)propionate],
1,6-hexadiol-bis[3-(3,5-di-tert-butyl-4-hydroxyphenyl)propionate],
2,2-thioethylenebis[3-(3,5-di-tert-butyl-4-hydroxyphenyl) propionate],
N,N'-hexamethylenebis(3,5-tert-butyl-4-hydroxy-hydrocinnamamide),
tris-(3,5-di-tert-butyl-4-hydroxybenzyl)isocyanurate,
2,2,4-trimethyl-1,2-hydroquinone,
stylate phenol,
2,5-di-tert-butyl hydroquinone, and
bis(2,2,6,6-tetramethyl-4-piperidyl)sebacate;
sulfur-based antioxidants such as girauril-3,3'-thiodipropionate,
dimyristil-3,3'-thiodipropionate,
distearyl-3,3'-thiodipropionate, and
stearyl thiopropyl amide; and
phosphoric acid-based antioxidants such as tris(2,4-di-tert-butylphenyl)phosphite,
bis(2,4-di-tert-butylphenyl)pentaerythritol diphosphite,
3,5-di-tert-butyl-4-hydroxy-benzylphosphanate-diethyl ester,
triphenylphosphite,
diphenylisodecylphosphite,
phenylisodecylphosphite,
4,4'-butylidene-bis(3-methyl-6-tert-butylphenylditridecyl) phosphite,
octadesyl phosphite,
tris(nonylphenyl)phosphite,
diisodecylpentaerythritol diphosfite,
9,10-dihydro-9-oxa-10-phosphaphenanthrene,
10-(3,5-di-tert-butyl-4-hydroxybenzyl)-9,10-dihydroxy-9-oxa-10-phosphaphenanthrene-10-oxide,
10-decyloxy-9,10-dihydroxy-9-oxa-10-phosphaphenanthrene,
cyclic neopentane tetraylbis(2,4-di-tert-butylphenyl)phosphite,
cyclic neopentane tetraylbis(2,6-di-tert-butyl-4-methylphenyl) phosphite,
2,2-methylenebis(4,6-di-tert-butylphenyl)octylphosphite,
2,4-bis-(n-octylthio)-6-(4-hydroxy-3,5-di-tert-butylanilino)-1,3,5-triazine, and
diphenylamine octylated.

Examples of the singlet oxygen quencher include carotenes, dyes, amines, phenols, nickel complexes, and sulfides. Examples thereof include 1,4-diazabicyclo[2,2,2]octane (DABCO), 0-carotene, 1,3-cyclohexadiene, 2-diethylaminomethylfuran, 2-phenylaminomethylfuran, 9-diethylaminomethylanthracene, 5-diethylaminomethyl-6-phenyl-3,4-dihydroxypyran, nickel dimethyldithiocarbamate, nickel 3,5-di-tert-butyl-4-hydroxybenzyl-O-ethylphosphonate, nickel 3,5-di-tert-butyl-4-hydroxybenzyl-O-butylphosphonate, nicke[2,2'-thiobis(4-tert-octylphenolate)]n-butylamine, nickel[2,2'-thiobis(4-tert-octylphenolate)] 2-ethylhexylamine, nickel bis[2,2'-thiobis(4-tert-octylphenolate)], nickel bis [2,2'-sulfonbis(4-octylphenolate)], nickel bis(2-hydroxy-5-methoxyphenyl-N-n-butylaldoimine), nickel bis (dithiobenzyl), and nickel bis(dithiobiacetyl).

Examples of the superoxide anion quencher include a complex of superoxide dismutase, cobalt, and nickel.

Examples of the ozone quencher include 4,4'-thiobis(6-tert-butyl-m-cresol), 2,4,6-tri-tert-butylphenol, 1,4-diazabicyclo[2,2,2]octane, N-phenyl-β-naphthylamine, α-tocopherol, 4,4'-methylene-bis(2,6-di-tert-butylphenol), P,P'-diaminodiphenylmethane, 2,2'-methylene-bis(6-tert-butyl-p-cresol), N,N'-diphenyl-P-phenylenediamine, N,N'-diphenylethylenediamine, and N-isopropyl-N'-phenyl-p-phenylenediamine.

Although the reversibly thermochromic composition of the present invention is effective even when used as it is, the composition can be encapsulated in a microcapsule to form a reversibly thermochromic microcapsule pigment (hereinafter may be referred to as a "microcapsule pigment" or a "pigment"), or dispersed in a reversibly thermochromic resin or a thermosetting resin to form reversibly thermochromic resin particles (hereinafter may be referred to as "resin particles").

The reversibly thermochromic composition is preferably encapsulated in a microcapsule to form a reversibly thermochromic microcapsule pigment. This is because a chemically and physically stable pigment can be constituted by encapsulating the reversibly thermochromic composition in a microcapsule, and, in addition, the reversibly thermochromic composition can maintain the same composition and the same working-effect can be obtained under various operation conditions.

Examples of the microencapsulation include conventionally known isocyanate-type interfacial polymerization, in situ polymerization using a melamine-formalin system or the like, submerged coat hardening method, phase separation from aqueous solution, phase separation from organic solvent, melt dispersion cooling method, aerial suspension coating method, and spray drying method. The microencapsulation is selected as needed, depending on the use purpose. Further, the microcapsule can be put into practical use after further forming a secondary resin coating film on the surface thereof in accordance with the intended use, so as to impart the microcapsule with durability or to modify the surface properties.

In the reversibly thermochromic microcapsule pigment, a mass ratio of the content and the membrane wall is preferably 7:1 to 1:1, and when the mass ratio of the content and the membrane wall is within the above range, a deterioration in the color density and vividness during color development is prevented. The mass ratio of the content and the membrane wall is more preferably 6:1 to 1:1.

An average particle diameter of the reversibly thermochromic microcapsule pigment or resin particles is preferably in a range of 0.01 to 50 µm, more preferably 0.1 to 30 µm, and still more preferably 0.5 to 20 µm. When the average particle diameter of the microcapsule pigment or the resin particles is more than 50 µm, the microcapsule pigment or the resin particles lack dispersion stability and processing suitability in blending into an ink, a paint, or a resin. On the other hand, when the average particle diameter of the microcapsule pigment or the resin particles is less than 0.01 µm, it is difficult to achieve a high-density color development.

In the measurement of the average particle diameter, a region of particles is determined using an image analysis type particle size distribution measuring software [manufactured by Mountech Co., Ltd., product name: Mac-View], a projected area equivalent circle diameter (Heywood diameter) is calculated from the area of the region of particles, and the average particle diameter is measured as an average particle diameter of particles equivalent to an equal volume sphere based on the calculated value.

When the particle diameter of all particles or most of the particles exceed 0.2 µm, the average particle diameter can be measured as an average particle diameter of particles equivalent to an equal volume sphere by the Coulter method using a particle size distribution analyzer [manufactured by Beckman-Coulter, Inc., product name: Multisizer 4e].

In addition, a volume-based particle diameter and the average particle diameter may be measured by a laser diffraction/scattering-type particle size distribution analyzer [manufactured by Horiba, Ltd., product name: LA-300] after calibration based on the numerical values measured using the software or the analyzer by the Coulter method.

A reversibly thermochromic colorant, such as a reversibly thermochromic composition, a reversibly thermochromic microcapsule pigment, or resin particles is dispensed in a vehicle containing water and/or an organic solvent and as necessary various additives to be formed into an ink composition (hereinafter may be referred to as "ink"), so that the resulting ink composition can be used as a reversibly thermochromic liquid composition for: printing inks used in screen printing, offset printing, process printing, gravure printing, coater printing, pad printing, or the like; paints used in brush coating, spray coating, electrostatic coating, electrodeposition coating, flow coating, roller coating, dip coating, or the like; inks for ink jet use; UV curable inks; inks for writing instruments such as marking pens, ballpoint pens, fountain pens, and brush pens; inks for coating tools; inks for a stamp; painting colors; cosmetics; coloring liquids for fibers; and the like.

Various additives can be blended in the reversibly thermochromic liquid composition.

Examples of the additive include resins, cross-linking agents, curing agents, desiccants, plasticizers, viscosity-adjusting agents, dispersants, ultraviolet absorbers, antioxidants, light stabilizers, anti-settling agents, lubricants, gelling agents, antifoaming agents, delustering agents, penetrating agents, pH regulators, foaming agents, coupling agents, humectants, antifungal agents, preservatives, and anticorrosives.

As the vehicle for writing instrument used in ink for writing instrument, there may be mentioned an oily vehicle including an organic solvent, or an aqueous vehicle including water and if necessary an organic solvent.

Examples of the organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

Examples of the ink for writing instrument include a shear thinning ink containing a shear thinning imparting agent in the vehicle; and a cohesive ink containing a polymeric cohesive agent in the vehicle to suspending the microcapsule pigment in a loosely aggregated state.

The ink (shear thinning ink) containing a shear thinning imparting agent in the vehicles can suppress cohesion and sinking of the microcapsule pigment, and can suppress spreading of the handwriting, so that a good handwriting can be formed.

In addition, when the shear thinning ink is stored in a writing instrument which is a ballpoint pen, it is possible to prevent a leakage of the ink from an interval between a ball and a tip when the writing instrument is not used, or to prevent a reverse flowing of the ink when a writing front-end is disposed upward (erect state).

Examples of the shear thinning imparting agent include xanthan gum, welan gum, succinoglycan (average molecular weight is about 1,000,000 to 8,000,000) that is an organic acid modified heteropolysaccharide of which constituent monosaccharides are glucose and galactose, alcagum, guar gum, locust bean gum and a derivative thereof, hydroxyethylcellulose, alkyl alginate esters, a polymer containing alkyl esters of methacrylic acid as a main component and having a molecular weight of 100,000 to 150,000, glucomannan, thickening polysaccharides having a gelation ability extracted from seaweeds such as agar or carrageenin, benzylidene sorbitol and benzylidene xylitol or a derivative thereof, a crosslinkable acrylic acid polymer, inorganic fine particles, polyglycerine fatty acid ester, polyoxyethylene sorbitan fatty acid ester, polyethylene glycol fatty acid ester, polyoxyethylene castor oil, polyoxyethylene lanolin-lanolin alcohol, beeswax derivatives, polyoxyethylene alkyl ether-polyoxypropylene alkyl ether, polyoxyethylene alkyl phenyl ether, a non-ionic surfactant such as fatty acid amide having an HLB value of 8 to 12, salts of dialkyl or dialkenyl sulfosuccinate, a mixture of N-alkyl-2-pyrrolidone and an anionic surfactant, and a mixture of polyvinylalcohol and an acrylic resin.

In the ink (cohesive ink) containing a polymer coagulant in a vehicle, the microcapsule pigment forms a loose aggregate through the polymeric coagulant, and the microcapsule pigments are prevented from contacting and aggregating, so that dispersibility of the pigment can be improved.

Examples of the polymeric coagulant include polyvinylpyrrolidones, polyethylene oxides and water-soluble polysaccharides.

Examples of the aqueous polysaccharides include tragacanth gum, guar gum, pullulan, cyclodextrin, and an aqueous cellulose derivative.

In addition, examples of the aqueous cellulose derivatives include methyl cellulose, hydroxyethyl cellulose, hydroxypropyl cellulose, hydroxyethylmethyl cellulose, and hydroxypropylmethyl cellulose.

Among the polymeric coagulants, hydroxyethyl cellulose is preferable because of excellent dispersibility.

Specific examples of the polymeric coagulant include product name: HEC A grade, HEC S grade, and HEC CF grade manufactured by Sumitomo Seika Chemicals Co., Ltd.; product name: HEC Daicel SP type, HEC Daicel SE type, and HEC Daicel EE type manufactured by Daicel Finechem Ltd.; product: CELLOSIZE WP type, CELLOSIZE QP type, and CELLOSIZE EP type manufactured by Dow Chemical Japan Co., Ltd.; and product: SANHEC manufactured by Sansho Co., Ltd.

The polymeric coagulant is blended in a range of preferably 0.1 to 1% by mass, more preferably 0.3 to 0.5% by mass based on the total amount of the ink. When the content is in the above range, the microcapsule pigment forms a loose aggregate, and the effect of improving the dispersibility of the pigment can be sufficiently developed.

In addition, the dispersibility of the microcapsule pigment can be improved by blending a dispersant in the ink.

The polymeric coagulant and the dispersant can be used in combination. When both are used in combination, the dispersibility of the microcapsule pigment can be improved, and the dispersibility of the loose aggregate of the microcapsule pigment formed through the polymeric coagulant can be further improved.

Examples of the dispersant include synthetic resins such as polyvinylpyrrolidone, polyvinyl butyral, polyvinyl ether, styrene-maleic acid copolymers, ketone resins, hydroxyethyl cellulose and derivatives thereof, and styrene-acrylic acid copolymers, acrylic polymers, PO/EO adducts, and amine base oligomers of polyesters.

Among the above dispersants, an acrylic polymer dispersant is preferable, an acrylic polymer dispersant having a carboxyl group is more preferable, and an acrylic polymer dispersant having a comb-like structure having a carboxyl group in a side chain is still more preferable because of excellent dispersibility of the microcapsule pigment.

The dispersant is particularly preferably an acrylic polymer dispersant having a comb-like structure having a plurality of carboxyl groups in side chains, and specific examples thereof include product name: Solsperse 43000 manufactured by Japan Lubrizol Corporation.

The dispersant is blended in a range of preferably 0.01 to 2% by mass, more preferably 0.1 to 1.5% by mass based on the total amount of the ink. When the blending ratio of the dispersant exceeds 2% by mass, the microcapsule pigment easily sinks or floats when vibration or the like is applied from the outside. On the other hand, when the blending ratio of the dispersant is less than 0.01% by mass, the effect of improving the dispersibility is hardly exhibited.

By using an acrylic polymer dispersant having a comb-like structure having a carboxyl group in a side chain and an organic nitrogen sulfur compound in combination with the polymeric coagulant, the dispersibility of loose aggregates of the microcapsule pigment formed through the polymeric coagulant can be improved.

The organic nitrogen sulfur compound further improves dispersibility in which a loose aggregate of the microcapsule pigment is dispersed by the acrylic polymer dispersant having the comb-like structure having a carboxyl group in the side chain, and therefore can further suppress sinking of the microcapsule pigment due to vibration when the ink is stored in a writing instrument for practical use.

Examples of the organic nitrogen sulfur compound include compounds selected from thiazole-based compounds, isothiazole-based compounds, benzothiazole-based compounds, and benzisothiazole-based compounds, and for example, one or two or more compounds selected from 2-(4-thiazoyl)-benzimidazole (TBZ), 2-(thiocyanate methylthio)-1,3-benzothiazole (TCMTB), 2-methyl-4-isothiazoline-3-one, 5-chloro-2-methyl-4-isothiazoline-3-one, and the like can be exemplified.

Among the organic nitrogen sulfur compounds, one or two or more compounds selected from 2-(4-thiazoyl)-benzimidazole (TBZ), 2-methyl-4-isothiazoline-3-one, and 5-chloro-2-methyl-4-isothiazoline-3-one are preferable.

Specific examples of the organic nitrogen sulfur compound include product name: TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800, and TOPSIDE 950, manufactured by Permachem Asia Ltd.; and product name: HOKUSTAR HP, HOKUSTAR E50A, HOKUSIDE P200, HOKUSIDE 6500, HOKUSIDE 7400, HOKUSIDE MC, HOKUSIDE 369, and HOKUSIDE R-150 manufactured by Hokko Sangyo Co., Ltd.

The mass ratio of the acrylic polymer dispersant having the comb-like structure having a carboxyl group in the side chain and the organic nitrogen sulfur compound is preferably 1:1 to 1:10, and more preferably 1:1 to 1:5. When the mass ratio is in the above range, it is possible to sufficiently develop the dispersibility of the loose aggregates of the microcapsule pigment and the effect of suppressing the sinking of the microcapsule pigment due to vibration.

In addition, blending of a water-soluble resin into the ink allows for imparting fixability on a sheet of paper of the handwriting and viscosity, and further improving the function of improving the dispersibility of the microcapsule pigment in the ink containing the acrylic polymer dispersant having the comb-like structure having a carboxyl group in the side chain and the organic nitrogen sulfur compound.

Examples of the water-soluble resin include alkyd resins, acrylic resins, styrene-maleic acid copolymers, cellulose derivatives, polyvinylpyrrolidones, polyvinyl alcohols, and dextrin.

Among the water-soluble resins, polyvinyl alcohol is preferable, and in addition, a partial saponification type polyvinyl alcohol having a degree of saponification of 70 to 89% by mol is more preferable because it has good solubility even when the ink is in an acidic range.

The water-soluble resin is blended in a range of preferably 0.3 to 3.0% by mass, more preferably 0.5 to 1.5% by mass based on the total amount of the ink.

In addition, when viscosity of the vehicle is low, by blending a specific gravity adjuster in the ink, the microcapsule pigment from sinking or floating, and localizing in the ink when the ink is externally stimulated by vibration or the like can be prevented.

Although a specific gravity of the microcapsule pigment depends on the particle diameter of the microcapsule pigment, components encapsulated in the microcapsule and their contents, the component and membrane thickness of the wall membrane of the microcapsule, and the colored state and temperature of the microcapsule pigment, the specific gravity is preferably in the range of 1.05 to 1.20, more preferably 1.10 to 1.20, and still more preferably 1.12 to 1.15 when the microcapsule pigment is in a completely colored state and water is used as a reference material in an environment of 20° C. The microcapsule pigment having a large hysteresis width (ΔH) often uses the component (c) having two or more aromatic rings in the molecule, and has a large specific gravity as described above; however, even when the viscosity of the vehicle is low in the ink containing the specific gravity adjuster, such a pigment suppresses sinking or floating of the microcapsule pigment in the ink when affected by vibration or the like from the outside due to transportation or the like.

The specific gravity of the microcapsule pigment can be measured by the following method.

(Method of Measuring Specific Gravity of Microcapsule Pigment)

1. 30 ml of an aqueous glycerin solution and 1 g of a completely colored state microcapsule pigment are introduced into a screw tube bottle and mixed to obtain a microcapsule pigment dispersion.

2. The temperature of 30 ml of the microcapsule pigment dispersion is adjusted to 20° C., and the microcapsule pigment dispersion is set in a centrifuge at a rotation speed of 1000 rpm for 30 seconds. As the centrifuge, a desktop cooling centrifuge [manufactured by Kokusan Co., Ltd., product name: H103N] can be used.

3. The microcapsule pigment dispersion is observed.

When most of the microcapsule pigment is precipitated at a bottom of a beaker, the operations of 1 to 2 are performed again using an aqueous solution having a higher glycerin concentration than an aqueous glycerin solution at this time, and the state of the dispersion is observed.

When a state where most of the microcapsule pigment are floating on the liquid surface is confirmed, the operations of 1 to 2 are performed again using an aqueous solution having a lower glycerin concentration than then aqueous glycerin solution at this time, and the state of the dispersion is observed.

The above series of operations are repeated until not the state where most of the microcapsule pigments are floating on the liquid surface or are precipitated, but a state where the portions other than the liquid surface of the aqueous glycerin solution and the vicinity of the bottom of the screw tube bottle are uniformly colored is visually confirmed. The specific gravity of the aqueous glycerin solution at the time when this state is observed is measured, and the measured specific gravity is determined as the specific gravity of the microcapsule pigment. The specific gravity of the glycerin aqueous solution can be measured by the buoy method described in JIS K0061 7.1 for an aqueous solution adjusted to 20° C.

The sinking and floating stability of the pigment are maximized when a difference in specific gravity between the vehicle and the pigment is minimal, and the specific gravity adjuster brings the specific gravity of the vehicle closer to the specific gravity of the microcapsule pigment. Since the specific gravity of the vehicle depends on the specific gravity of an aqueous substance dissolved in the vehicle and the amount thereof added, when a more amount of the specific gravity adjuster having a large specific gravity is added and dissolved in the vehicle, the specific gravity of the vehicle can be further increased.

Examples of the specific gravity adjuster include one that can be dissolved in the vehicle and can be adjusted so that the specific gravity of the vehicle approaches the specific gravity of the microcapsule pigment, and, for example, an oxyacid belonging to Group 6 in the range of atomic weight 90 to 185 and salt thereof can be exemplified.

The oxyacid and salt thereof are selected from the group consisting of oxyacid of a transition metal element and salt thereof, and it is said that the oxyacid ion is obtained by forming a tetrahedron or octahedron in which four or six oxygen atoms are usually coordinated to metal atoms or the like.

The tetrahedral or octahedral unit may be a single unit, or a polyacid having a structure in which they are bonded via edges and apexes and a polyacid salt as a salt thereof. The polyacid is a multiple acid formed by condensation of an oxyacid of a metal element, but is constituted by only one kind of metal, a polyacid in which anions to be condensed are of the same type is referred to as an isopoly acid, and a polyacid in which two or more types of anions are condensed is referred to as a heteropoly acid The respective salts thereof are referred to as isopoly acid salt and heteropoly acid salt. The polyacid includes isopoly acid and heteropoly acid, and the polyacid salt include isopoly acid salt and heteropoly acid salt.

Examples of the specific gravity adjuster include single oxygen acid and salt thereof, isopoly acid and salt thereof, and heteropoly acid and salt thereof.

Examples of the single oxygen acid include molybdic acid and tungstic acid, and examples of the salt of the single oxygen acid include sodium molybdate, potassium molybdate, ammonium molybdate, sodium tungstate, potassium tungstate, ammonium tungstate, lithium tungstate, and magnesium tungstate.

Examples of the isopoly acid include metamolybdic acid, paramolybdic acid, metatungstic acid, paratungstic acid, and isotungstic acid, and examples of the isopoly acid salt include sodium metamolybdate, potassium metamolybdate, ammonium metamolybdate, sodium paramolybdate, potassium paramolybdate, ammonium paramolybdate, sodium metatungstate, potassium metatungstate, ammonium metatungstate, barium metatungstate, sodium paratungstate, and sodium isotungstate.

Examples of the heteropoly acid include molybdophosphoric acid, molybdosilicic acid, tungstophosphoric acid, and tungstosilicic acid, and examples of the heteropoly acid salt include sodium molybdophosphate, sodium molybdosilicate, sodium tungstophosphate, and sodium tungstosilicate.

The oxygen acid and the salt thereof may be used alone or in combination of two or more.

Among the specific gravity adjusters described above, there are preferred metatungstic acid, paratungstic acid, sodium metatungstate, potassium metatungstate, ammonium metatungstate, barium metatungstate, sodium paratungstate, sodium isotungstate, tungstophosphoric acid, tungstosilicic acid, sodium tungstophosphate, and sodium tungstosilicate, and more preferred are sodium isotungstate, sodium metatungstate and sodium paratungstate.

The above-mentioned sodium isotungstate, sodium metatungstate, and sodium paratungstate are not only highly safe, but also have a high specific gravity per se, so that it is easy to adjust a liquid with a high specific gravity according to the amount added, and they are suitable.

The specific gravity adjuster is blended in a range of preferably 2 to 20% by mass, more preferably 5 to 15% by mass based on the total amount of the ink. When the blending ratio of the specific gravity adjuster exceeds 20% by mass, the microcapsule pigment is likely to aggregate. On the other hand, when the blending ratio of the specific gravity adjuster is less than 2% by mass, the effect of adjusting the specific gravity of the vehicle is poor.

The mass ratio of the microcapsule pigment and the specific gravity adjuster is preferably 0.05 to 4.0, more preferably 0.075 to 2.0, and still more preferably 0.1 to 1.5.

When the vehicle for writing instrument is an aqueous vehicle, the vehicle contains at least water, and the water is blended in a range of preferably 30 to 80% by mass and more preferably 40 to 70% by mass based on the total amount of the ink.

In addition, blending of a water-soluble organic solvent into the ink allows for suppressing water evaporation of the ink, preventing fluctuations in the specific gravity of the vehicle to maintain good dispersion stability of the microcapsule pigment, and stabilizing a structure of a loose aggregate formed by a polymeric coagulant or the polymeric coagulant and a dispersant.

Examples of the water-soluble organic solvent include ethanol, propanol, butanol, glycerin, sorbitol, triethanolamine, diethanolamine, monoethanolamine, ethylene glycol, diethylene glycol, thloethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

When the hysteresis width (ΔH) of the microcapsule pigment blended in the ink is large, the specific gravity of the microcapsule pigment is larger than 1, and when the specific gravity of the vehicle is adjusted, it is easy to adjust the specific gravity if a water-soluble organic solvent having a specific gravity larger than that of water is used, so that glycerin having a specific gravity exceeding 1.1 or the like is preferable as the water-soluble organic solvent.

The water-soluble organic solvent is blended in a range of preferably 1 to 40% by mass, more preferably 5 to 30% by mass, still more preferably 10 to 25% by mass based on the total amount of the ink. When the blending ratio of the water-soluble organic solvent exceeds 40% by mass, dissolution stability of the specific gravity adjuster is likely to decrease. On the other hand, when the blending ratio of the water-soluble organic solvent is less than 1% by mass, the effect of suppressing moisture evaporation is poor.

Moreover, when the ink for writing instruments is used in a ballpoint pen, it is preferable that the abrasion of a ball receiving sheet be prevented by adding, to the ink, lubricants including higher fatty acids such as oleic acid, non-ionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof.

In addition, various additives such as a pH regulator, an anticorrosive, a preservative, and an antifungal agent can be blended as necessary.

Examples of the pH regulator include Inorganic salts such as sodium carbonate, sodium phosphate, and sodium acetate, and organic basic compounds such as water-soluble amine compounds.

Examples of the anticorrosive include benzotriazole, tolyltriazole, dicyclohexylammonium nitrite, diisopropylammonium nitrite, and saponin.

Examples of the preservative or the antifungal agent include phenol, a sodium salt of 1,2-benzthiazoline-3-one, sodium benzoate, sodium dehydroacetate, potassium sorbate, paraoxypropylbenzoate, and 2,3,5,6-tetrachloro-4-(methylsulfonyl)pyridin.

Examples of other additives include wetting agents such as urea, non-ionic surfactants, a reduced or non-reduced starch hydrolysate, oligosaccharides such as trehalose, sucrose, cyclodextrin, glucose, dextrin, sorbitol, mannitol, and sodium pyrophosphate; antifoaming agents; dispersants; and fluorine-based surfactants or non-ionic surfactants for improving permeability of inks.

The ink contains the reversibly thermochromic microcapsule pigment in an amount of preferably 5 to 40% by mass, more preferably 10 to 40% by mass, and still more preferably 10 to 30% by mass based on the total amount of the ink. When the blending ratio of the microcapsule pigment is in the above range, a desirable color development density can be obtained, and deterioration of the ink outflow properties can be inhibited.

The ink composition according to the present invention can be produced by any conventionally known method. Specifically, the above components are added in required amounts and mixed with various agitators such as a propeller stirrer, a homodisper, or a homomixer, or various dispersers such as a bead mill, whereby the ink composition can be produced.

When the ink for writing instruments according to the present Invention is used in a ballpoint pen, the viscosity of the ink is preferably in the range of 1 to 2000 mPa·s, more preferably 3 to 1500 mPa·s, and still more preferably 500 to 1000 mPa·s when the viscosity is measured under the condition of a rotation speed of $3.84\ \text{sec}^{-1}$ in an environment of 20° C. since sinking or aggregation of the microcapsule pigment can be suppressed. Furthermore, the viscosity is preferably in the range of 1 to 200 mPa·s, more preferably 10 to 100 mPa·s, and still more preferably 20 to 50 mPa·s when the viscosity is measured under the condition of a rotation speed of $384\ \text{sec}^{-1}$ in an environment of 20° C. since ink dischargeability from a pen tip of the ballpoint pen can be improved.

When the viscosity is in the above range, the dispersion stability of the microcapsule pigment and easy fluidity of the ink in a mechanism of the ballpoint pen can be maintained at a high level.

The viscosity can be measured with a digital viscometer [manufactured by Brookfield, product name: DV-II, cone rotor (CPE-42)] under the conditions of a shear rate of $3.84\ \text{sec}^{-1}$ (1 rpm) or a shear rate of $384\ \text{sec}^{-1}$ (100 rpm) with the ink placed in an environment of 20° C.

When the ink for writing instruments according to the present invention is used in a ballpoint pen, a surface tension of the ink is preferably in the range of 20 to 50 mN/m, more preferably 25 to 45 mN/m in an environment of 20° C. When the surface tension is in the above range, it is easy to suppress spreading of the handwriting and striking-through a sheet of paper, and wettability of the ink to the sheet of paper can be improved.

The surface tension can be measured with a surface tension measuring instrument [manufactured by Kyowa Interface Science Co., Ltd., product name: DY-300] by a vertical plate method using a platinum plate with the ink placed in an environment of 20° C.

When the ink for writing instruments according to the present invention is used in a ballpoint pen, a pH of the ink is preferably in the range of 3 to 10, more preferably 4 to 9. When the pH is in the above range, aggregation or sinking of the microcapsule pigment contained in the ink in a low temperature range can be suppressed.

The pH can be measured with a pH meter [Manufactured by DKK-TOA CORPORATION, product name: IM-40S type] with the ink placed in an environment of 20° C.

When the ink for writing instruments according to the present invention is used in a marking pen, the viscosity of the ink is preferably in the range of 3 to 25 mPa·s, more preferably 4 to 20 mPa·s, and still more preferably 5 to 15 mPa·s when the viscosity is measured under the condition of a rotation speed of 6 rpm in an environment of 20° C. When measured under the condition of a rotation speed of 12 rpm, the viscosity of the ink is preferably in the range of 2 to 20 mPa·s, more preferably 3 to mPa·s, and still more preferably 4 to 15 mPa·s. When measured under the condition of a rotation speed of 30 rpm, the viscosity of the ink is preferably in the range of 1 to 20 mPa·s, more preferably 2 to 15 mPa·s, and still more preferably 3 to 10 mPa·s. When the viscosity is in the above range, fluidity of the ink and the dispersion stability of the microcapsule pigment can be improved.

The viscosity can be measured with a BL-type rotational viscometer [manufactured by Toki Sangyo Co., Ltd., product name: TVB-M-type viscometer, B-type rotor] with the ink placed in an environment of 20° C.

When the ink for writing instruments according to the present invention is used in a marking pen, the surface tension of the ink is preferably in the range of 25 to 50 mN/m, more preferably 25 to 45 mN, still more preferably 35 to 45 mN/m in an environment of 20° C. When the surface tension is in the above range, it is easy to suppress spreading of the handwriting and striking-through a sheet of paper, and the wettability of the ink to the sheet of paper can be improved.

The surface tension can be measured with a surface tension measuring instrument [manufactured by Kyowa Interface Science Co., Ltd., product name: DY-300] by a vertical plate method using a glass plate with the ink placed in an environment of 20° C.

When the ink for writing instruments according to the present invention is used in a marking pen, the pH of the ink is preferably in the range of 3 to 8, more preferably 4 to 7, and still more preferably 5 to 6. When the pH is in the above range, aggregation or sinking of the microcapsule pigment contained in the ink in a low temperature range can be suppressed.

The pH can be measured with a pH meter [Manufactured by DKK-TOA CORPORATION, product name: IM-40S type] with the ink placed in an environment of 20° C.

A writing Instrument containing the ink for writing instruments according to the present invention is obtained by blending the reversibly thermochromic microcapsule pigment in the range of 5 to 40% by mass based on the total amount of the ink for writing Instrument, an ink consumption amount of the writing instrument is preferably 60 to 280 mg when writing by 50 m is carried out on writing paper A according to old JIS P3201 at 20° C., and a value C obtained by dividing a density value of the handwriting in the colored state by a density value of the handwriting in the decolored state is preferably 20 or more.

When the blending ratio of the microcapsule pigment exceeds 40% by mass, the ink outflow properties tends to be deteriorated, a deposition amount of the microcapsule pigment on the sheet of paper becomes excessive, and more heat is required to erase the handwriting in the colored state or change the color of the handwriting, so that burden on the hand tends to be accompanied when the handwriting is rubbed to be erased or change the color of the handwriting. On the other hand, when the blending ratio of the microcapsule pigment is less than 5% by mass, it is difficult to obtain a desirable color development density.

The ink consumption amount of the writing instrument at the time of writing by 50 m, that is, the "Ink consumption amount of the writing instrument per unit length" is obtained by a difference (W1−W2) between the mass of the writing instrument before writing (W1) and the mass of the writing instrument after writing by a certain distance (W2).

When the ink consumption amount of the writing instrument at the time of writing by 50 m exceeds 280 mg, the deposition amount of the microcapsule pigment on the sheet of paper becomes excessive, and more heat is required to erase the handwriting in the colored state or change the color of the handwriting, so that burden on the hand tends to be accompanied when the handwriting is rubbed to be erased or change the color of the handwriting, and poor handwriting such as spreading tends to occur in the handwriting. On the other hand, when the ink consumption amount is less than 60 mg, a handwriting density of the writing instrument tends to be low, and poor handwriting such as faint tends to occur in the handwriting.

The "ink consumption amount of the writing instrument per unit length" of the writing instrument according to the present invention can be measured by carrying out writing on the writing paper A according to old JIS P3201 using an automatic writing tester according to JIS S6054 or JIS S6037 under the following conditions in an environment of 20° C.

Writing speed: 4 m/min
Writing angle: 70°
Writing load: 100 gf

A marking pen including a chisel-shaped resin-processed pen body is measured by bringing a wide surface of the pen body into close contact with the sheet of paper and holding the writing angle at 70°.

The value C obtained by dividing the density value of the handwriting in the colored state by the density value of the handwriting in the decolored state is obtained by measuring a K value of the handwriting in each state with a fluorescent spectrodensitometer.

In general, the writing instrument preferably has a high handwriting density in order to improve visibility of the handwriting, and in addition, in a writing instrument containing the ink for writing instruments containing the reversibly thermochromic microcapsule pigment, the residual color (color mark) of the handwriting after being erased by heat such as rubbing is less likely to be visually recognized, which satisfies practicality.

C represents a degree of the density of the handwriting in the colored state with respect to the handwriting in the decolored state, that is, the contrast between the colored state and the decolored state, and the value of C increases as the density value of the handwriting in the decolored state decreases.

When C is 20 or more, the density of the handwriting in the colored state is high, the density of the handwriting in the decolored state is low, and the contrast between the colored state and the decolored state is good, so that the writing instrument that satisfies practicality can be obtained in which coloring of the handwriting is good in the colored state, and the residual color in the decolored state after the handwriting is erased is hard to be visually recognized. On the other hand, in the writing instrument in which C is less than 20, the density of the handwriting in the decolored state is high, the contrast between the colored state and the decolored state is poor, and the residual color of the handwriting after the handwriting is erased is easily visually recognized, so that the practicality as the writing instrument tends to be impaired.

The density value (K value) of the handwriting can be measured using a fluorescent spectrodensitometer [manufactured by Konica Minolta, Inc., product name: FD-7].

Writing instruments such as a ballpoint pen and a marking pen containing the ink for writing instruments will be described.

When the ink is filled in a ballpoint pen, the structure and shape of the ballpoint pen itself are not particularly limited. Examples thereof include a ballpoint pen having an ink-storing tube in which a shear thinning ink is filled in an axial barrel, in which the ink-storing tube is connected with a ballpoint pen tip where a ball is mounted on its front-end, and a liquid plug for preventing backflow is closely contacted in the edge of the ink.

Examples of the ballpoint pen tip include a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; and a tip in which a ball held in the tip is pressed in a front direction by a spring.

The material of the ballpoint pen tip and the ball is not particularly limited, and examples thereof include cemented carbide, stainless steel, ruby, ceramic, resin, and rubber.

The diameter of the ball that can be applied is preferably about 0.3 to 2.0 mm, more preferably 0.3 to 1.5 mm, and still more preferably 0.3 to 1.0 mm.

In general, a ballpoint pen including a ball having a small diameter consumes a small amount of ink, and the handwriting density tends to be low. In a ballpoint pen containing the ink for writing instruments containing the reversibly thermochromic microcapsule pigment, it tends to be difficult to obtain a high handwriting density. In addition, since the amount of ink on a ball surface is small, the ball surface is dried (dried up), and thus poor handwriting such as faint tends to occur. In particular, when the blending ratio of the microcapsule pigment in the ink is increased to increase a solid content ratio in the ink for the purpose of improving the handwriting density, dry up resistant performance tends to be deteriorated. However, when the ink for writing instruments according to the present invention is used in a ballpoint pen including a ball having a diameter of 0.3 to 0.5 mm, it is possible to increase the handwriting density without increasing the solid content ratio of the pigment, to improve the handwriting density without impairing the dry up resistant performance, and to provide a writing instrument excellent in the contrast between the colored state and the decolored state.

In general, a ballpoint pen having a large diameter consumes a large amount of ink, and the handwriting density tends to be high. Although a high handwriting density can be obtained in the ballpoint pen containing the ink for writing instruments containing the reversibly thermochromic microcapsule pigment, the residual color tends to be easily visually recognized when the handwriting is decolored. However, when the ink for writing instruments according to the present invention is used in a ballpoint pen including a ball having a diameter of 0.5 to 1.0 mm, it is possible to provide a writing instrument in which the residual color in the decolored state of the handwriting can be made difficult to be visually recognized and which is excellent in the contrast between the colored state and the decolored state.

As the ink-storing tube, for example, a molded article made of a thermoplastic resin such as polyethylene, polypropylene, polyethylene terephthalate, or nylon or a metal tube can be used.

The ink-storing tube may be directly connected with the tip, or the ink-storing tube may be connected with the tip via a connection member.

Incidentally, the ink-storing tube may be a refill type in which the refill is stored in an axial barrel made of a resin or metal, or the ink may be directly filled in an axial barrel in which the axial barrel mounting a tip in its front-end is used itself as an ink-storing tube.

Moreover, in the case where the ink is stored in a retractable ballpoint pen, the structure and shape of the retractable ballpoint pen are not particularly limited, and any structure can be adopted so long as the writing front-end provided in the ballpoint pen refill is received in the axial barrel while being exposed to the atmosphere and the writing front-end is protruded from the opening part of the axial barrel by actuation of the in-and-out type mechanism.

Examples of the in-and-out type mechanism include (1) a side slide type in-and-out type mechanism in which an operation portion (clip) movable in a front-rear direction from a rear side wall of an axial barrel is projectingly provided outward in a radial direction, and a writing front-end is ejected from and put in through a fore-ended opening portion of the axial barrel by sliding the operation portion forward, (2) a rear end knock type in-and-out type mechanism in which an operation portion provided at a rear end of an axial barrel is pressed forward, whereby a writing front-end is ejected from and put in through a fore-ended opening part of the axial barrel, (3) a side knock type in-and-out type mechanism in which an operation portion protruding from an outer surface on the axial barrel side is pressed inward in a radial direction, whereby a writing front-end is ejected from and put in through a fore-ended opening part of the axial barrel, and (4) a rotation type in-and-out type mechanism in which a writing front-end is ejected from and put in through a fore-ended opening part of the axial barrel by rotating and operating an operation portion of a rear part of the axial barrel.

The retractable ballpoint pens may be of a complex type in which a plurality of ballpoint pen refills are stored in the axial barrel and the writing front-end of any one of the ballpoint pen refills is ejected from and put in through the fore-ended opening portion of the axial barrel by the action of the in-and-out type mechanism.

An ink follower is filled at the rear end of the ink filled in the ink-storing tube.

The ink follower composition includes a non-volatile liquid or a hardly volatile liquid, and examples thereof include vaseline, spindle oil, castor oil, olive oil, mineral oil refineries, liquid paraffine, polybutene, α-olefine, oligomer and co-oligomer of α-olefine, dimethyl silicone oil, methylphenyl silicone oil, amino modified silicone oil, polyether modified silicone oil, and fatty acid modified silicone oil.

The ink follower composition may be used alone or in combination of two or more.

The non-volatile liquid and/or the hardly volatile liquid is preferably thickened to a suitable viscosity by adding a thickening agent.

Examples of the thickening agent include silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

In addition, the liquid ink follower composition and a solid ink follower composition may be used in combination.

In a ballpoint pen containing the ink for writing instruments according to the present invention, the writing density in the colored state is high, the writing density in the decolored state is low, and the contrast between the colored state and the decolored state is good. At the same time, the writing in the colored state can be more easily erased or can more easily change color. Therefore, the reversibly thermochromic microcapsule pigment is blended in the range of to 35% by mass based on the total amount of the ink for writing instrument, the ink consumption amount is preferably 70 to 210 mg when writing by 50 m is carried out on the writing paper A according to old JIS P3201, and the value C obtained by dividing the density value of the handwriting in the colored state by the density value of the handwriting in the decolored state is preferably 20 or more. In addition, since the handwriting density in the decolored state is lower and the contrast between the colored and the decolored state is better, it is more preferable that the reversibly thermochromic microcapsule pigment is blended in the range of 10 to 35% by mass based on the total amount of the ink for writing instrument, the ink consumption amount is 80 to 190 mg when writing by 50 m is carried out on the writing paper A according to old JIS P3201, and the value C obtained by dividing the density value of the handwriting in the colored state by the density value of the handwriting in the decolored state is 25 or more, and it is still more preferable that the reversibly thermochromic microcapsule pigment is blended in the range of 10 to 35% by mass based on the total amount of the ink for writing instrument, the ink consumption amount is 90 to 170 mg when writing by 50 m is carried out on the writing paper A according to old JIS P3201, and the value C obtained by dividing the density value of the handwriting in the colored state by the density value of the handwriting in the decolored state is 25 or more.

In the case where the ink is filled in a marking pen, the structure and shape of the marking pen itself are not particularly limited. Examples thereof include a marking pen in which an ink occlusion body containing fiber bundle is embedded in an axial barrel, a marking pen tip containing a processed fiber having a capillary gap therein is mounted directly or via a connection member on the axial barrel, and a cohesive ink is impregnated into the ink occlusion body of the marking pen formed by connecting the ink occlusion body and the tip, or a marking pen in which the tip and the Ink-storing tube are arranged through a valve body that opens by pressing the tip and the ink is directly stored in the ink-storing tube.

Examples of the marking pen tip include a generally known porous member having communication pores of which porosity is selected within the range of about 30 to 70%, made of processed resin of fibers, fusion processed bodies of hot-melt fiber, or a felt, and the tip is provided for practical use by processing its one end in a cannonball form, a rectangular form, or a chisel form depending on the purpose.

The ink occlusion body is configured by bundling crimped fibers in a length direction, incorporating them into a covering material such as a plastic tube or a film, and adjusting its porosity within a range of about 40 to 90%.

As the valve body, a generally known pumping type may be used, and also it is preferred the one in which a spring pressure is adjusted so that the valve can be opened by pen pressure.

In a marking pen containing the ink for writing instruments according to the present invention, the writing density in the colored state is high, the writing density in the decolored state is low, and the contrast between the colored state and the decolored state is good. At the same time, the writing in the colored state can be more easily erased or can more easily change color. Therefore, the reversibly thermochromic microcapsule pigment is blended in the range of to 30% by mass based on the total amount of the ink for writing instrument, the ink consumption amount is preferably 100 to 260 mg when writing by 50 m is carried out on the writing paper A according to old JIS P3201, and the value C obtained by dividing the density value of the handwriting in the colored state by the density value of the handwriting in the decolored state is preferably 20 or more. In addition, since the writing density in the decolored state is low and the contrast between the colored state and the decolored state is better, it is more preferable that the reversibly thermochromic microcapsule pigment is blended in the range of 10 to 30% by mass based on the total amount of the ink for writing instrument, the ink consumption amount is 120 to 250 mg when writing by 50 m is carried out on the writing paper A according to old JHS P3201, and the value C obtained by dividing the density value of the handwriting in the colored state by the density value of the handwriting in the decolored state is 21.5 or more.

The shape of the ballpoint pen or marking pen is not limited to the above-described one, but may be a multiple writing instrument (i.e., a both head type or a pen-front drawing type) in which tips of different type are provided or pen ends for introducing inks of different colors are provided.

The handwriting obtained by carrying out writing on a writing surface using a writing instrument containing the ink for writing instruments can change the color by rubbing with a finger and a heating tool or a cooling tool.

As the heating tool, an electro-heating discoloration device equipped with a resistance heating element such as a PTC element, a heating discoloration device loaded with a medium such as hot water, a heating discoloration device using steam or laser light, or a hair dryer can be used. A friction member is preferably used because color change can be achieved by a simple method.

As the cooling tool, an electro-cryogenic discoloration device utilizing a Peltier element, a cryogenic discoloration device loaded with a refrigerant such as cold water or crushed ice, a refrigerant, a refrigerator, or a freezer can be used.

The friction member is preferably an elastic material such as an elastomer or foamed plastic, which has excellent elasticity and is capable of generating appropriate friction when rubbed and thereby producing frictional heat.

Although the handwriting may be rubbed with an ordinary rubber eraser used for erasing handwriting with a pencil, since eraser crumbs are generated during the rubbing, the above-described friction member which hardly generates crumbs is preferably used.

Examples of the material of the friction member include a silicone resin, an SEBS resin (styrene-ethylene-butadiene-styrene block copolymer), and a polyester-based resin.

Although a writing instrument set can be obtained by combining a writing instrument and a friction member (friction body) having an arbitrary shape separate from the writing instrument, excellent portability is attained by providing the friction member in the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing front-end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing front-end is not arranged), or on the knocking part.

The ink described above can also be used as an ink for a stamp.

Although water is used as a medium of the ink for a stamp, a water-soluble organic solvent can also be used as necessary.

Examples of the water-soluble organic solvent include glycols such as glycerin, ethylene glycol, propylene glycol, diethylene glycol, triethylene glycol, 1,3-butylene glycol, and ethylene glycol monomethyl ether, lower alkyl ethers thereof, 2-pyrrolidone, N-vinylpyrrolidone, and urea.

When the reversibly thermochromic microcapsule pigment is used for the ink for a stamp, among the water-soluble organic solvents described above, glycerin and propylene glycol are preferable.

The water-soluble organic solvent is blended in a range of preferably 30 to 60% by mass, more preferably 30 to 55% by mass, still more preferably 40 to 50% by mass based on the total amount of the ink. When the blending ratio of the water-soluble organic solvent is in the above range, the ink is not dried or absorbed, and a clear stamp image is easily obtained.

When the blending ratio of the water-soluble organic solvent exceeds 60% by mass, hygroscopicity tends to be high, and a stamp image is blurred, or spots appear, so that it is difficult to obtain a clear stamp image. On the other hand, when the blending ratio of the water-soluble organic solvent is less than 30% by mass, a stamp surface is dried, the stamp image becomes faint, and it is difficult to obtain a clear stamp image.

In addition to the water-soluble organic solvent, an organic solvent can also be used as the medium described above.

Examples of the organic solvent include castor oil-fatty acid alkyl esters; a cellosolve solvent such as methyl cellosolve, ethyl cellosolve, methyl cellosolve acetate, and ethyl cellosolve acetate; an alkylene glycol solvent, such as ethylene glycol acetate, ethylene glycol diethyl ether, ethylene glycol monobutyl ether, diethylene glycol monoethyl ether, diethylene glycol monobutyl ether, diethylene glycol dimethyl ether, diethylene glycol monoethyl ether acetate, propylene glycol, propylene glycol monomethyl ether, propylene glycol monoethyl ether, propylene glycol monopropyl ether, propylene glycol monobutyl ether, propylene glycol monomethyl ether acetate, propylene glycol monoethyl ether acetate, propylene glycol monobutyl ether acetate, dipropylene glycol monomethyl ether, dipropylene glycol dimethyl ether, dipropylene glycol diethyl ether, dipropylene glycol monomethyl ether acetate, and tripropylene glycol monomethyl ether; an ester solvent such as ethyl formate, amyl formate, ethyl acetate, ethyl acetoacetate, propyl acetate, butyl acetate, 3-methyl-3-methoxybutyl acetate, amyl acetate, methyl-3-methoxypropionate, ethyl-3-methoxypropionate, ethyl-3-ethoxypropionate, propyl-3-methoxypropionate, butyl-3-methoxypropionate, methyl lactate, ethyl lactate, ethyl-2-hydroxy butyrate, butyl butyrate, butyl stearate, ethyl caprate, diethyl oxalate, ethyl pyruvate, and ethyl benzoate; a hydrocarbon solvent, such as n-pentane, n-hexane, n-octane, n-dodecane, diisobutylene, dipentene, hexene, methylcyclohexene, bicyclohexyl, and mineral spirit; a halogenated hydrocarbon solvent, uch as amyl chloride, and butyl chloride; an alcohol solvent such as 3-methoxy-3-methylbutanol, and 3-methoxy-3-methylpentanol; an ether solvent, such as diethyl ether, dipropyl ether, ethyl isobutyl ether, dibutyl ether, diisopropyl ether, diamyl ether, and dihexyl ether; a ketone solvent such as acetone, methyl ethyl ketone, methyl isopropyl ketone, methyl butyl ketone, methyl isobutyl ketone, methyl isoamyl ketone, ethyl amyl ketone, methyl hexyl ketone, methyl nonyl ketone, diisopropyl ketone, diisobutyl ketone, methoxymethyl pentanone, and cyclohexanone; a propionic acid solvent, such as 3-methoxypropionic acid, and 3-ethoxypropionic acid; and a highly polar solvent such as dimethyl formamide, dimethyl acetamide, dimethyl sulfoxide, N-methylpyrrolidone, and benzonitrile; as well as a combined solvent thereof.

In addition, a thickening agent may be blended in the ink.

Examples of the thickening agent include: xanthan gum, welan gum, succinoglycan containing organic acid-modified heteropolysaccharides of glucose and galactose as a constituent monosaccharide (average molecular weight about 1,000,000 to 8,000,000), guar gum, locust bean gum and a derivative thereof, hydroxyethyl cellulose, alginic acid alkyl esters, a polymer with a methacrylic acid alkyl ester as a main constituent having a molecular weight of 100,000 to 150,000, glycomannan, a thickening polysaccharide having gelling ability extracted from a seaweed, such as agar and carrageenan, benzylidene sorbitol, benzylidene xylitol, and a derivative thereof, a crosslinkable acrylic polymer, an inorganic fine particle, polyglycerol fatty acid ester, polyoxyethylene sorbitan fatty acid ester, poly(ethylene glycol) fatty acid ester, polyoxyethylene castor oil, polyoxyethylene lanolin, lanolin alcohol, and a derivative of beeswax, a polyoxyethylene alkyl ether, a polyoxypropylene alkyl ether, a polyoxyethylene alkylphenyl ether, a nonionic surfactant with a HLB value of 8 to 12, such as a fatty acid amide, and a salt of a dialkyl or dialkenyl sulfosuccinic acid.

Among the above thickening agents, an alkali-soluble acrylic emulsion is preferable.

When the alkali-soluble acrylic emulsion is used as the thickening agent, the pH of the ink is preferably adjusted to 6 to 11, more preferably 7 to 11, and still more preferably 7 to 10.

In addition, by adding a binder resin to the ink, fixability of a stamp image can be enhanced, and the viscosity of the ink can be adjusted.

Examples of the binder resin include a resin emulsion, an alkali-soluble resin, and a water-soluble resin.

Examples of the resin emulsion include aqueous dispersions of polyacrylic ester, a styrene-acrylic acid copolymer, poly(vinyl acetate), an ethylene-vinyl acetate copolymer, an ethylene-vinyl chloride copolymer, a methacrylic acid-maleic acid copolymer, an ethylene-methacrylic acid copolymer, an α-olefin-maleic acid copolymer, polyester, polyurethane, and the like.

Examples of the alkali-soluble resin include a styrene-maleic acid copolymer, an ethylene-maleic acid copolymer, and a styrene-acrylic acid copolymer.

Examples of the water-soluble resin include polyvinyl alcohol and polyvinyl butyral.

The resin emulsion may be used alone or in combination of two or more.

In addition, various additives such as a pH regulator, a preservative, and an antifungal agent can be blended as necessary.

Examples of the pH regulator include inorganic salts such as ammonia, sodium carbonate, sodium phosphate, sodium hydroxide, and sodium acetate; and organic basic compounds such as a water-soluble amine compound such as triethanolamine and diethanolamine.

Examples of the preservative or the antifungal agent include phenol, a sodium salt of 1,2-benzisothiazoline-3-one, sodium benzoate, sodium dehydroacetate, potassium sorbate, paraoxypropylbenzoate, and 2,3,5,6-tetrachloro-4-(methylsulfonyl)pyridin.

Examples of other additives include a fluorochemical surfactant, a nonionic surfactant, an anionic surfactant, and a cationic surfactant, for improving the permeability of a solvent, and dimethyl polysiloxane.

If necessary, a resin, such as an acrylic resin, a styrene-maleic acid copolymer, a cellulose derivative, poly(vinyl pyrrolidone), poly(vinyl alcohol), and dextrin, may be added to impart fixability on a sheet of paper or viscosity.

Further, an anticorrosive, such as benzotriazole, tolyltriazole, dicyclohexylammonium nitrite, diisopropylammonium nitrite, and saponin, wetting agents such as urea, nonionic surfactants, a reduced or non-reduced starch hydrolysate, oligosaccharides such as trehalose, sucrose, cyclodextrin, glucose, dextrin, sorbitol, mannitol, and sodium pyrophosphate, an antifoaming agent, a dispersing agent, and a fluorochemical surfactant or a nonionic surfactant for improving the permeability of an ink, may be blended.

The ink contains the reversibly thermochromic microcapsule pigment in an amount of preferably 10 to 40% by mass, more preferably 10 to 35% by mass, and still more preferably 10 to 30% by mass based on the total amount of the ink. When the blending ratio of the microcapsule pigment exceeds 40% by mass, the dispersion stability of the microcapsule pigment in the ink tends to be deteriorated. On the other hand, when the blending ratio of the microcapsule pigment is less than 10% by mass, the color development density tends to be deteriorated.

The ink for a stamp described above can be used as an ink for a stamp pad, and an ink for a stamp provided with a stamp material having continuous pores.

For example, a stamp pad for supplying an ink to a stamp face of a stamp to be contacted can be obtained by impregnating the ink into a stamp pad. Further, a stamp can be obtained by impregnating an ink into a stamp material having continuous pores mounted on a stamp.

The stamp provided with a stamp material having continuous pores is obtained by impregnating an ink into a rubbery elastomer having continuous pores, which is the stamp material, and when the elastomer is pressed to a surface to be stamped, the ink is moved from an opening of a continuous pore to the surface to be stamped, so that a surface shape of the stamp is transferred. A portion where transfer is not desirable is depressed, or the openings therein are subjected to a blocking treatment, so that the ink is prevented from sticking to the surface to be stamped.

Examples of the surface shape of the stamp include a date, a symbol, and letters, such as "STRICTLY CONFIDENTIAL", "CONFIDENTIAL", "Finished", and "Received".

The stamp material having continuous pores is placed in a stamp main body, such that the stamp face is exposed, and the exposed surface is preferably provided with a cap, so as to avoid drying of the ink or staining due to an accidental contact during nonuse.

An ink reservoir for supplying an ink to a stamp material may be provided in a rear part of a stamp material having continuous pores so as to increase stamping cycles.

The stamp material is impregnated in advance with the ink and then mounted on the stamp, or alternatively the stamp material may be mounted on the stamp and then impregnated with the ink.

When the stamp material of the stamp on which the stamp material is mounted is impregnated with the ink, the ink may be impregnated from a front surface of the stamp material, or the ink may be impregnated from a rear surface of the stamp material.

Similarly, in the stamp having the ink reservoir, the ink reservoir may be filled with the ink in advance to be attached to the stamp, or the ink may be filled in the ink reservoir of the stamp provided with the stamp material and the ink reservoir.

The stamp can form a stamp image on various surfaces to be stamped. In addition, the stamp image formed by the ink for a stamp can be made to change a color by rubbing with a finger or the application of the heating tool or the cooling tool described above. The above-described friction member is preferable as the heating tool because color changing can be achieved by a simple method.

Although a stamp set can be obtained by combining a stamp and a friction member (friction body) having an arbitrary shape separate from the stamp, excellent portability is attained by providing the friction member in the stamp.

The material of the support is not particularly limited when the reversibly thermochromic liquid composition is applied or printed, and every material is effective. Examples thereof include paper, synthetic paper, fiber, fabric, synthetic leather, leather, plastics, glass, pottery materials, metals, wood, and stone.

The shape of the support is not limited to a flat shape and may be an irregular form.

A reversibly thermochromic laminate (reversibly thermochromic printed matter) can be obtained by providing a reversibly thermochromic layer containing a reversibly thermochromic colorant, such as a reversibly thermochromic composition, a reversibly thermochromic microcapsule pigment, or resin particles, on a support.

In cases where a non-thermochromic colored layer (non-thermochromic image) has been formed on the support in advance, the colored layer or an image can be made visible or invisible depending on temperature change by applying thereto a reversibly thermochromic layer, and this enables to further diversify the mode of change.

In addition, the reversibly thermochromic colorant, such as the reversibly thermochromic composition, the reversibly thermochromic microcapsule pigment, or the resin particles, is melt blended with an excipient and molded to obtain a reversibly thermochromic solid molded article for coating, which can be used as a solid writing material or a solid cosmetic material.

Examples of the solid writing material include crayons, pencil leads, mechanical pencil leads, and solid gel markers.

Examples of the solid cosmetic material include foundations, eyeliners, eyebrow paints, eye shadows, and lipsticks.

Examples of the excipient used for the solid writing material include waxes, gelation agents, and clays.

The wax is not particularly limited as long as it is conventionally known, and examples thereof include carnauba wax, Japan wax, beeswax, microcrystalline wax, montan wax, candelilla wax, sucrose fatty acid ester, dextrin fatty acid ester, polyolefin wax, styrene-modified polyolefin wax, and paraffin wax.

The gelation agent is not particularly limited as long as it is conventionally known, and examples thereof include 12-hydroxystearic acid, a dibenzylidene sorbitol, a tribenzylidene sorbitol, an amino acid oil, and an alkali metal salt of a higher fatty acid.

Examples of the clay mineral include kaolin, bentonite, and montmorillonite.

Among the excipients, at least one of a polyolefin wax, a sucrose fatty acid ester, and a dextrin fatty acid ester is preferably contained from the viewpoint of easily improving the writing density.

Examples of the polyolefin wax include waxes, such as polyethylene, polypropylene, polybutylene, an α-olefin polymer, an ethylene-propylene copolymer, and an ethylene-butene copolymer.

In addition, among the polyolefin waxes, those having a softening point in the range of 100 to 130° C. and a penetration of 10 or less are preferable because writing is easy.

When the penetration exceeds 10, the solid writing material becomes too soft, and writing becomes difficult. At the same time, in erasing handwriting, the handwriting is elongated over a sheet of paper (a wax is filmed to a thin layer) to stain a blank part on the writing surface or easily cause contamination of another paper with color or dirt.

The softening point and penetration of the polyolefin wax can be measured in accordance with the measurement method specified in JIS K2207, and a penetration value of 0.1 mm is expressed by "penetration 1". That is, the smaller the penetration value is, the harder the solid writing material is, and the larger the penetration value is, the softer the solid writing material is.

Specific examples of the polyolefin wax include product name: Neowax series made by Yasuhara Chemical Co., Ltd., product name: SANWAX series made by Sanyo Chemical Industries, Ltd., product name: Hi-WAX series made by Mitsui Chemicals, Inc., and product name: A-C Polyethylene made by Honeywell.

As the sucrose fatty acid ester, an ester with a fatty acid having 12 to 22 carbon atoms as a constituent fatty acid is preferable, and a palmitic acid and a stearic acid are more preferable.

Specific examples of the sucrose fatty acid ester include product name: RYOTO Sugar Ester series made by Mitsubishi-Kagaku Foods Corporation, and product name: Sugar Wax series made by Dai-Ichi Kogyo Seiyaku Co., Ltd.

As the dextrin fatty acid ester, an ester with a fatty acid having 14 to 18 carbon atoms as a constituent fatty acid is preferable, and a palmitic acid, a myristic acid, and a stearic acid are more preferable.

Specific examples of the dextrin fatty acid ester include product name: Rheopearl series made by Chiba Flour Milling Co., Ltd.

As the excipient used for the solid writing material, a side-chain crystalline polyolefin is preferable. Here, the side-chain crystalline polyolefin has a structure in which a relatively long side chain is bonded to a linear main chain.

In general linear polyolefins, since the linear main chain is folded to be crystalized, melting is likely to occur in a wide temperature range. On the other hand, in side-chain crystalline polyolefins, crystallization occurs mainly in the side chain rather than the polyolefin main chain, so that the melting point (Mp) is low, and melting occurs in a narrow temperature range.

Among the side-chain crystalline polyolefins as described above, those having a long-chain alkyl group having 12 to 28 carbon atoms in the side chain are particularly preferable. The long-chain alkyl group in the side chain is not particularly limited, and may be of a linear type or a branched type; however, a long-chain alkyl group of a linear type is preferable because of excellent crystallinity.

Although the alkyl group in the side chain may have a substituent, the crystallinity is easily lowered by the substituent, and the side chain of the side-chain crystalline polyolefin may be modified with, for example, styrene or the like in order to adjust the crystallinity. When the long-chain alkyl group has a functional group that forms a hydrogen bond, the long-chain alkyl groups are bonded to each other and aggregated by the hydrogen bond, and the crystallinity is improved, which is preferable.

Although the side-chain crystalline polyolefin includes a polyolefin having a highly branched structure (hereinafter, referred to as "highly branched polyolefin"), this can also be used as an excipient. In the highly branched polyolefin, since the main chain is hard to fold during crystallization, the melting point is low, and melting occurs in a narrow temperature range.

The excipient preferably has a weight average molecular weight (Mw) of 2,000 to 50,000, and more preferably has a weight average molecular weight of 10,000 to 30,000, from the viewpoint of excellent mechanical strength and thermochromic characteristics of the solid writing material and easy handling at the time of production. The excipient preferably has a number average molecular weight (Mn) of 1,000 to 10,000.

The weight average molecular weight and the number average molecular weight are values measured by gel permeation chromatography (GPC) based on polystyrene.

Specific examples of the side-chain crystalline polyolefin include product names: HS Crysta 4100 (Mw: 16,000, Mp: 44.4° C.) and HS Crysta 6100 (Mw: 28,000, melting point: 60.6° C.) manufactured by Hokoku Corporation, and product names: EL Crysta 4100 (Mw: 16,000) and EL Crysta 6100 (Mw: 28,000) manufactured by Idemitsu Kosan Co., Ltd.

Specific examples of the highly branched polyolefin include product names: VYBAR 103 (Mw: 17,348, Mn: 4,400, Mp: 67.7° C.), VYBAR 260 (Mw: 20,278, Mn: 2,600, Mp: 54.7° C.), VYBAR 343 (Mw: 10,164, Mp: 36.0° C.), and VYBAR 825 (Mn: 2,800) manufactured by Baker Hughes Company.

The excipient is blended in a range of preferably 0.2 to 70% by mass, more preferably 0.5 to 40% by mass based on the total amount of the solid writing material. When the blending ratio of the excipient is in the above range, the shape as the solid writing material is easily obtained, and the writing density of the solid writing material is easily increased.

When the blending ratio of the excipient exceeds 70% by mass, it is difficult to obtain a sufficient writing density. On the other hand, when the blending ratio of the excipient is less than 0.2% by mass, it is difficult to obtain a shape as a writable core material.

By blending a filler in the solid writing material, the strength of the solid writing material can be improved, and writing feel can be adjusted.

Examples of the filler include talc, clay, silica, calcium carbonate, barium sulfate, alumina, mica, boron nitride, potassium titanate, and glass flakes.

Among the fillers, talc or calcium carbonate is preferable because it is excellent in moldability and hardly impairs the thermochromic characteristics when a microcapsule pigment is used.

The filler is blended in a range of preferably 10 to 65% by mass based on the total amount of the solid writing material. When the blending ratio of the filler exceeds 65% by mass, color developability and writing feel tend to be deteriorated. On the other hand, when the blending ratio of the filler is less than 10% by mass, the strength of the solid writing material tends to be deteriorated.

In addition, the strength of the solid writing material can be improved by blending a binder resin in the solid writing material.

Examples of the binder resin include natural resins and synthetic resins, and, for example, olefin-based resins, cellulose-based resins, vinyl alcohol-based resins, pyrrolidone-based resins, acryl-based resins, styrene-based resins, amide-based resins, and basic group-containing resins can be exemplified.

Among the binder resins, an ethylene-vinyl acetate copolymer resin, an ethylene-vinyl alcohol copolymer resin, and a polyvinyl alcohol resin are preferable, and by using these resins in combination with a polyester polyol resin, molding stability can be improved.

The binder resin is blended in a range of preferably 0.5 to 5% by mass based on the total amount of the solid writing material.

By blending a hindered amine compound in the solid writing material, it is possible to make it difficult to visually recognize a residual image of a portion where the handwriting of the writing surface is erased. Thus, re-writability can be satisfied without impairing appearance of the writing surface, and merchantability can be enhanced.

The hindered amine compound preferably has a molecular weight of 1000 or less so that it can be rich in compatibility with other components and so that it less undergoes bleeding out and handwriting capable of keeping clear even after a lapse of time can be formed.

The melting point is preferably 120° C. or lower. When the melting point is low, the solid writing material can be manufactured without applying much heat during manufacturing, and it is possible to prevent deterioration of the reversibly thermochromic colorant, such as the reversibly thermochromic composition, the reversibly thermochromic microcapsule pigment, or the resin particles, contained in the solid writing material.

In addition, various additives can be blended as necessary.

Examples of the additive include viscosity-adjusting agents, antifungal agents or preservatives, antibacterial agents, ultraviolet inhibitors, antioxidants, lubricants, and perfumes.

The solid writing material may be used alone as a writing material, or may have a core-sheath structure (double core) provided with an outer shell covering an outer peripheral surface thereof using the solid writing material as an inner core.

The outer shell prevents the solid writing material (inner core) inside from being damaged by physical contact, and contributes to improving the mechanical strength of the entire solid writing material. Although the outer shell may or may not contain the reversibly thermochromic colorant, such as the reversibly thermochromic composition, the reversibly thermochromic microcapsule pigment, or the resin particles, contributing to handwriting formation, in general, since a tip of the solid writing material is often scraped conically, the outer shell often does not affect the handwriting. Thus, it is common that the reversibly thermochromic colorant is not blended in the outer shell.

Various additives may be blended in the outer shell as necessary.

Examples of the additive include non-thermochromic colorants, antifungal agents or preservatives, antibacterial agents, ultraviolet absorbers, antioxidants, lubricants, and perfumes.

The solid writing material can be manufactured by a manufacturing method such as extrusion molding or compression molding.

The above-described solid writing material having the core-sheath structure provided with the outer shell covering the outer peripheral surface of the inner core can be manufactured, for example, by a manufacturing method in which the outer shell is disposed on an outer peripheral surface of a mass of the inner core and compression molding is performed by a press.

The thickness and length of the solid writing material are arbitrarily selected according to the purpose. For example, in the case of using the solid writing material as a pencil lead, the general thickness is 2.0 to 5.0 mm, and preferably 2.5 to 4.0 mm. The length is 60 to 300 mm, preferably 80 to 200 mm.

When the solid writing material has the core-sheath structure, the thickness of the inner core and the thickness of the outer shell are also arbitrarily selected. When the thickness of the outer shell is thick, impact resistance is excellent, and on the other hand, when the thickness of the outer shell is thin, an exposure amount of the inner core increases, so that ease of use is easily improved. The thickness of the outer shell relative to a radial length of the inner core is preferably in the range of to 100%, more preferably 20 to 50%.

The thickness and length of the solid writing material are suitably adjusted according to uses other than pencils, for example, uses such as a lead of a mechanical pencil and a crayon.

The solid writing material is capable of carrying out writing on various writing surfaces, and in addition, the reversibly thermochromic colorant such as the reversibly thermochromic composition, the reversibly thermochromic microcapsule pigment, or the resin particles is used; therefore, the handwriting obtained by writing on the writing surface can be made to change a color by rubbing with a finger or the application of the heating tool or the cooling tool described above. The above-described friction member is preferable as the heating tool because color changing can be achieved by a simple method.

Although a solid writing material set can be obtained by combining a solid writing material and a friction member (friction body) having an arbitrary shape separate from the solid writing material, excellent portability is attained by providing the friction member in the solid writing material or an exterior of the solid writing instrument housing the solid writing material in an exterior housing object. Specifically, for example, this may be in the form in which a friction member is provided on a wooden or paper external packaging shaped like a pencil, a crayon, etc.

In addition, the reversibly thermochromic colorant such as the reversibly thermochromic composition, the reversibly thermochromic microcapsule pigment, or the resin particles is melt blended with a thermoplastic resin, a thermosetting resin, waxes, or the like to form a pellet, a powder, or a paste, and can be used as a resin composition for forming a reversibly thermochromic molded article.

From the resin composition for forming a reversibly thermochromic molded article, three dimensional shaped body having a predetermined shape, and moldings such as films, sheets, plates, filaments, rods or pipes, or the like are obtained by a conventional means such as injection molding, extrusion molding, blow molding or cast molding.

A toner and a powder coating may be obtained by melt-blending into the thermoplastic resin.

A non-thermochromic colorant, such as a generally employed dye or pigment, may be added to the above-described reversibly thermochromic liquid composition, solid molded article for coating, or resin composition for forming to cause color change behavior from color (1) to color (2).

Light resistance can be improved by stacking a layer containing a light stabilizer and/or transparent metalescent pigment over the molded article or the laminate, or durability can be improved by providing a topcoat layer thereon.

Examples of the light stabilizer include ultraviolet absorbers, antioxidants, singlet oxygen quenchers, superoxide anion quenchers, and ozone quenchers.

Examples of the transparent metallic luster pigment include pigments prepared by coating the surface of a core substance, such as natural mica, synthetic mica, glass piece, alumina, or transparent film piece, with a metal oxide such as titanium oxide.

Specific examples of products using the reversibly thermochromic composition and the microcapsule pigment encapsulating the same or the resin particles are listed below.

(1) Toys:

dolls and animal-figured toys; hair of dolls and animal-figured toys; dollhouses and furnitures thereof; doll accessories such as clothes, hats, bags, and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings, and food articles; and the like (2) Clothing:

outerwears such as T-shirts, sweaters, blouses, dresses, swimsuits, raincoats, and ski wears; footwears such as shoes and shoelaces; personal effects made of cloth, such as handkerchiefs, towels, and wrapping cloths; gloves; neckties; hats; scarves; mufflers; and the like (3) Interior Ornaments:

carpets, curtains, curtain cords, tablecloth, matting, cushions, carpets, rugs, chair upholstery, seats, mats, picture frames, imitation flowers, photo stands, and the like (4) Furnitures:

beddings such as bedclothes, pillows, and mattresses; lighting fixtures; air conditioners; and the like (5) Accessories:

rings, bracelets, tiaras, earrings, hair stoppers, artificial nails, ribbons, scarfs, watches, glasses, and the like (6) Stationeries:

writing instruments, stamps, erasers, celluloid boards, rulers, notebooks, adhesive tapes, and the like (7) Daily Necessaries:

cosmetics such as lipsticks, eye-shadows, foundations, eyeliners, eyebrow cosmetics, manicures, hair dyes, artificial nails, and paints for artificial nails; toothbrushes; and the like (8) Kitchen Utensils:

cups, dishes, chopsticks, spoons, forks, pots, frying pans, and the like (9) Other Products:

various printed articles, such as calendars, labels, cards, recording materials, and those for forgery prevention; books such as illustrated books; bags; packaging containers; embroidery threads; sporting gears; fishing equipment; coasters; musical instruments; pocket warmers; refrigerants; pouches such as wallets; umbrellas; vehicles; buildings; indicators for temperature detection; training and learning articles; and the like.

EXAMPLES

Examples will be described below. Incidentally, the term "part(s)" in the following Examples means part(s) by mass.

Example 1

Preparation of Reversibly Thermochromic Composition

A reversibly thermochromic composition changing from black color to colorless was obtained by mixing 1 part of 2-(4-chloroanilino)-3-methyl-6-(N-ethyl-N-p-tolylamino) fluoran as the component (a), 5 parts of 1,1-bis(4-hydroxyphenyl)n-decane as the component (b), and 25 parts of myristyl alcohol and 25 parts of butyl stearate as the components (c), followed by heating to dissolve them.

Example 2

Preparation of Reversibly Thermochromic Microcapsule Pigment

The reversibly thermochromic composition of Example 1 was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment having an average particle diameter of 2.0 µm was obtained from the microcapsule dispersion by a centrifugal separation method.

The following Tables 1 to 3 show the composition of the reversibly thermochromic compositions of Examples 1 to 29, the presence or absence of microencapsulation, and the color change of the reversibly thermochromic composition. The reversibly thermochromic microcapsule pigments of Examples 3 to 29 were obtained by being encapsulated in microcapsules by the same method as in Example 2.

Bracketed numbering in the table indicates parts by mass.

TABLE 1

| Example | Component (a) | Component (b) | Component (c) | Presence or absence of microencapsulation | Color change |
|---|---|---|---|---|---|
| 1 | 2-(4-chloroanilino)-3-methyl-6-(N-ethyl-N-p-tolylamino)fluoran (1) | 1,1-bis(4-hydroxyphenyl)n-decane (5) | myristyl alcohol (25) butyl stearate (25) | Absence (A) | Black ⇔ colorless |
| 2 | 2-(4-chloroanilino)-3-methyl-6-(N-ethyl-N-p-tolylamino)fluoran (1) | 2,2-bis(4-hydroxyphenyl)hexafluoropropane (5) | 4-benzyloxyphenyl ethyl caprate (50) | Presence (P) | Black ⇔ colorless |
| 3 | 2-(4-chloroanilino)-3-methyl-6-(N-n-hexyl-N-p-tolylamino)fluoran (1) | 2,2-bis(4-hydroxyphenyl)hexafluoropropane (5) | 4-benzyloxyphenyl ethyl caprate (50) | P | Black ⇔ colorless |
| 4 | 2-(4-chloroanilino)-3-methyl-6-(N-ethyl-N-p-n-butylphenylamino)fluoran (*1) (1) | 2,2-bis(4-hydroxyphenyl)hexafluoropropane (5) | 4-benzyloxyphenyl ethyl caprate (50) | P | Black ⇔ colorless |
| 5 | 2-(4-chloroanilino)-3-methyl-6-(N,N-di-n-butylamino)fluoran (1) | 2,2-bis(4-hydroxyphenyl)hexafluoropropane (5) | 4-benzyloxyphenyl ethyl caprate (50) | P | Black ⇔ colorless |
| 6 | 2-(4-chloroanilino)-3-methyl-6-(N-ethyl-N-tert-butylamino)fluoran (*2) (1) | 2,2-bis(4-hydroxyphenyl)hexafluoropropane (5) | 4-benzyloxyphenyl ethyl caprate (50) | P | Black ⇔ colorless |
| 7 | 2-(4-chloroanilino)-3-methyl-6-(N-ethyl-N-n-hexylamino)fluoran (1) | 2,2-bis(4-hydroxyphenyl)hexafluoropropane (5) | 4-benzyloxyphenyl ethyl caprate (50) | P | Black ⇔ colorless |
| 8 | 2-(4-chloroanilino)-3-methyl-6-(N-ethyl-N-phenylamino)fluoran (1) | 2,2-bis(4-hydroxyphenyl)hexafluoropropane (5) | 4-benzyloxyphenyl ethyl caprate (50) | P | Black ⇔ colorless |
| 9 | 2-(2-chloroanilino-)-3-methyl-6-(N-ethyl-N-p-tolylamino)fluoran (1) | 2,2-bis(4-hydroxyphenyl)hexafluoropropane (5) | 4-benzyloxyphenyl ethyl caprate (50) | P | Black ⇔ colorless |
| 10 | 2-(4-chloroanilino)-3-methyl-6-(N-ethyl-N-n-hexylamino)fluoran (1) | 4-n-hexylresorcin (5) | 4-benzyloxyphenyl ethyl caprate (50) | P | Black ⇔ colorless |

(*1) IUPAC Name: 2-(4-chloroanilino)-3-methyl-6-[N-(4-n-butylphenyl)-N-ethylamino]fluoran
(*2) IUPAC Name: 2-(4-chloroanilino)-3-methyl-6[N-(4-tert-butyl)-N-ethylamino]fluoran

TABLE 2

| Example | Component (a) | Component (b) | Component (c) | Presence or absence of microencapsulation | Color change |
|---|---|---|---|---|---|
| 11 | 2-(4-chloroanilino)-3-methyl-6-(N-ethyl-N-n-hexylamino)fluoran (1) | 2-benzylphenol (5) | 4-benzyloxyphenyl ethyl caprate (50) | P | Black ⇔ colorless |
| 12 | 2-(4-chloroanilino)-3-methyl-6-(N-ethyl-N-p-tolylamino)fluoran (1) | 4,4',4''-ethylidinetrisphenol (5) | 4-benzyloxyphenyl ethyl caprate (50) | P | Black ⇔ colorless |
| 13 | 2-(4-chloroanilino)-3-methyl-6-(N-ethyl-N-p-tolylamino)fluoran (1) | 4,4-bis(4-hydroxyphenyl)valeric acid (5) | 4-benzyloxyphenyl ethyl caprate (50) | P | Black ⇔ colorless |
| 14 | 2-(4-chloroanilino)-3-methyl-6-(N-ethyl-N-n-hexylamino)fluoran (1) | 2,2-bis(4-hydroxyphenyl)hexafluoropropane (5) | neopentyl stearate (50) | P | Black ⇔ colorless |
| 15 | 2-(4-chloroanilino)-3-methyl-6-(N-ethyl-N-p-tolylamino)fluoran (1) | 2,2-bis(4-hydroxyphenyl)hexafluoropropane (5) | neopentyl stearate (50) | P | Black ⇔ colorless |
| 16 | 2-(4-chloroanilino)-3-methyl-6-[N-(4-n-butylphenyl)-N-n-hexylamino]fluoran (1) | 2,2-bis(4-hydroxyphenyl)hexafluoropropane (5) | 4-benzyloxyphenyl ethyl caprate (50) | P | Black ⇔ colorless |
| 17 | 2-(4-fluoroanilino)-3-methyl-6-[N-(4-n-butylphenyl)-N-ethylamino]fluoran (1) | 2,2-bis(4-hydroxyphenyl)hexafluoropropane (5) | 4-benzyloxyphenyl ethyl caprate (50) | P | Black ⇔ colorless |
| 18 | 2-(4-methylanilino)-3-methyl-6-[N-(4-n-butylphenyl)-N-ethylamino]fluoran (1) | 2,2-bis(4-hydroxyphenyl)hexafluoropropane (5) | 4-benzyloxyphenyl ethyl caprate (50) | P | Black ⇔ colorless |

TABLE 2-continued

| Example | Component (a) | Component (b) | Component (c) | Presence or absence of microencapsulation | Color change |
|---|---|---|---|---|---|
| 19 | 2-(4-ethoxyanilino)-3-methyl-6-[N-(4-n-butylphenyl)-N-ethylamino]fluoran (1) | 2,2-bis(4-hydroxyphenyl) hexafluoropropane (5) | 4-benzyloxyphenyl ethyl caprate (50) | P | Black ⇔ colorless |
| 20 | Mixture of 6-chloro-2'-(4'-chloroanilino)-3'-methyl-6'-[N-(4'-n-butylphenyl)-N-ethylamino]fluoran and 7-chloro-2'-(4'-chloroanilino)-3'-methyl-6'-[N-(4'-n-butylphenyl)-N-ethylamino]fluoran (1) | 2,2-bis(4-hydroxyphenyl) hexafluoropropane (5) | 4-benzyloxyphenyl ethyl caprate (50) | P | Black ⇔ colorless |

TABLE 3

| Example | Component (a) | Component (b) | Component (c) | Presence or absence of microencapsulation | Color change |
|---|---|---|---|---|---|
| 21 | 2-anilino-3-methyl-6-(4-n-hexylamino)fluoran (1) | 2,2-bis(4-hydroxyphenyl) hexafluoropropane (5) | 4-benzyloxyphenyl ethyl caprate (50) | P | Black ⇔ colorless |
| 22 | 2-anilino-3-methyl-6-[N-(4-n-butylphenyl)-N-ethylamino]fluoran (1) | 2,2-bis(4-hydroxyphenyl) hexafluoropropane (5) | 4-benzyloxyphenyl ethyl caprate (50) | P | Black ⇔ colorless |
| 23 | 2-anilino-3-methyl-6-[N-n-butyl-N-(4-n-butylphenyl)amino]fluoran (1) | 2,2-bis(4-hydroxyphenyl) hexafluoropropane (5) | 4-benzyloxyphenyl ethyl caprate (50) | P | Black ⇔ colorless |
| 24 | 2-anilino-3-methyl-6-[N-n-butyl-N-(4-ethoxyphenyl)amino] fluoran (1) | 2,2-bis(4-hydroxyphenyl) hexafluoropropane (5) | 4-benzyloxyphenyl ethyl caprate (50) | P | Black ⇔ colorless |
| 25 | 2-anilino-3-methyl-6-(N-phenyl-N-n-hexylamino)fluoran (1) | 2,2-bis(4-hydroxyphenyl) hexafluoropropane (5) | 4-benzyloxyphenyl ethyl caprate (50) | P | Black ⇔ colorless |
| 26 | 2-anilino-3-methyl-6-(N-n-hexyl-N-p-tolylamlno)fluoran (1) | 2,2-bis(4-hydroxyphenyl) hexafluoropropane (5) | 4-benzyloxphenyl ethyl caprate (50) | P | Black ⇔ colorless |
| 27 | 2-anilino-3-methyl-6-(N-n-octyl-N-p-tolylamino)fluoran (1) | 2,2-bis(4-hydroxyphenyl) hexafluoropropane (5) | 4-benzyloxyphenyl ethyl caprate (50) | P | Black ⇔ colorless |
| 28 | 2-anilino-3-methyl-6-(N-n-decyl-N-p-tolylamino)fluoran (1) | 2,2-bis(4-hydroxypheny) hexafluoropropane (5) | 4-benzyloxyphenyl ethyl caprate (50) | P | Black ⇔ colorless |
| 29 | Mixture of 6-chloro-2'-anilino-3'-methyl-6'-[N-(4'-n-butylphenyl)-N-ethylamino]fluoran and 7-chloro-2'-anilino-3'-methyl-6'[N-(4'-n-butylphenyl)-N-ethylamino]fluoran (1) | 2,2-bis(4-hydroxyphenyl) hexafluoropropane (5) | 4-benzyloxphenyl ethyl caprate (50) | P | Black ⇔ colorless |

Comparative Example 1

Preparation of Reversibly Thermochromic Composition

A reversibly thermochromic composition changing from black color to colorless was obtained by mixing 1 part of 2-anilino-3-methyl-6-(N-ethyl-N-p-tolylamino)fluoran as the component (a), 5 parts of 1,1-bis(4-hydroxyphenyl)n-decane as the component (b), and 25 parts of myristyl alcohol and 25 parts of butyl stearate as the components (c), followed by heating to dissolve them.

Comparative Example 2

Preparation of Reversibly Thermochromic Composition

A reversibly thermochromic composition changing from black color to colorless was obtained by mixing 1 part of 2-(2-chloroanilino)-6-(N,N-di-n-butylamino)fluoran as the component (a), 5 parts of 1,1-bis(4-hydroxyphenyl)n-decane as the component (b), and 25 parts of myristyl alcohol and 25 parts of butyl stearate as the components (c), followed by heating to dissolve them.

Comparative Example 3

Preparation of Reversibly Thermochromic Microcapsule Pigment

The reversibly thermochromic composition of Comparative Example 1 was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment having an average particle diameter of 2.0 μm was obtained from the microcapsule dispersion by a centrifugal separation method.

The following Table 4 shows the composition of the reversibly thermochromic compositions of Comparative Examples 1 to 4, the presence or absence of microencapsulation, and the color change of the reversibly thermochromic composition. The reversibly thermochromic microcapsule pigment of Comparative Example 4 was obtained by being encapsulated in microcapsules by the same method as in Comparative Example 3.

Bracketed numbering in the table indicates parts by mass.

TABLE 4

| Comparative Example | Component (a) | Component (b) | Component (c) | Presence or absence of microencapsulation | Color change |
|---|---|---|---|---|---|
| 1 | 2-anilino-3-methyl-6-(N-ethyl-N-p-tolylamino)fluoran (1) | 1,1-bis(4-hydroxyphenyl)n-decane (5) | myristyl alcohol (25) butyl stearate (25) | A | Black ⇔ colorless |
| 2 | 2-(2-chloroanilino)-6-(N,N-di-n-butylamino)fluoran (1) | 1,1-bis(4-hydroxyphenyl)n-decane (5) | myristyl alcohol (25) butyl stearate (25) | A | Black ⇔ colorless |
| 3 | 2-anilino-3-methyl-6-(N-ethyl-N-p-tolylamino)fluoran (1) | 2,2-bis(4-hydroxyphenyl) hexafluoropropane (5) | 4-benzyloxyphenyl ethyl caprate (50) | P | Black ⇔ colorless |
| 4 | 2(2-chloroanilino)-6-(N,N-di-n-butylamino)fluoran (1) | 2,2-bis(4-hydroxyphenyl) hexafluoropropane (5) | 4-benzyloxyphenyl ethyl caprate (50) | P | Black ⇔ colorless |

Preparation of Sample for Measuring Discoloration Temperature

Each of the reversibly thermochromic compositions obtained in Example 1 and Comparative Examples 1 and 2 was charged into a transparent glass capillary having an inner diameter of 1 mm and a length of 78 mm to a height of about 10 mm from the bottom of the capillary, whereby a sample for measuring discoloration temperature was obtained.

40 parts of each of the reversibly thermochromic microcapsule pigments obtained in Examples 2 to 29 and Comparative Examples 3 and 4, 52 parts of an ethylene-vinyl acetate copolymer resin emulsion, 5 parts of a thickening agent, and 3 parts of a leveling agent were mixed to prepare a reversibly thermochromic ink. A sample for measuring discoloration temperature was obtained by screen-printing a solid pattern on a high-quality paper by using the ink.

Preparation of Sample for Density Measurement

Each of the reversibly thermochromic compositions obtained in Example 1 and Comparative Examples 1 and 2 was added dropwise to filter paper [manufactured by Toyo Roshi Kaisha, Ltd., product name: Qualitative Filter Paper No. 2] to obtain a sample for density measurement.

40 parts of each of the reversibly thermochromic microcapsule pigments obtained in Examples 2 to 29 and Comparative Examples 3 and 4, 52 parts of an ethylene-vinyl acetate copolymer resin emulsion, 5 parts of a thickening agent, and 3 parts of a leveling agent were mixed to prepare a reversibly thermochromic ink. A sample for density measurement was obtained by screen-printing a solid pattern on a high-quality paper by using the ink.

Discoloration Temperature Measurement

Among the samples for measuring discoloration temperature of Example 1 and Comparative Examples 1 and 2, the whole part in which the reversibly thermochromic composition had been charged was immersed in a transparent heat medium solution. While the temperature of the transparent heat medium solution was changed, a discoloring state of the reversibly thermochromic composition was visually observed to measure a complete coloring temperature $t_1$, a coloring starting temperature $t_2$, a decoloring starting temperature $t_3$, and complete decoloring temperature $t_4$, and $\Delta H$ [hysteresis width: (temperature at a midpoint between $t_3$ and $t_4$)–(temperature at a midpoint between $t_1$ and $t_2$)] was determined.

The samples for measuring discoloration temperature of Examples 2 to 29 and Comparative Examples 3 and 4 were placed in a measurement portion of a colorimeter (manufactured by Tokyo Denshoku, Co., Ltd., product name: TC-3600), temperature of the sample portion was increasing or decreasing at a speed of 2° C./min to measure a brightness value as color density at each temperature, to thereby plot a color density-temperature curve. From the color density-temperature curve, the complete coloring temperature $t_1$, the coloring starting temperature $t_2$, the decoloring starting temperature $t_3$, the complete decoloring temperature $t_4$, and $\Delta H$ [hysteresis width: (temperature at a midpoint between $t_3$ and $t_4$)–(temperature at a midpoint between $t_1$ and $t_2$) were determined.

The following Tables 5 to 7 show the results of the discoloration temperature measurement of each of the samples for measuring discoloration temperature of Examples 1 to 29 and Comparative Examples 1 to 4.

TABLE 5

| Example | Complete coloring temperature $t_1$ (° C.) | Coloring starting temperature $t_2$ (° C.) | Decoloring starting temperature $t_3$ (° C.) | Complete decoloring temperature $t_4$ (° C.) | $\Delta H$ |
|---|---|---|---|---|---|
| 1 | 7 | 12 | 10 | 15 | 3.0 |
| 2 | −18 | −7 | 48 | 64 | 68.5 |
| 3 | −18 | −7 | 48 | 64 | 68.5 |

TABLE 5-continued

| Example | Complete coloring temperature $t_1$ (° C.) | Coloring starting temperature $t_2$ (° C.) | Decoloring starting temperature $t_3$ (° C.) | Complete decoloring temperature $t_4$ (° C.) | ΔH |
|---|---|---|---|---|---|
| 4 | −18 | −7 | 47 | 63 | 67.5 |
| 5 | −16 | −8 | 47 | 65 | 68.0 |
| 6 | −17 | −7 | 47 | 64 | 67.5 |
| 7 | −17 | −8 | 48 | 63 | 68.0 |
| 8 | −17 | −6 | 46 | 62 | 65.5 |
| 9 | −18 | −7 | 48 | 64 | 68.5 |
| 10 | −18 | −8 | 47 | 64 | 68.5 |
| 11 | −18 | −7 | 48 | 64 | 68.5 |
| 12 | −17 | −6 | 47 | 64 | 67.0 |
| 13 | −17 | −7 | 46 | 63 | 66.5 |
| 14 | 13 | 15 | 28 | 32 | 16.0 |
| 15 | 13 | 15 | 28 | 33 | 16.5 |
| 16 | −17 | −7 | 46 | 63 | 66.5 |
| 17 | −18 | −7 | 46 | 63 | 67.0 |
| 18 | −17 | −7 | 47 | 63 | 67.0 |
| 19 | −17 | −7 | 47 | 63 | 67.0 |
| 20 | −17 | −8 | 46 | 63 | 67.0 |

TABLE 6

| Example | Complete coloring temperature $t_1$ (° C.) | Coloring starting temperature $t_2$ (° C.) | Decoloring starting temperature $t_3$ (° C.) | Complete decoloring temperature $t_4$ (° C.) | ΔH |
|---|---|---|---|---|---|
| 21 | −17 | −7 | 47 | 64 | 67.5 |
| 22 | −16 | −8 | 46 | 63 | 66.5 |
| 23 | −16 | −8 | 47 | 63 | 67.0 |
| 24 | −18 | −7 | 46 | 64 | 67.5 |
| 25 | −17 | −8 | 46 | 64 | 67.5 |
| 26 | −17 | −7 | 47 | 64 | 67.5 |
| 27 | −18 | −7 | 46 | 64 | 67.5 |
| 28 | −16 | −7 | 47 | 64 | 67.0 |
| 29 | −17 | −6 | 46 | 64 | 66.5 |

TABLE 7

| Comparative Example | Complete coloring temperature $t_1$ (° C.) | Coloring starting temperature $t_2$ (° C.) | Decoloring starting temperature $t_3$ (° C.) | Complete decoloring temperatur $t_4$ (° C.) | ΔH |
|---|---|---|---|---|---|
| 1 | 7 | 12 | 10 | 15 | 3.0 |
| 2 | 7 | 12 | 10 | 15 | 3.0 |
| 3 | −17 | −6 | 48 | 63 | 67.0 |
| 4 | −17 | −5 | 45 | 62 | 63.0 |

Density Measurement

The samples for density measurement of Examples 1 to 29 and Comparative Examples 1 to 4 cooled to the complete coloring temperature $t_1$ or less and brought into a completely colored state were placed in a measurement portion of a fluorescent spectrodensitometer [manufactured by Konica Minolta, Inc., product name: FD-7], and an absolute density of the colored state was measured.

The samples for density measurement of Examples 1 to 29 and Comparative Examples 1 to 4 heated to the complete decoloring temperature $t_4$ or more and brought into a completely decolored state were placed in a measurement portion of the fluorescent spectrodensitometer described above, and the absolute density of the decolored state was measured.

In addition, a density difference [(absolute density in the colored state)−(absolute density in the decolored state)] was determined from a value of the absolute density in the colored state and a value of the absolute density in the decolored state.

The following Tables 8 to 10 show the results of the density measurement of each of the samples for density measurement of Examples 1 to 29 and Comparative Examples 1 to 4.

TABLE 8

| Example | Color development density | Decoloring density | Density difference |
|---|---|---|---|
| 1 | 1.49 | 0.13 | 1.38 |
| 2 | 1.11 | 0.01 | 1.10 |
| 3 | 1.12 | 0.01 | 1.11 |
| 4 | 1.10 | 0.01 | 1.09 |
| 5 | 1.18 | 0.10 | 1.08 |
| 6 | 1.22 | 0.09 | 1.13 |
| 7 | 1.25 | 0.08 | 1.17 |
| 8 | 1.20 | 0.05 | 1.15 |
| 9 | 1.09 | 0.01 | 1.08 |
| 10 | 1.20 | 0.05 | 1.15 |
| 11 | 1.16 | 0.05 | 1.11 |
| 12 | 1.10 | 0.02 | 1.08 |
| 13 | 1.10 | 0.02 | 1.08 |
| 14 | 1.25 | 0.07 | 1.18 |
| 15 | 1.11 | 0.01 | 1.10 |
| 16 | 1.13 | 0.01 | 1.12 |
| 17 | 1.11 | 0.02 | 1.09 |
| 18 | 1.09 | 0.02 | 1.07 |
| 19 | 1.09 | 0.02 | 1.07 |
| 20 | 1.12 | 0.03 | 1.09 |

TABLE 9

| Example | Color development density | Decoloring density | Density difference |
|---|---|---|---|
| 21 | 1.10 | 0.02 | 1.08 |
| 22 | 1.13 | 0.02 | 1.11 |
| 23 | 1.12 | 0.01 | 1.11 |
| 24 | 1.09 | 0.02 | 1.07 |
| 25 | 1.08 | 0.01 | 1.07 |
| 26 | 1.11 | 0.01 | 1.10 |
| 27 | 1.13 | 0.01 | 1.12 |
| 28 | 1.10 | 0.01 | 1.09 |
| 29 | 1.17 | 0.03 | 1.14 |

TABLE 10

| Comparative Example | Color development density | Decoloring density | Density difference |
|---|---|---|---|
| 1 | 1.37 | 0.12 | 1.25 |
| 2 | 1.38 | 0.14 | 1.24 |
| 3 | 1.07 | 0.02 | 1.05 |
| 4 | 1.09 | 0.03 | 1.06 |

Preparation of Reversibly Thermochromic Microcapsule Pigment A

A reversibly thermochromic composition composed of 6 parts of 2-(4-chloroanilino)-3-methyl-6-(N-n-hexyl-N-p-tolylamino)fluoran as the component (a), 6 parts of 1,1-bis (4-hydroxyphenyl)-2-ethylhexane and 10 parts of 2,2-bis(4-hydroxyphenyl)hexafluoropropane as the component (b), and 50 parts of 4-benzyloxyphenylethyl caprate as the component (c) was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment A having an average particle diameter of 1.9 µm was obtained from the microcapsule dispersion by a centrifugal separation method.

The complete coloring temperature $t_1$ of the reversibly thermochromic microcapsule pigment A was −18° C., and the complete decoloring temperature $t_4$ was 64° C. The pigment reversibly changed color from black to colorless through a change in temperature.

Preparation of Reversibly Thermochromic Microcapsule Pigment B

A reversibly thermochromic composition composed of 6 parts of 2-(4-chloroanilino)-3-methyl-6-[N-(4-n-butylphenyl)-N-ethylamino]fluoran as the component (a), 6 parts of 1,1-bis(4-hydroxyphenyl)-2-ethylhexane and 10 parts of 2,2-bis(4-hydroxyphenyl)hexafluoropropane as the component (b), and 50 parts of 4-benzyloxyphenylethyl caprate as the component (c) was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment B having an average particle diameter of 2.1 µm was obtained from the microcapsule dispersion by a centrifugal separation method.

The complete coloring temperature $t_1$ of the reversibly thermochromic microcapsule pigment B was −18° C., and the complete decoloring temperature $t_4$ was 63° C. The pigment reversibly changed color from black to colorless through a change in temperature.

Preparation of Reversibly Thermochromic Microcapsule Pigment C

A reversibly thermochromic composition composed of 6 parts of 2-anilino-3-methyl-6-(N-n-hexyl-N-p-tolylamino)fluoran as the component (a), 6 parts of 1,1-bis(4-hydroxyphenyl)-2-ethylhexane and 10 parts of 2,2-bis(4-hydroxyphenyl)hexafluoropropane as the component (b), and 50 parts of 4-benzyloxyphenylethyl caprate as the component (c) was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment C having an average particle diameter of 2.0 µm was obtained from the microcapsule dispersion by a centrifugal separation method.

The complete coloring temperature $t_1$ of the reversibly thermochromic microcapsule pigment C was −18° C., and the complete decoloring temperature $t_4$ was 64° C. The pigment reversibly changed color from black to colorless through a change in temperature.

Preparation of Reversibly Thermochromic Microcapsule Pigment D

A reversibly thermochromic composition composed of 6 parts of 2-anilino-3-methyl-6-(N-n-octyl-N-p-tolylamino)fluoran as the component (a), 6 parts of 1,1-bis(4-hydroxyphenyl)-2-ethylhexane and 10 parts of 2,2-bis(4-hydroxyphenyl)hexafluoropropane as the component (b), and 50 parts of 4-benzyloxyphenylethyl caprate as the component (c) was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment D having an average particle diameter of 1.9 µm was obtained from the microcapsule dispersion by a centrifugal separation method.

The complete coloring temperature $t_1$ of the reversibly thermochromic microcapsule pigment D was −18° C., and the complete decoloring temperature $t_4$ was 64° C. The pigment reversibly changed color from black to colorless through a change in temperature.

Preparation of reversibly thermochromic microcapsule pigment E A reversibly thermochromic composition composed of 6 parts of 2-anilino-3-methyl-6-(N-ethyl-N-p-tolylamino)fluoran as the component (a), 6 parts of 1,1-bis(4-hydroxyphenyl)-2-ethylhexane and 10 parts of 2,2-bis(4-hydroxyphenyl)hexafluoropropane as the component (b), and 50 parts of 4-benzyloxyphenylethyl caprate as the component (c) was charged into a mixed solution composed of 35 parts of an aromatic isocyanate prepolymer as a wall membrane material and 40 parts of an auxiliary solvent, and then emulsified and dispersed in a 8% polyvinyl alcohol aqueous solution. Stirring was continued while heating, then 2.5 parts of a water-soluble aliphatic-modified amine was added, and stirring was further continued to prepare a microcapsule dispersion. A reversibly thermochromic microcapsule pigment E having an average particle diameter of 2.0 µm was obtained from the microcapsule dispersion by a centrifugal separation method.

The complete coloring temperature $t_1$ of the reversibly thermochromic microcapsule pigment E was −17° C., and the complete decoloring temperature $t_4$ was 63° C. The pigment reversibly changed color from black to colorless through a change in temperature.

Example 30

Preparation of Aqueous Ink for Writing Instrument

An aqueous ink for writing instruments was prepared by mixing 25 parts of the reversibly thermochromic microcapsule pigment A (black color had been developed beforehand by cooling to −18° C. or lower), 0.3 parts of a shear thinning imparting agent (xanthan gum), 10 parts of urea, 10 parts of glycerin, 0.5 parts of a nonionic permeability imparting agent [manufactured by San Nopco Limited, product name: Nopco SW-WET-366], 0.1 parts of a modified silicone antifoaming agent [manufactured by San Nopco Limited, product name: Nopco 8034], 0.5 parts of a phosphoric acid ester surfactant [manufactured by DKS Co., Ltd., product name: PLYSURF AL], 0.5 parts of a pH regulator (triethanolamine), 0.2 parts of an antifungal agent [manufactured by Lonza Japan, product name: Proxel XL-2], and 52.9 parts of water.

Production of Ballpoint Pen

The aqueous ink described above was sucked and filled in an ink-storing tube made of a polypropylene pipe and then connected, via a holder made of a resin, with a ballpoint pen tip holding a cemented carbide ball having a diameter of 0.3 mm on its front end. Next, an ink follower (liquid plug) containing polybutene as a main component and having viscoelasticity was filled from a rear end of the Ink-storing tube, and, in addition, a tail plug was fitted in a rear portion of the pipe. Then, degassing treatment was carried out by centrifugation to obtain a ballpoint pen refill.

Then, the obtained refill was incorporated into an axial barrel to produce a ballpoint pen (retractable ballpoint pen).

The ballpoint pen had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on a rear side wall of the axial barrel. The rear end portion of the axial barrel has an SEBS resin attached as a friction member.

The composition of each aqueous ink of Examples 30 to 49 and Comparative Examples 5 to 14 and the diameter of the ball of the ballpoint pen are shown in the following Tables 11 to 15.

Aqueous inks of Examples 31 to 49 and Comparative Examples 5 to 14 were each prepared by changing the types and blending amounts of materials to be blended in Example 30 as shown in Tables 11 to 15. The ballpoint pens were produced by changing the diameters of the balls used in Example 30 as shown in Tables 11 to 15.

TABLE 11

| Material name | (Note) | Example 30 | 31 | 32 | 33 | 34 | 35 | 36 | 37 | 38 | 39 |
|---|---|---|---|---|---|---|---|---|---|---|---|
| Microcapsule pigment A | | 25 | 25 | 25 | 25 | 25 | | 30 | | 40 | 25 |
| Microcapsule pigment B | | | | | | | 25 | | 30 | | |
| Microcapsule pigment C | | | | | | | | | | | |
| Microcapsule pigment D | | | | | | | | | | | |
| Microcapsuie pigment E | | | | | | | | | | | |
| Shear thinning agent | (1) | 0.3 | 0.3 | 0.3 | 0.3 | 0.3 | 0.3 | 0.3 | 0.3 | 0.2 | 0.2 |
| Urea | | 10 | 10 | 10 | 10 | 10 | 10 | 10 | 10 | 10 | 10 |
| Glycerin | | 10 | 10 | 10 | 10 | 10 | 10 | 10 | 10 | 10 | 10 |
| Nonionic permeability imparting agent | (2) | 0.5 | 0.5 | 0.5 | 0.5 | 0.5 | 0.5 | 0.5 | 0.5 | 0.5 | 0.5 |
| Modified silicone antifoaming agent | (3) | 0.1 | 0.1 | 0.1 | 0.1 | 0.1 | 0.1 | 0.1 | 0.1 | 0.1 | 0.1 |
| Phosphoric acid ester surfactant | (4) | 0.5 | 0.5 | 0.5 | 0.5 | 0.5 | 0.5 | 0.5 | 0.5 | 0.5 | 0.5 |
| pH regulator | (5) | 0.5 | 0.5 | 0.5 | 0.5 | 0.5 | 0.5 | 0.5 | 0.5 | 0.5 | 0.5 |
| Antifungal agent | (6) | 0.2 | 0.2 | 0.2 | 0.2 | 0.2 | 0.2 | 0.2 | 0.2 | 0.2 | 0.2 |
| Water | | 52.9 | 52.9 | 52.9 | 52.9 | 52.9 | 52.9 | 47.9 | 47.9 | 38 | 53 |
| Ball diamter (mm) | | 0.3 | 0.4 | 0.5 | 0.7 | 1.0 | 0.5 | 0.5 | 0.5 | 0.5 | 0.7 |

TABLE 12

| Material name | (Note) | Example 40 | 41 | 42 | 43 | 44 | 45 | 46 | 47 | 48 | 49 |
|---|---|---|---|---|---|---|---|---|---|---|---|
| Microcapsule pigment A | | | | | | | | | | | |
| Microcapsule pigment B | | | | | | | | | | | |
| Microcapsule pigment C | | | 25 | 25 | 25 | 25 | 25 | | 30 | | 40 |
| Microcapsule pigment D | | | | | | | | 25 | | 30 | 25 |
| Microcapsule pigment E | | | | | | | | | | | |
| Shear thinning agent | (1) | 0.3 | 0.3 | 0.3 | 0.3 | 0.3 | 0.3 | 0.3 | 0.3 | 0.2 | 0.2 |
| Urea | | 10 | 10 | 10 | 10 | 10 | 10 | 10 | 10 | 10 | 10 |
| Glycerin | | 10 | 10 | 10 | 10 | 10 | 10 | 10 | 10 | 10 | 10 |
| Nonionic permeability imparting agent | (2) | 0.5 | 0.5 | 0.5 | 0.5 | 0.5 | 0.5 | 0.5 | 0.5 | 0.5 | 0.5 |
| Modified silicone antifoaming agent | (3) | 0.1 | 0.1 | 0.1 | 0.1 | 0.1 | 0.1 | 0.1 | 0.1 | 0.1 | 0.1 |
| Phosphoric acid ester surfactant | (4) | 0.5 | 0.5 | 0.5 | 0.5 | 0.5 | 0.5 | 0.5 | 0.5 | 0.5 | 0.5 |
| pH regulator | (5) | 0.5 | 0.5 | 0.5 | 0.5 | 0.5 | 0.5 | 0.5 | 0.5 | 0.5 | 0.5 |
| Antifungal anent | (6) | 0.2 | 0.2 | 0.2 | 0.2 | 0.2 | 0.2 | 0.2 | 0.2 | 0.2 | 0.2 |
| Water | | 52.9 | 52.9 | 52.9 | 52.9 | 52.9 | 52.9 | 47.9 | 47.9 | 38 | 53 |
| Ball diamter (mm) | | 0.3 | 0.4 | 0.5 | 0.7 | 1.0 | 0.5 | 0.5 | 0.5 | 0.5 | 0.7 |

TABLE 13

| Material name | (Note) | Comparative Example 5 | Comparative Example 6 |
|---|---|---|---|
| Microcapsule pigment A | | | |
| Microcapsule pigment B | | | |
| Microcapsule pigment C | | | |
| Microcapsule pigment D | | | |
| Microcapsule pigment E | | 25 | 30 |
| Shear thinning agent | (1) | 0.3 | 0.3 |
| Urea | | 10 | 10 |
| Glycerin | | 10 | 10 |
| Nonionic permeability imparting agent | (2) | 0.5 | 0.5 |
| Modified silicone antifoaming agent | (3) | 0.1 | 0.1 |
| Phosphoric acid ester surfactant | (4) | 0.5 | 0.5 |
| pH regulator | (5) | 0.5 | 0.5 |
| Antifungal agent | (6) | 0.2 | 0.2 |
| Water | | 52.9 | 47.9 |
| Ball diamter (mm) | | 0.5 | 0.5 |

TABLE 14

| Material name | (Note) | Comparative Example 7 | 8 | 9 | 10 |
|---|---|---|---|---|---|
| Microcapsule pigment A | | 3 | 45 | 25 | 25 |
| Microcapsule pigment B | | | | | |
| Microcapsule pigment C | | | | | |
| Microcapsule pigment D | | | | | |
| Microcapsule pigment E | | | | | |
| Shear thinning agent | (1) | 0.4 | 0.2 | 0.2 | 0.4 |
| Urea | | 10 | 10 | 10 | 10 |
| Glycerin | | 10 | 10 | 10 | 10 |
| Nonionic permeability imparting agent | (2) | 0.5 | 0.5 | 0.5 | 0.5 |
| Modified silicone antifoaming agent | (3) | 0.1 | 0.1 | 0.1 | 0.1 |
| Phosphoric acid ester surfactant | (4) | 0.5 | 0.5 | 0.5 | 0.5 |
| pH regulator | (5) | 0.5 | 0.5 | 0.5 | 0.5 |
| Antifungal agent | (6) | 0.2 | 0.2 | 0.2 | 0.2 |
| Water | | 74.8 | 33 | 53 | 52.8 |
| Ball diamter (mm) | | 0.5 | 0.5 | 0.3 | 1.0 |

TABLE 15

| Material name | (Note) | Comparative Example 11 | 12 | 13 | 14 |
|---|---|---|---|---|---|
| Microcapsule pigment A | | | | | |
| Microcapsule pigment B | | | | | |
| Microcapsule pigment C | | 3 | 45 | 25 | 25 |
| Microcapsule pigment D | | | | | |
| Microcapsule pigment E | | | | | |
| Shear thinning agent | (1) | 0.4 | 0.2 | 0.2 | 0.4 |
| Urea | | 10 | 10 | 10 | 10 |
| Glycerin | | 10 | 10 | 10 | 10 |
| Nonionic permeability imparting agent | (2) | 0.5 | 0.5 | 0.5 | 0.5 |
| Modified silicone antifoaming agent | (3) | 0.1 | 0.1 | 0.1 | 0.1 |
| Phosphoric acid ester surfactant | (4) | 0.5 | 0.5 | 0.5 | 0.5 |
| pH regulator | (5) | 0.5 | 0.5 | 0.5 | 0.5 |
| Antifungal agent | (6) | 0.2 | 0.2 | 0.2 | 0.2 |
| Water | | 74.8 | 33 | 53 | 52.8 |
| Ball diamter (mm) | | 0.5 | 0.5 | 0.3 | 1.0 |

The materials in Tables 11 to 15 will be explained below with the note numbers.

(1) Shear thinning imparting agent (xanthan gum)
(2) Nonionic permeability imparting agent
[manufactured by San Nopco Limited, product name: Nopco SW-WET-366]
(3) Modified silicone antifoaming agent
[manufactured by San Nopco Limited, product name: Nopco 8034]
(4) Phosphoric acid ester surfactant [manufactured by DKS Co., Ltd., product name: PLYSURF AL]
(5) pH regulator (triethanolamine)
(6) Antifungal agent
[manufactured by Lonza Japan, product name: Proxel XL-2]

Example 50

Preparation of Aqueous Ink for Writing Instrument

An aqueous ink for writing instruments was prepared by mixing 23 parts of the reversibly thermochromic microcapsule pigment A (black color had been developed beforehand by cooling to −18° C. or lower), 0.5 parts of a polymeric coagulant (hydroxyethyl cellulose) [manufactured by Dow Chemical Japan Co., Ltd., product name: CELLOSIZE WP-09], 0.2 parts of an acrylic polymer dispersant [manufactured by Japan Lubrizol Corporation, product name: Solsperse 43000], 1 part of an organic nitrogen sulfur compound (mixture of 2-methyl-4-isothiazoline-3-one and 5-chloro-2-methyl-4-isothiazoline-3-one) [manufactured by Hokko Chemical Industry Co., Ltd., product name: HOKUSIDE R-150, 0.5 parts of polyvinyl alcohol, parts of glycerin, 0.02 parts of an antifoaming agent, and 49.78 parts of water.

Production of Marking Pen

An ink occlusion body prepared by covering a polyester sliver with a synthetic resin film was impregnated with the aqueous ink described above and inserted into an axial barrel made of a polypropylene resin. Then, the axial barrel was assembled with a resin-processed pen body (cannonball shape) made of polyester fibers via a holder made of a resin in such a manner that the front end of the axial barrel was in connection with the pen body, and a cap was fitted thereto to produce a marking pen. The crown of the cap has an SEBS resin attached as a friction member.

Example 51

Preparation of Aqueous Ink for Writing Instrument

An aqueous ink for writing instruments was prepared by mixing 20 parts of the reversibly thermochromic microcapsule pigment A (black color had been developed beforehand by cooling to −18° C. or lower), 0.4 parts of a polymeric coagulant (hydroxyethyl cellulose) [manufactured by Dow Chemical Japan Co., Ltd., product name: CELLOSIZE WP-09], 0.4 parts of an acrylic polymer dispersant [manufactured by Japan Lubrizol Corporation, product name: Solsperse 43000], 0.2 parts of a preservative A (sodium 2-pyridinethiol-1-oxide) [manufactured by Lonza Japan, product name: Sodium Omadine], 0.2 parts of a preservative B (3-iodo-2-propynyl N-butylcarbamate) [manufactured by Lonza Japan, product name: Glycacil 2000], 18 parts of glycerin, 0.2 parts of an antifoaming agent, 0.05 parts of a pH regulator (10% diluted phosphoric acid solution), and 53.55 parts of water, and then adding and mixing 7 parts of a specific gravity adjuster (sodium polytungstate) (manufactured by SOMETU, product name: SPT-1).

Production of Marking Pen

An ink occlusion body prepared by covering a polyester sliver with a synthetic resin film was impregnated with the aqueous ink described above and inserted into an axial barrel made of a polypropylene resin. Then, the axial barrel was assembled with a resin-processed pen body (cannonball shape) made of polyester fibers via a resin holder in such a manner that the front end of the axial barrel was in connection with the pen body, and a cap was fitted thereto to produce a marking pen. The rear end portion of the axial barrel has an SEBS resin attached as a friction member.

Example 52

Preparation of Aqueous Ink for Writing Instrument

An aqueous ink for writing instruments was prepared by mixing 25 parts of the reversibly thermochromic microcapsule pigment A (black color had been developed beforehand by cooling to −18° C. or lower), 0.5 parts of a polymeric coagulant (hydroxyethyl cellulose) [manufactured by Dow Chemical Japan Co., Ltd., product name: CELLOSIZE WP-09], 0.2 parts of an acrylic polymer dispersant [manufactured by Japan Lubrizol Corporation, product name: Solsperse 43000], 1 part of an organic nitrogen sulfur compound (mixture of 2-methyl-4-isothiazoline-3-one and 5-chloro-2-methyl-4-isothiazoline-3-one) [manufactured by Hokko Chemical Industry Co., Ltd., product name: HOKU-SIDE R-150], 0.5 parts of polyvinyl alcohol, parts of glycerin, 0.02 parts of an antifoaming agent, and 47.78 parts of water.

Production of Marking Pen

An ink occlusion body prepared by covering a polyester sliver with a synthetic resin film was impregnated with the aqueous ink described above and inserted into an axial barrel made of a polypropylene resin. Then, the axial barrel was assembled with a resin-processed pen body (chisel shape) made of polyester fibers via a holder made of a resin in such a manner that the front end of the axial barrel was in connection with the pen body, and a cap was fitted thereto to produce a marking pen. The rear end portion of the axial barrel has an SEBS resin attached as a friction member.

The following Tables 16 to 20 show the composition of each aqueous ink and the shape of the resin-processed pen body of the marking pen of Examples 50 to 69 and Comparative Examples 15 to 27.

Aqueous inks of Examples 53 to 69 and Comparative Examples 15 to 27 were each prepared by changing the types and blending amounts of materials to be blended in Examples 50 to 52 as shown in Tables 16 to 20. The marking pens were produced by changing the shapes of the resin-processed pen bodies used in Examples 50 to 52 as shown in Tables 16 to 20.

TABLE 16

| Material name | (Note) | Example 50 | 51 | 52 | 53 | 54 | 55 | 56 | 57 | 58 | 59 |
|---|---|---|---|---|---|---|---|---|---|---|---|
| Microcapsule pigment A | | 23 | 20 | 25 | | | | 33 | 30 | | |
| Microcapsule pigment B | | | | | 23 | 20 | 25 | | | 40 | 23 |
| Microcapsule pigment C | | | | | | | | | | | |
| Microcapsule pigment D | | | | | | | | | | | |
| Microcapsule pigment E | | | | | | | | | | | |
| Polymeric coagulant | (1) | 0.5 | 0.4 | 0.5 | 0.5 | 0.4 | 0.5 | 0.4 | 0.4 | 0.4 | 0.4 |
| Acrylic polymer dispersant | (2) | 0.2 | 0.4 | 0.2 | 0.2 | 0.4 | 0.2 | 0.2 | 0.4 | 0.4 | 0.2 |
| Organic nitrogen sulfur compound | (3) | 1 | | 1 | 1 | | 1 | 1 | | | 1 |
| Polyvinyl alcohol | | 0.5 | 0.5 | 0.5 | 0.5 | 0.4 | 0.5 | | | | |
| Preservative A | (4) | | 0.2 | | | 0.2 | | | 0.2 | 0.2 | |
| Preservative B | (5) | | 0.2 | | | 0.2 | | | 0.2 | 0.2 | |
| Glycerin | | 25 | 18 | 25 | 25 | 18 | 25 | 20 | 14 | 10 | 23 |
| Antifoaming agent | | 0.02 | 0.2 | 0.02 | 0.02 | 0.2 | 0.02 | 0.02 | 0.2 | 0.2 | 0.02 |
| pH regulator | | | 0.05 | | | 0.05 | | | 0.05 | 0.05 | |
| Specific gravity adjuster | (6) | | 7 | | | 7 | | | 6 | 5 | |
| Water | | 49.78 | 53.55 | 47.78 | 49.78 | 53.55 | 47.78 | 44.98 | 48.55 | 43.55 | 51.88 |
| Shape of resin-processed pen body | | Cannon-ball | Cannon-ball | Chisel | Cannon-ball | Cannon-ball | Chisel | Cannon-ball | Cannon-ball | Cannon-ball | Cannon-ball |

TABLE 17

| Material name | (Note) | Example 60 | 61 | 62 | 63 | 64 | 65 | 66 | 67 | 68 | 69 |
|---|---|---|---|---|---|---|---|---|---|---|---|
| Microcapsule pigment A | | | | | | | | | | | |
| Microcapsule pigment B | | | | | | | | | | | |
| Microcapsule pigment C | | 23 | 20 | 25 | | | | 33 | 30 | | |
| Microcapsule pigment D | | | | | 23 | 20 | 25 | | | 40 | 23 |
| Microcapsule pigment E | | | | | | | | | | | |
| Polymeric coagulant | (1) | 0.5 | 0.4 | 0.5 | 0.5 | 0.4 | 0.5 | 0.4 | 0.4 | 0.4 | 0.4 |
| Acrylic polymer dispersant | (2) | 0.2 | 0.4 | 0.2 | 0.2 | 0.4 | 0.2 | 0.2 | 0.4 | 0.4 | 0.2 |
| Organic nitrogen sulfur compound | (3) | 1 | | 1 | 1 | | 1 | 1 | | | 1 |
| Polyvinyl alcohol | | 0.5 | | 0.5 | 0.5 | | 0.5 | 0.4 | | | 0.5 |
| Preservative A | (4) | | 0.2 | | | 0.2 | | | 0.2 | 0.2 | |
| Preservative B | (5) | | 0.2 | | | 0.2 | | | 0.2 | 0.2 | |
| Glycerin | | 25 | 18 | 25 | 25 | 18 | 25 | 20 | 14 | 10 | 23 |
| Antifoaming agent | | 0.02 | 0.2 | 0.02 | 0.02 | 0.2 | 0.02 | 0.02 | 0.2 | 0.2 | 0.02 |
| pH regulator | | | 0.05 | | | 0.05 | | | 0.05 | 0.05 | |

TABLE 17-continued

| Material name | (Note) | 60 | 61 | 62 | 63 | 64 | 65 | 66 | 67 | 68 | 69 |
|---|---|---|---|---|---|---|---|---|---|---|---|
| Specific gravity adjuster | (6) | | 7 | | | 7 | | | 6 | 5 | |
| Water | | 49.78 | 53.55 | 47.78 | 49.78 | 53.55 | 47.78 | 44.98 | 48.55 | 43.55 | 51.88 |
| Shape of resin-processed pen body | | Cannon-ball | Cannon-ball | Chisel | Cannon-ball | Cannon-ball | Chisel | Cannon-ball | Cannon-ball | Cannon-ball | Cannon-ball |

TABLE 18

| Material name | (Note) | Comparative Example 15 | 16 | 17 | 18 | 19 |
|---|---|---|---|---|---|---|
| Microcapsule pigment A | | | | | | |
| Microcapsule pigment B | | | | | | |
| Microcapsuie pigment C | | | | | | |
| Microcapsule pigment D | | | | | | |
| Microcapsule pigment E | | 23 | 20 | 25 | 33 | 30 |
| Polymeric coagulant | (1) | 0.5 | 0.4 | 0.5 | 0.4 | 0.4 |
| Acrylic polymer dispersant | (2) | 0.2 | 0.4 | 0.2 | 0.2 | 0.4 |
| Organic nitrogen sulfur compound | (3) | 1 | | 1 | 1 | |
| Polyvinyl alcohol | | 0.5 | | 0.5 | 0.4 | |
| Preservative A | (4) | | 0.2 | | | 0.2 |
| Presemative B | (5) | | 0.2 | | | 02 |
| Glycerin | | 25 | 18 | 25 | 20 | 14 |
| Antifoaming agent | | 0.02 | 0.2 | 0.02 | 0.02 | 0.2 |
| pH regulator | | | 0.05 | | | 0.05 |
| Specific gravity adjuster | (6) | | 7 | | | 6 |
| Water | | 49.78 | 53.55 | 47.78 | 44.98 | 48.55 |
| Shape of resin-processed pen body | | Cannon-ball | Cannon-ball | Chisel | Cannon-ball | Cannon-ball |

TABLE 19

| Material name | (Note) | Comparative Example 20 | 21 | 22 | 23 |
|---|---|---|---|---|---|
| Microcapsule pigment A | | 3 | 45 | 20 | 23 |
| Microcapsule pigment B | | | | | |
| Microcapsule pigment C | | | | | |
| Microcapsule pigment D | | | | | |
| Microcapsule pigment E | | | | | |
| Polymeric coagulant | (1) | 0.7 | 0.3 | 0.4 | 0.2 |
| Acrylic polymer dispersant | (2) | 0.2 | 0.2 | 0.4 | 0.2 |
| Organic nitrogen sulfur compound | (3) | 1 | 1 | | 1 |
| Polyvinyl alcohol | | 0.7 | 0.3 | | 0.4 |
| Preservative A | (4) | | | 0.2 | |
| Preservative B | (5) | | | 0.2 | |
| Glycerin | | 35 | 14 | 25 | 20 |
| Antifoaming agent | | 0.02 | 0.02 | 0.2 | 0.02 |
| pH regulator | | | | 0.05 | |
| Specific gravity adjuster | (6) | | | 10 | |
| Water | | 59.38 | 39.18 | 43.55 | 55.18 |
| Shape of resin-processed pen body | | Cannonball | Cannonball | Cannonball | Cannonball |

TABLE 20

| Material name | (Note) | Comparative Example 24 | Comparative Example 25 | Comparative Example 26 | Comparative Example 27 |
|---|---|---|---|---|---|
| Microcapsule pigment A | | | | | |
| Microcapsule pigment B | | | | | |
| Microoapsule pigment C | | 3 | 45 | 20 | 23 |
| Microcapsule pigment D | | | | | |
| Microcapsule pigment E | | | | | |
| Polymeric coagulant | (1) | 0.7 | 0.3 | 0.4 | 0.2 |
| Acrylic polymer dispersant | (2) | 0.2 | 0.2 | 0.4 | 0.2 |
| Organic nitrogen sulfur compound | (3) | 1 | 1 | | 1 |
| Polyvinyl alcohol | | 0.7 | 0.3 | | 0.4 |
| Preservative A | (4) | | | 0.2 | |
| Preservative B | (5) | | | 0.2 | |
| Glycerin | | 35 | 14 | 25 | 20 |
| Antifoaming agent | | 0.02 | 0.02 | 0.2 | 0.02 |
| pH regulator | | | | 0.05 | |
| Specific gravity adjuster | (6) | | | 10 | |
| Water | | 59.38 | 39.13 | 43.55 | 55.18 |
| Shape of resin-processed pen body | | Cannonball | Cannonball | Cannonball | Cannonball |

The materials in Tables 16 to 20 will be explained below with the note numbers.
(1) Polymeric coagulant (hydroxyethyl cellulose) [manufactured by Dow Chemical Japan Co., Ltd., product name: CELLOSIZE WP-09]
(2) Acrylic polymer dispersant [manufactured by Japan Lubrizol Corporation, product name: Solsperse 43000]
(3) Organic nitrogen sulfur compound (mixture of 2-methyl-4-isothiazoline-3-one and 5-chloro-2-methyl-4-isothiazoline-3-one) [manufactured by Hokko Chemical Industry Co., Ltd., product name: HOKUSIDE R-150]
(4) Preservative A (sodium 2-pyridinethiol-1-oxide) [manufactured by Lonza Japan, product name: Sodium Omadine]
(5) Preservative B (3-iodo-2-propynyl N-butylcarbamate) [manufactured by Lonza Japan, product name: Glycacil 2000]
(6) Specific gravity adjuster (sodium polytungstate) (manufactured by SOMETU, product name: SPT-1)

Production of Erasing Tool

An SEBS resin (SEBS copolymer elastomer) [manufactured by Aronkasei Co., Ltd., product name: AR-885C] was melt-kneaded at 150° C. and molded into a dome shape so that a radius of curvature R of a tip (rubbing portion) was 2.5 mm, to obtain a friction member. A Shore A hardness of the friction member measured with a durometer [manufactured by TECLOCK, product name: GS-719G] in accordance with the measurement method described in JIS K6253 was 83.

Next, an erasing tool was produced by attaching the friction member to the rear end portion of the axial barrel of the ballpoint pen having a structure in which the ballpoint pen tip (writing front-end) provided on the ballpoint pen refill was projected from the front-end opening of the axial barrel by the action of a clip-shaped projection-retraction mechanism (sliding mechanism) arranged on the rear side wall of the axial barrel.

Ink Consumption Amount Measurement

After the mass of each of the writing instruments (ballpoint pen or marking pen) (W1) produced in Examples 30 to 69 and Comparative Examples 5 to 27 was measured, the writing instrument was placed on an automatic writing tester according to JIS S6054 or JIS S6037, and a writing test in which writing by 50 m was carried out on the writing paper A according to old JIS P3201 in an environment of a room temperature (20° C.) was performed under the following condition, to measure the mass of the writing instrument after writing by 50 m (W2). Next, the ink consumption amount of the writing instrument (ink consumption amount of the writing instrument at the time of writing by 50 m) was obtained from the difference (W1-W2) between the mass of the writing instrument before writing (W1) and the mass of the writing instrument after writing by 50 m (W2).

Writing speed: 4 m/min

Writing angle: 70°

Writing load: 100 gf

In a marking pen including a chisel-shaped resin-processed pen body, a wide surface of the pen body was brought into close contact with the sheet of paper to hold the writing angle at 70°. When the writing instrument is a ballpoint pen or a marking pen including a cannonball-shaped resin-processed pen body, the writing test was performed by continuously writing a circle having a diameter of 3 cm in a spiral shape on writing paper by 50 m. When the writing instrument is a marking pen including a chisel-shaped resin-processed pen body, the writing test was performed by continuously writing a straight line with a wide surface of the pen body on writing paper by 50 m.

Evaluation of Handwriting in Colored State and Decolored State

Among the writing instruments produced in Examples 30 to 69 and Comparative Examples 5 to 27, with respect to a ballpoint pen or a marking pen including a cannonball-shaped resin-processed pen body, under an environment of room temperature (20° C.), 12 elliptical circles having a major axis of about 15 mm and a minor axis of about 8 mm were continuously handwritten in a spiral shape in a direction parallel to a transverse direction of A4-size test paper (vertical direction) so that the circles were in contact with each other.

Furthermore, among the writing instruments produced in Examples 30 to 69 and Comparative Examples 5 to 27, with respect to a marking pen including a chisel-shaped resin-processed pen body, under an environment of room temperature (20° C.), a 15 cm straight line was handwritten in the direction parallel to the transverse direction of A4-size test paper (vertical direction) so that a wide surface of the pen body was brought into close contact with the sheet of paper.

The obtained handwriting was visually confirmed, and the handwriting in the colored state was evaluated according to the following criteria.

As the test paper, the writing paper A according to old JIS P3201 was used.

A: The color development density of the handwriting was high, and a handwriting with good color development was obtained.

B: The color development density of the handwriting was slightly low, but at a practically acceptable level.

C: The color development density of the handwriting was low, and no handwriting with good color development was obtained.

Next, each handwriting in the colored state obtained on the test paper was rubbed and erased using the erasing tool described above, the erased portion was visually confirmed, and the handwriting in the decolored state was evaluated according to the following criteria.

A: A decoloring density of the handwriting was low, and the residual color in the decolored state was not visually recognized.

B: The decoloring density of the handwriting was slightly high, and the residual color in the decolored state was slightly visually recognized, but at a practically acceptable level.

C: The decoloring density of the handwriting was high, and the residual color was visually recognized in the decolored state.

Preparation of Sample for Density Measurement and Sample for Evaluation of Erasability of Handwriting Among the writing instruments produced in Examples 30 to 69 and Comparative Examples 5 to 27, a ballpoint pen or a marking pen including a cannonball-shaped resin-processed pen body was set in a recording type drawing machine [manufactured by Deicy Corp, product name: PL-1000], and a 10 m line in a circle was written on the writing paper A according to old JIS P3201 under the following conditions in an environment of 20° C. to produce a sample.

Writing speed: 4 m/min
Writing angle: 70°
Writing load: 100 gf

Among the writing instruments produced in Examples 30 to 69 and Comparative Examples 5 to 27, a marking pen including a chisel-shaped resin-processed pen body was set in an automatic writing tester according to JIS S6037 so that a wide surface of the pen body was brought into close contact with the sheet of paper, and a 10 cm straight line was written on the writing paper A according to old JIS P3201 in an environment of a room temperature (20° C.) under the following conditions to produce a sample.

Writing speed: 4 m/min
Writing angle: 70°
Writing load: 100 gf

Measurement of Density of Handwriting

A drawn line portion of the sample prepared above was set in a measurement portion of a fluorescence spectrodensitometer [manufactured by Konica Minolta, Inc., product name: FD-7], and the density value in the colored state was measured from the K value of the fluorescence spectrodensitometer. Next, the drawn line portion of each sample was rubbed and erased using the erasing tool described above, the erased portion was set in the measurement portion of the fluorescence spectrodensitometer, and the density value in the decolored state was measured from the K value of the fluorescence spectrodensitometer.

In addition, C was obtained by dividing the density value in the colored state by the density value in the decolored state from the measured density value in the colored state and density value in the decolored state.

Evaluation of Erasability of Handwriting

The erasing tool described above was pressed against the drawn line portion of each sample prepared above at an angle of 70° with respect to the sheet of paper, and rubbed by reciprocating 5 times on the sheet of paper under the conditions of a speed of 10 m/min and a load of 500 gf, a degree of erasure of the drawn line portion after the rubbing was visually confirmed, and the erasability of handwriting was evaluated according to the following criteria.

A: The line drawn at the rubbed portion was completely erased.

B: The line drawn at the rubbed portion was mostly erased, and was at a practically acceptable level.

C: There were many portions where the drawn line was not erased even after rubbing.

The following tables 21 to 30 show the ink consumption amount of the writing instrument at the time of writing by 50 m, the evaluation of handwriting in the colored state and the decolored state, the results of the density measurement, the value of C obtained by the density measurement, and the results of the erasability of handwriting of each of the aqueous inks of Examples 30 to 69 and Comparative Examples 5 to 27.

TABLE 21

| | Example | | | | | | | | | |
|---|---|---|---|---|---|---|---|---|---|---|
| | 30 | 31 | 32 | 33 | 34 | 35 | 36 | 37 | 38 | 39 |
| Ink consumption amount (mg)/50 m | 80 | 100 | 150 | 180 | 200 | 150 | 150 | 150 | 150 | 220 |
| Evaluation of handwriting in colored state | B | A | A | A | A | A | A | A | A | A |
| Evaluation of handwriting in decolored state | A | A | A | B | B | A | A | A | B | B |
| Color development density | 0.81 | 0.93 | 1.04 | 1.34 | 1.43 | 0.90 | 1.12 | 1.10 | 1.53 | 1.44 |
| Decoloring density | 0.01 | 0.01 | 0.03 | 0.05 | 0.06 | 0.03 | 0.04 | 004 | 0.07 | 0.06 |
| C(color development density/decoloring density) | 51.0 | 93.0 | 34.7 | 26.5 | 23.5 | 30.0 | 25.0 | 27.5 | 21.9 | 24.0 |
| Erasability of handwriting | A | A | A | A | A | A | A | A | B | B |

TABLE 22

|  | Example | | | | | | | | | |
|---|---|---|---|---|---|---|---|---|---|---|
|  | 40 | 41 | 42 | 43 | 44 | 45 | 46 | 47 | 48 | 49 |
| Ink consumption amount (mg)/50 m | 80 | 100 | 150 | 180 | 200 | 150 | 150 | 150 | 150 | 220 |
| Evaluation of handwriting in colored state | B | A | A | A | A | A | A | A | A | A |
| Evaluation of handwiiting n decolored state | A | A | A | A | B | A | A | A | B | B |
| Color development density | 0.81 | 0.91 | 0.95 | 1.22 | 1.33 | 0.98 | 1.00 | 1.02 | 1.36 | 1.07 |
| Decoloring density | 0.01 | 0.01 | 0.02 | 0.04 | 0.05 | 0.03 | 0.03 | 0.03 | 0.06 | 0.05 |
| C(color development density/decoloring density) | 81.0 | 91.0 | 47.5 | 30.5 | 26.6 | 32.7 | 33.3 | 34.0 | 22.7 | 21.4 |
| Erasability of handwriting | A | A | A | A | A | A | A | A | B | B |

TABLE 23

|  | Example | | | | | | | | | |
|---|---|---|---|---|---|---|---|---|---|---|
|  | 50 | 51 | 52 | 53 | 54 | 55 | 56 | 57 | 58 | 59 |
| Ink consumption amount (mg)/50 m | 240 | 130 | 210 | 240 | 130 | 210 | 240 | 130 | 130 | 230 |
| Evaluation of handwriting in colored state | A | A | A | A | A | A | A | A | A | A |
| Evaluation at handwriting in decolored state | A | A | A | A | A | A | B | A | B | B |
| Color development density | 0.88 | 0.75 | 0.89 | 0.78 | 0.70 | 0.83 | 1.19 | 1.10 | 1.38 | 1.02 |
| Decoloring density | 0.04 | 0.03 | 0.04 | 0.03 | 0.02 | 0.03 | 0.05 | 0.04 | 0.06 | 0.05 |
| C(color development density/decoloring density) | 21.5 | 25.0 | 22.3 | 26.0 | 35.0 | 27.7 | 23.8 | 27.5 | 23.0 | 20.4 |
| Erasability at handwriting | A | A | A | A | A | A | B | A | B | B |

TABLE 24

|  | Example | | | | | | | | | |
|---|---|---|---|---|---|---|---|---|---|---|
|  | 60 | 61 | 62 | 63 | 64 | 65 | 66 | 67 | 68 | 69 |
| Ink consumption amount (mg)/50 m | 240 | 130 | 210 | 240 | 130 | 210 | 240 | 130 | 130 | 280 |
| Evaluation of handwriting in colored state | A | A | A | A | A | A | A | A | A | A |
| Evaluation of handwriting in deoolored state | A | A | A | A | A | A | A | A | B | A |
| Color development density | 0.78 | 0.72 | 0.80 | 0.90 | 0.84 | 0.65 | 1.09 | 0.98 | 1.40 | 0.94 |
| Decoloring density | 0.03 | 0.03 | 0.03 | 0.03 | 0.03 | 0.03 | 0.04 | 0.04 | 0.05 | 0.04 |
| C(color development density/decoloring density) | 26.0 | 24.0 | 26.7 | 30.0 | 28.0 | 28.3 | 27.3 | 24.5 | 28.0 | 23.6 |
| Erasability of handwriting | A | A | A | A | A | A | B | A | B | B |

TABLE 25

|  | Comparative Example | |
|---|---|---|
|  | 5 | 6 |
| Ink consumption amount (mg)/50 m | 150 | 1150 |
| Evaluation of handwriting in colored state | A | A |
| Evaluation of handwriting in decolored state | B | B |
| Color development density | 0.96 | 1.11 |
| Decoloring density | 0.05 | 0.07 |
| C(color development density/decoloring density) | 19.2 | 15.9 |
| Erasabillty of handwriting | A | A |

TABLE 26

|  | Compartive Example | | | |
|---|---|---|---|---|
|  | 7 | 8 | 9 | 10 |
| Ink consumption amount (mg)/50 m | 150 | 150 | 50 | 300 |
| Evaluation of handwriting in colored state | C | A | C | A |
| Evaluation of handwriting in decolored state | A | C | A | C |
| Color development density | 0.52 | 1.67 | 0.66 | 1.80 |
| Decoloring density | 0.01 | 0.08 | 0.01 | 0.10 |

TABLE 26-continued

|  | Compartive Example | | | |
|---|---|---|---|---|
|  | 7 | 8 | 9 | 10 |
| C(color development density/decoloring density) | 52.0 | 20.9 | 66.0 | 18.0 |
| Erasability of handwriting | A | C | A | C |

TABLE 27

|  | Comparative Example | | | |
|---|---|---|---|---|
|  | 11 | 12 | 13 | 14 |
| Ink consumption amount (mg)/50 m | 150 | 150 | 50 | 300 |
| Evaluation of handwriting in colored state | C | A | C | A |
| Evaluation of handwriting in decolored state | A | B | A | C |
| Color development density | 0.58 | 1.47 | 0.69 | 1.57 |
| Decoloring density | 0.01 | 0.07 | 0.01 | 0.08 |

TABLE 27-continued

|  | Comparative Example | | | |
|---|---|---|---|---|
|  | 11 | 12 | 13 | 14 |
| C(color development density/decoloring density) | 58.0 | 21.0 | 69.0 | 19.6 |
| Erasability of handwriting | A | C | A | C |

TABLE 28

|  | Comparative Example | | | | |
|---|---|---|---|---|---|
|  | 15 | 16 | 17 | 18 | 19 |
| Ink consumption amount (mg)/50 m | 240 | 130 | 210 | 240 | 130 |
| Evaluation of handwriting in colored state | A | B | A | A | A |
| Evaluation of handwriting in decolored state | B | A | B | B | B |
| Color development density | 0.82 | 0.66 | 0.90 | 1.10 | 0.95 |
| Decoloring density | 0.05 | 0.04 | 0.05 | 0.07 | 0.06 |
| C(color development density/decoloring density) | 16.4 | 16.5 | 18.0 | 15.7 | 15.8 |
| Erasability of handwriting | A | A | A | B | A |

TABLE 29

|  | Comparative Example | | | |
|---|---|---|---|---|
|  | 20 | 21 | 22 | 23 |
| Ink consumption amount (mg)/50 m | 240 | 240 | 50 | 350 |
| Evaluation of handwriting in colored state | C | A | C | A |
| Evaluation of handwriting in decolored state | A | B | A | B |
| Color development density | 0.20 | 1.59 | 0.32 | 1.21 |
| Decoloring density | 0.01 | 0.06 | 0.01 | 0.06 |
| C(color development density/decoloring density) | 20.0 | 26.5 | 32.0 | 20.2 |
| Erasability of handwriting | A | C | A | C |

TABLE 30

|  | Comparative Example | | | |
|---|---|---|---|---|
|  | 24 | 25 | 26 | 27 |
| Ink consumption amount (mg)/50 m | 240 | 240 | 50 | 350 |
| Evaluation of handwriting in colored state | C | A | C | A |
| Evaluation of handwriting in decolored state | A | B | A | B |
| Color development density | 0.16 | 1.47 | 0.22 | 1.11 |
| Decoloring density | 0.01 | 0.06 | 0.01 | 0.05 |
| C(color development density/decoloring density) | 16.0 | 24.5 | 22.0 | 22.2 |
| Erasability of handwriting | A | C | A | C |

Application Example 1

Production of Reversibly Thermochromic Toy

Stirring and mixing were carried out in a vehicle composed of 15 parts of the microcapsule pigment of Example 14, 40 parts of an acrylic resin/xylene solution, 20 parts of xylene, 20 parts of methyl isobutyl ketone, and 5 parts of a polyisocyanate-based curing agent to prepare a reversibly thermochromic spray paint. The spray paint was spray-coated over the whole body of a white miniature car injection-molded with an ABS resin as a support and dried to provide a reversibly thermochromic layer, and thus to produce a reversibly thermochromic toy (reversibly thermochromic miniature car).

The reversibly thermochromic toy was once cooled to 13° C. or lower, and the reversibly thermochromic layer completely developed a black color. Thereafter, when the reversibly thermochromic toy was immersed in hot water at 32° C., the black color of the reversibly thermochromic layer disappeared, and the color changed to white. When the reversibly thermochromic toy was taken out from the hot water and immersed in cold water at 13° C., the color changed to black again. This change could be repeated.

Application Example 2

Preparation of Reversibly Thermochromic Liquid Composition and Non-Thermochromic Liquid Composition 30 parts of the microcapsule pigment of Example 14 was uniformly mixed in a vehicle composed of 62 parts of a urethane-based emulsion, 0.5 parts of an antifoaming agent, 2 parts of a thickening agent, 0.5 parts of a leveling agent, and 5 parts of a crosslinking agent to prepare a reversibly thermochromic liquid composition (reversibly thermochromic printing ink). In addition, 0.5 parts of a general yellow pigment was uniformly mixed in a vehicle composed of 91.5 parts of a urethane-based emulsion, 0.5 parts of an antifoaming agent, 2 parts of a thickening agent, 0.5 parts of a leveling agent, and 5 parts of a crosslinking agent to prepare a non-thermochromic liquid composition (non-thermochromic printing ink).

Production of Reversibly Thermochromic Printed Matter

The non-thermochromic printing ink described above was printed on a surface of a white polyester film (thickness: 25 µm) as a support to form a star pattern using a screen printing plate, and dried and cured to provide a non-thermochromic layer. The reversibly thermochromic printing ink described above was solidly printed on an upper surface of the non-thermochromic layer using a screen printing plate, and dried and cured to provide a reversibly thermochromic layer. In addition, the upper surface was laminated with a transparent polyester film (thickness: 16 µm) to produce a reversibly thermochromic printed matter.

The reversibly thermochromic printed matter was once cooled to 13° C. or lower, and the reversibly thermochromic layer completely developed a black color. Thereafter, when the reversibly thermochromic printed matter was heated to 32° C. or higher, the black color of the reversibly thermochromic layer disappeared, and a yellow star pattern appeared. When the reversibly thermochromic printed matter was cooled again to 13° C. or lower, the reversibly thermochromic printed matter turned black again, and the yellow star pattern was not visually recognized. This change could be repeated.

Application Example 3

Preparation of Reversibly Thermochromic Liquid Composition 30 parts of the microcapsule pigment of Example 15, 60 parts of a hard liquid epoxy resin, 2 parts of an ultraviolet absorber, 2 parts of a thixotropic agent, and 0.5 parts of an antifoaming agent were mixed, and further 40 parts of an aliphatic polyamine of a room temperature curing type was added to prepare a reversibly thermochromic liquid composition (reversibly thermochromic epoxy ink).

Production of Reversibly Thermochromic Mug

The reversibly thermochromic epoxy ink described above was printed on a side surface of a ceramic mug as a support to form a heart pattern with a stainless steel screen plate by a curved surface printing machine, and a reversibly thermochromic layer was provided by heating and curing at 70° C. for 1 hour, thus producing a reversibly thermochromic mug.

When cold water at 13° C. was poured into the mug, the reversibly thermochromic layer developed color, and a black heart pattern appeared. When the cold water was removed from this state and hot water at 33° C. was poured, the black color of the reversibly thermochromic layer disappeared and became colorless. In addition, when the hot water was removed from this state and cold water at 13° C. was poured, the reversibly thermochromic layer developed color, and the black heart pattern was visually recognized again. This change could be repeated.

Application Example 4

Preparation of Ink for Reversibly Thermochromic Writing Instrument

An ink for reversibly thermochromic writing instrument was prepared by mixing 20 parts of the microcapsule pigment of Example 2 (black color had been developed beforehand by cooling to −18° C. or lower), 0.3 parts of xanthan gum (shear thinning imparting agent), 10 parts of urea, 10 parts of glycerin, 0.5 parts of a nonionic penetrant imparting agent, 0.1 parts of a modified silicone antifoaming agent, 0.2 parts of a preservative, and 58.9 parts of water.

Production of Ballpoint Pen

The ink for writing instruments described above was sucked and filled in an ink-storing tube made of a polypropylene pipe and then connected, via a holder made of a resin, with a ballpoint pen tip holding a stainless steel ball having a diameter of 0.8 mm on its front end. Next, an ink follower (liquid plug) containing polybutene as a main component and having viscoelasticity was filled from the rear end of the ink-storing tube, and a tail plug was fitted in the rear portion of the pipe. A front axial barrel and a rear axial barrel were assembled, a cap was fitted thereto, and then degassing treatment was carried out by centrifugation, whereby a ballpoint pen was produced.

The rear end portion of the rear axial barrel has an SEBS resin attached as a friction member.

When a black letter (handwriting) was formed by writing on a sheet of paper using the ballpoint pen described above, the handwriting showed black at room temperature (25° C.), and the letter discolored and became colorless when the letter was rubbed using the friction member. This state could be maintained as long as the sheet of paper was not cooled to a temperature of −18° C. or lower.

Meanwhile, when the sheet of paper was put in a freezer and cooled to −18° C. or lower, the letter showed a color change behavior of turning black again, and the color change behavior was repeatedly reproducible.

Application Example 5

Preparation of Ink for Reversibly Thermochromic Writing Instrument

An ink for reversibly thermochromic writing instrument was prepared by mixing 20 parts of the microcapsule pigment of Example 22 (black color had been developed beforehand by cooling to −16° C. or lower), 0.3 parts of xanthan gum (shear thinning imparting agent), 10 parts of urea, 10 parts of glycerin, 0.5 parts of a nonionic penetrant imparting agent, 0.1 parts of a modified silicone antifoaming agent, 0.2 parts of a preservative, and 58.9 parts of water.

Production of Ballpoint Pen

The ink for writing instruments described above was sucked and filled in an ink-storing tube made of a polypropylene pipe and then connected, via a holder made of a resin, with a ballpoint pen tip holding a cemented carbide ball having a diameter of 0.5 mm on its front end. Then, a viscoelastic ink follower (liquid plug) containing polybutene as a main component was filled from the rear end of the ink-storing tube to produce a ballpoint pen refill.

This refill was incorporated into an axial barrel to obtain a ballpoint pen (retractable ballpoint pen).

The ballpoint pen had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on a rear side wall of the axial barrel.

The rear end portion of the axial barrel has an SEBS resin attached as a friction member.

When a black letter (handwriting) was formed by writing on a sheet of paper using the ballpoint pen described above, the handwriting showed black at room temperature (25° C.), and the letter discolored and became colorless when the letter was rubbed using the friction member. This state could be maintained as long as the sheet of paper was not cooled to a temperature of −16° C. or lower.

Meanwhile, when the sheet of paper was put in a freezer and cooled to −16° C. or lower, the letter showed a color change behavior of turning black again, and the color change behavior was repeatedly reproducible.

Application Example 6

Preparation of Ink for Reversibly Thermochromic Writing Instrument

A ink for reversibly thermochromic writing instrument was prepared by mixing 25 parts of the microcapsule pigment of Example 3 (black color had been developed beforehand by cooling to −18° C. or lower) with 0.5 parts of an acrylic polymer dispersant [manufactured by Japan Lubrizol Corporation, product name: Solsperse 43000], 1 part of an organic nitrogen sulfur compound (mixture of 2-methyl-4-isothiazoline-3-one and 5-chloro-2-methyl-4-isothiazoline-3-one) [manufactured by Hokko Chemical Industry Co., Ltd., product name: HOKUSIDE R-150], 0.5 parts of polyvinyl alcohol, 35 parts of glycerin, 0.02 parts of an antifoaming agent, and 37.98 parts of water.

Production of Marking Pen

An ink occlusion body prepared by covering a polyester sliver with a synthetic resin film was impregnated with the ink for writing instruments described above and inserted into an axial barrel made of a polypropylene resin. Then, the axial barrel was assembled with a resin-processed pen body (chisel shape) made of polyester fibers via a resin holder in such a manner that the front end of the axial barrel was in connection with the pen body, and a cap was fitted thereto to produce a marking pen.

The rear end portion of the axial barrel has an SEBS resin attached as a friction member.

When a black letter (handwriting) was formed by writing on a sheet of paper using the marking pen described above, the handwriting showed black at room temperature (25° C.), and the letter discolored and became colorless when the letter was rubbed using the friction member. This state could be maintained as long as the sheet of paper was not cooled to a temperature of −18° C. or lower.

Meanwhile, when the sheet of paper was put in a freezer and cooled to −18° C. or lower, the letter showed a color change behavior of turning black again, and the color change behavior was repeatedly reproducible.

Application Example 7

Production of Toy Figure with Hair Using Reversibly Thermochromic Composite Fiber 5 parts of the microcapsule pigment of Example 15, 1 part of a dispersant, nylon 12 (94 parts) having a melting point of 180° C., and 0.1 parts of a general pink pigment were melt-mixed at 200° C. with an extruder to prepare a reversibly thermochromic pellet for a core.

The reversibly thermochromic pellet was supplied to an extruder for forming a core, and a nylon 12 natural pellet was supplied to an extruder for forming a sheath. Using a composite fiber spinning apparatus, spinning was performed at 200° C. from an 18-hole discharge port so that a volume ratio of the core:the sheath was 6:4, to prepare reversibly thermochromic composite fibers consisting of 18 single yarns having an outer diameter of 90 μm.

In addition, the reversibly thermochromic composite fiber was transplanted to a doll head by a conventional method to produce a toy figure with hair using the reversibly thermochromic composite fiber.

The hair of the toy figure was once cooled to 13° C. or lower, and completely developed a black color. Thereafter, when the hair was immersed in hot water at 33° C., the color changed from black to pink. When the reversibly thermochromic toy was taken out from the hot water and immersed in cold water at 13° C., the color changed to black again. This change could be repeated.

Application Example 8

Production of Solid Writing Material 40 parts of the microcapsule pigment of Example 23 (black color had been developed beforehand by cooling to −16° C. or lower), 35 parts of talc (filler), 10 parts of a side-chain crystalline polyolefin (excipient) [manufactured by Hokoku Corporation, product name: HS Crysta 4100], 10 parts of a polyolefin wax (excipient) [manufactured by Sanyo Chemical Industries, Ltd., product name: SUNWAX 131-P (softening point: 110° C., Penetration: 3.5)], 2 parts of a styrene-acrylic acid copolymer resin, 2 parts of a polyvinyl alcohol resin, and 1 part of a hindered amine-based light stabilizer were kneaded with a kneader to prepare a kneaded product for an inner core.

Then, 69 parts of talc (filler), 10 parts of a sucrose fatty acid ester, 10 parts of polyolefin wax (excipient), and 10 parts of an ethylene-vinyl acetate copolymer were kneaded with a kneader to prepare a kneaded product for an outer shell.

The kneaded product for an outer shell was wound around an outer peripheral surface of the kneaded product for an inner core so that the kneaded product for an inner core became an inner core, and compression molding was performed by a press, the kneaded product was molded to have an outer diameter cp of 3 mm and a length of 60 mm (the inner core had a diameter of 2 mm, and cladding thickness of the outer shell was 0.5 mm), thereby producing a solid writing material having a core-sheath structure. The above dimensions are set values, and the solid writing material is manufactured by cooling to −20° C. and returning to normal temperature after compression molding.

Production of Solid Writing Instrument with Friction Body (Pencil with Friction Body)

The solid writing material described above was stored and molded in a round outer shaft (wood shaft) to obtain a pencil. In addition, a cylindrical friction body made of an SEBS resin was secured to a rear end of the pencil with a metallic connecting member interposed therebetween to produce a solid writing instrument with a friction body (pencil with a friction body).

When a black letter (handwriting) was formed by writing on a sheet of paper using the solid writing instrument described above, the handwriting showed black at room temperature (25° C.), and the letter discolored and became colorless when the letter was rubbed using the friction member. This state could be maintained as long as the sheet of paper was not cooled to a temperature of −16° C. or lower.

Meanwhile, when the sheet of paper was put in a freezer and cooled to −16° C. or lower, the letter showed a color change behavior of turning black again, and the color change behavior was repeatedly reproducible.

Application Example 9

Preparation of Ink for Reversibly Thermochromic Writing Instrument

An ink for reversibly thermochromic writing instrument was prepared by mixing 23 parts of the microcapsule pigment of Example 26 (black color had been developed beforehand by cooling to −17° C. or lower), 0.4 parts of a polymeric coagulant (hydroxyethyl cellulose) [manufactured by Dow Chemical Japan Co., Ltd., product name: CELLOSIZE EP-09], 0.4 parts of an acrylic polymer dispersant [manufactured by Japan Lubrizol Corporation, product name: Solsperse 43000], 0.2 parts of a preservative (sodium 2-pyridinethiol-1-oxide) [manufactured by Lonza Japan, product name: Sodium Omadine], 0.2 parts of a preservative (3-iodo-2-propynyl N-butylcarbamate) [manufactured by Lonza Japan, product name: Glycacil 2000], 13 parts of specific gravity adjuster (sodium polytungstate) (manufactured by SOMETU, product name: SPT-1), and 62.8 parts of water.

Production of Marking Pen

An ink occlusion body prepared by covering a polyester sliver with a synthetic resin film was impregnated with the ink for writing instruments described above and inserted into an axial barrel made of a polypropylene resin. Then, the axial barrel was assembled with a resin-processed pen body (cannonball shape) made of polyester fibers via a resin holder in such a manner that the front end of the axial barrel was in connection with the pen body, and a cap was fitted thereto to produce a marking pen.

The crown of the cap has an SEBS resin attached as a friction member.

When a black letter (handwriting) was formed by writing on a sheet of paper using the marking pen described above, the handwriting showed black at room temperature (25° C.), and the letter discolored and became colorless when the letter was rubbed using the friction member. This state could be maintained as long as the sheet of paper was not cooled to a temperature of −17° C. or lower.

Meanwhile, when the sheet of paper was put in a freezer and cooled to −17° C. or lower, the letter showed the color change behavior of turning black again, and the color change behavior was repeatedly reproducible.

Application Example 10

Preparation of Ink for Reversibly Thermochromic Stamp

An ink for a reversibly thermochromic stamp was prepared by mixing 20 parts of the microcapsule pigment of Example 27 (black color had been developed beforehand by cooling to −18° C. or lower), 50 parts of glycerin, 1.5 parts of an alkali-soluble acrylic emulsion [manufactured by Rohm and Haas Company Japan, product name: Primal DR 73], 0.9 parts of triethanolamine, 10 parts of a 50% aqueous polyvinylpyrrolidone solution, 0.2 parts of a silicone-based antifoaming agent, 0.5 parts of a permeation leveling agent, 0.2 parts of a preservative, and 16.7 parts of water.

Production of Stamp

The above-described ink for a stamp was impregnated into a stamp material having continuous pores, and secured to a stamp main body so that the stamp face of the stamp material was exposed, and a cap was fitted to produce a stamp.

An SEBS resin is attached as a friction member to a rear end portion of the stamp main body.

When the stamp described above was used and repeatedly pressed against a surface to be stamped (sheet of paper), the ink smoothly flowed out from the stamp face of the stamp material and transferred to the surface to be stamped, and a clear stamp image could be continuously formed without blurring the stamp image.

The stamp image showed black at room temperature (25° C.), and discolored and became colorless when the stamp image was rubbed using the friction member. This state could be maintained as long as the image was not cooled to a temperature of −18° C. or lower.

Meanwhile, when the sheet of paper was put in a freezer and cooled to −18° C. or lower, the stamp image showed the color change behavior of turning black again, and the color change behavior was repeatedly reproducible.

Application Example 11

Preparation of Reversibly Thermochromic Offset Ink

A reversibly thermochromic offset ink was prepared by mixing 30 parts of the microcapsule pigment of Example 25 (black color had been developed beforehand by cooling to −17° C. or lower), 5 parts of a red dye, and 65 parts of a linseed oil-based offset ink vehicle.

Production of Reversibly Thermochromic Printed Matter

Offset printing was performed on both front and back surfaces of high quality paper as a printing medium using the offset ink described above, and drying and curing were performed to form a date (thermochromic image).

The thermochromic images of the front surface and the back surface are formed so as not to overlap each other.

Next, offset printing was performed using a non-discoloring black offset ink, and drying and curing were performed to form a frame line (non-discoloring image), thereby producing a reversibly thermochromic printed matter.

Although the reversibly thermochromic printed matter described above was a printed matter in the form of a notebook in which a black date was formed at an initial stage, the color could be changed to red by frictional heat generated by rubbing the thermochromic image at an arbitrary position on the surface using the friction member, and the discolored state could be maintained at room temperature (25° C.), so that the reversibly thermochromic printed matter was useful for schedule management of holidays.

Since the date provided on the back surface of the discolored portion did not change its color due to heat transfer when the color of the thermochromic image on the front surface was changed, accurate schedule management could be performed.

Application Example 12

Reversibly Thermochromic Liquid Composition 40 parts of the microcapsule pigment of Example 4 (black color had been developed beforehand by cooling to −18° C. or lower) was uniformly mixed in a vehicle composed of 50 parts of a urethane resin emulsion, 3 parts of a leveling agent, and 1 part of a thickening agent to prepare a reversibly thermochromic liquid composition (reversibly thermochromic aqueous ink).

Production of Reversibly Thermochromic Recording Material (Information Display Card)

A transparent anchor coat layer composed of a urethane resin and an isocyanate-based curing agent was provided on a surface of a transparent polyester film (thickness: 25 μm) having an adhesive layer on a back surface as a support, and the reversibly thermochromic aqueous ink described above was solidly printed on an upper layer of the anchor coat layer using a screen printing plate, and dried and cured to provide a reversibly thermochromic layer. In addition, a transparent protective layer containing an epoxy acrylate oligomer, a polyester acrylate oligomer, and an acrylate monomer was provided on an upper layer thereof, irradiated with ultraviolet rays, and polymerized to produce a reversibly thermochromic recording material.

Then, the recording material was adhered to a white polyester film (thickness: 188 μm) as a base material, and put to practical use as an information display card.

The reversibly thermochromic recording material was once cooled to −18° C. or lower, and the reversibly thermochromic layer completely developed a black color. Thereafter, letter information was printed with a thermal printer having a thermal head.

In the recording material, white letter information (open-faced letter) was clearly displayed on a black background, and the white letter information was visually recognized as long as the recording material was held in a temperature range of −18 to 63° C. When the recording material was cooled to −18° C. or lower and the reversibly thermochromic layer completely developed a black color, the white open-faced letter was not visually recognized. From this state, it was possible to form a white open-faced letter on the reversibly thermochromic layer again using a thermal printer, and the recording material could be repeatedly used many times.

REFERENCE SIGNS LIST $t_1$ complete coloring temperature
$t_2$ coloring starting temperature
$t_3$ decoloring starting temperature
$t_4$ complete decoloring temperature
$T_1$ complete decoloring temperature
$T_2$ decoloring starting temperature
$T_3$ coloring starting temperature
$T_4$ complete coloring temperature
$\Delta H$ hysteresis width

The invention claimed is:
1. A reversibly thermochromic composition comprising:
 (a) a fluoran derivative represented by formula (Ia), as an electron-donating color-developing organic compound;

(b) an electron-accepting compound; and
(c) a reaction medium which reversibly induces an electron transfer reaction between the component (a) and the component (b) in a specific temperature range,
wherein formula (Ia) is represented by

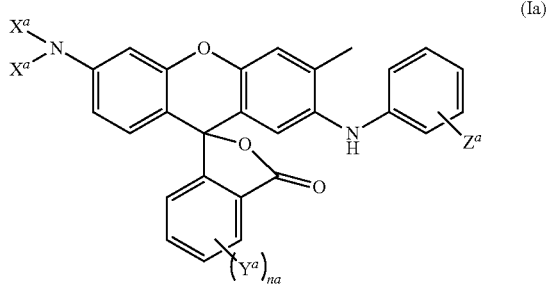

wherein na is 0, 1, or 2, each $Y^a$ is independently a halogen atom or a linear or branched alkyl group having 1 to 4 carbon atoms, $Z^a$ is a halogen atom provided that the substitution position of $Z^a$ is a para position, and each $X^a$ is independently a linear or branched alkyl group having 1 to 8 carbon atoms or a group represented by formula (ia) having 6 to 12 carbon atoms, or wherein na is 0, 1, or 2, each $Y^a$ is independently a halogen atom or a linear or branched alkyl group having 1 to 4 carbon atoms, $Z^a$ is a halogen atom, a liner or blanched alkyl group having 1 to 4 carbon atoms, or a liner or blanched alkoxy group having 1 to 3 carbon atoms, provided that the substitution position of $Z^a$ is a para position, one of the $X^a$s is a linear or branched alkyl group having 1 to 8 carbon atoms, and the other of the $X^a$s is the group represented by the formula (ia), wherein the formula (ia) is represented by

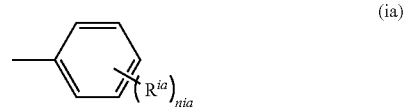

wherein nia is 0 or 1 and $R^{ia}$ is a halogen atom, a nitro group, a cyano group, a hydroxy group, a carboxyl group, a linear or branched alkyl group having 1 to 6 carbon atoms, or a linear or branched alkoxy group having 1 to 5 carbon atoms.

2. The reversibly thermochromic composition according to claim 1, which is the composition of heat-decoloring type having a reversibly thermochromic function of exhibiting a decolored state in a temperature range not lower than a complete decoloring temperature and exhibiting a colored state in a temperature range not higher than a complete coloring temperature.

3. A reversibly thermochromic microcapsule pigment encapsulating the reversibly thermochromic composition according to claim 1.

4. A reversibly thermochromic liquid composition comprising the reversibly thermochromic microcapsule pigment according to claim 3 and a vehicle.

5. The reversibly thermochromic liquid composition according to claim 4, which is selected from the group consisting of a printing ink, an ink for writing instruments, an ink for coating tools, an ink for a stamp, an ink for ink jet use, a paint, an ultraviolet curable ink, a painting color, a cosmetic, and a coloring liquid for fibers.

6. A reversibly thermochromic solid molded article for coating comprising the reversibly thermochromic microcapsule pigment according to claim 3 and an excipient.

7. The reversibly thermochromic solid molded article for coating according to claim 6, which is a solid writing material or a solid cosmetic material.

8. A resin composition for forming a reversibly thermochromic molded article comprising the reversibly thermochromic microcapsule pigment according to claim 3 and a molding resin.

9. A reversibly thermochromic molded article obtained by molding the resin composition for forming a reversibly thermochromic molded article according to claim 8.

10. A reversibly thermochromic laminate comprising:
a support; and
a reversibly thermochromic layer comprising the reversibly thermochromic microcapsule pigment according to claim 9.

11. A writing instrument obtained by storing the ink for writing instruments according to claim 5 in an ink-storing tube of the writing instrument.

12. The writing instrument according to claim 11, which is a ballpoint pen.

13. The writing instrument according to claim 12, wherein a ball provided at a writing front-end of the ballpoint pen has a diameter of 0.3 to 0.5 mm.

14. The writing instrument according to claim 12, wherein a ball provided at a writing front-end of the ballpoint pen has a diameter of 0.5 to 1.0 mm.

15. The writing instrument according to claim 11, which is a marking pen.

16. The writing instrument according to claim 11, comprising a friction member that changes color of a handwriting of the writing instrument by frictional heat.

* * * * *